(12) United States Patent
Weaver et al.

(10) Patent No.: US 8,124,234 B2
(45) Date of Patent: Feb. 28, 2012

(54) POLYURETHANE COMPOSITIONS AND ARTICLES PREPARED THEREFROM, AND METHODS FOR MAKING THE SAME

(75) Inventors: Laura B. Weaver, Lake Jackson, TX (US); Ashish Batra, Lake Jackson, TX (US); Patricia Ansems, Lake Jackson, TX (US)

(73) Assignee: Dow Global Technologies LLC, Midland, MI (US)

(*) Notice: Subject to any disclaimer, the term of this patent is extended or adjusted under 35 U.S.C. 154(b) by 358 days.

(21) Appl. No.: 12/447,379

(22) PCT Filed: Oct. 31, 2007

(86) PCT No.: PCT/US2007/083149
§ 371 (c)(1),
(2), (4) Date: Apr. 27, 2009

(87) PCT Pub. No.: WO2008/057881
PCT Pub. Date: May 15, 2008

(65) Prior Publication Data
US 2010/0028568 A1    Feb. 4, 2010

Related U.S. Application Data

(60) Provisional application No. 60/863,887, filed on Nov. 1, 2006, provisional application No. 60/894,353, filed on Mar. 12, 2007, provisional application No. 60/952,254, filed on Jul. 27, 2007, provisional application No. 60/952,266, filed on Jul. 27, 2007.

(51) Int. Cl.
*B32B 27/40* (2006.01)
*B32B 3/10* (2006.01)
*C08L 75/04* (2006.01)

(52) U.S. Cl. .................. 428/423.1; 428/195.1; 525/123

(58) Field of Classification Search .................. 525/123; 428/195.1, 423.1
See application file for complete search history.

(56) References Cited

U.S. PATENT DOCUMENTS

| | | |
|---|---|---|
| 2,929,800 A | 3/1960 | Hill, Jr. |
| 2,948,691 A | 8/1960 | Windemuth et al. |
| 3,394,164 A | 7/1968 | McClellan et al. |
| 3,493,634 A | 2/1970 | Kolycheck et al. |
| 3,620,905 A | 11/1971 | Ahramjian |
| 3,642,964 A | 2/1972 | Rausch, Jr. et al. |
| 3,644,457 A | 2/1972 | Konig et al. |
| 3,645,992 A | 2/1972 | Elston |
| 3,883,571 A | 5/1975 | Allport et al. |
| 3,963,679 A | 6/1976 | Ullrich et al. |
| 4,031,026 A | 6/1977 | Ibbotson |
| 4,039,593 A | 8/1977 | Kamienski et al. |
| 4,057,595 A | 11/1977 | Rauner et al. |
| 4,076,698 A | 2/1978 | Anderson et al. |
| 4,115,429 A | 9/1978 | Reiff et al. |
| 4,118,411 A | 10/1978 | Reiff et al. |
| 4,131,604 A | 12/1978 | Szycher et al. |
| 4,169,196 A | 9/1979 | Ehrlich et al. |
| 4,245,081 A | 1/1981 | Quiring et al. |
| 4,299,347 A | 11/1981 | Rougier et al. |
| 4,371,684 A | 2/1983 | Quiring et al. |
| 4,379,904 A | 4/1983 | Ehrlich et al. |
| 4,385,133 A | 5/1983 | Alberino et al. |
| 4,447,590 A | 5/1984 | Szycher et al. |
| RE31,671 E | 9/1984 | Bonk et al. |
| 4,522,975 A | 6/1985 | O'Connor et al. |
| 4,523,005 A | 6/1985 | Szycher et al. |
| 4,621,113 A | 11/1986 | Collins et al. |
| 4,631,329 A | 12/1986 | Gornowicz et al. |
| 4,798,081 A | 1/1989 | Hazlitt et al. |
| 4,883,837 A * | 11/1989 | Zabrocki .................. 525/66 |
| 4,945,005 A | 7/1990 | Aleckner, Jr. et al. |
| 4,946,896 A | 8/1990 | Mitsuno et al. |
| 5,039,755 A | 8/1991 | Chamberlain et al. |
| 5,167,899 A | 12/1992 | Jezic et al. |
| 5,229,464 A | 7/1993 | Erickson et al. |
| 5,272,236 A | 12/1993 | Lai et al. |
| 5,278,272 A | 1/1994 | Lai et al. |
| 5,346,963 A | 9/1994 | Hughes et al. |
| 5,414,027 A | 5/1995 | Denicola, Jr. et al. |
| 5,424,362 A | 6/1995 | Hwang et al. |
| 5,464,907 A | 11/1995 | Jelenic et al. |
| 5,623,019 A | 4/1997 | Wiggins et al. |
| 5,864,001 A | 1/1999 | Masse et al. |
| 5,902,854 A | 5/1999 | Kelley et al. |
| 5,986,028 A | 11/1999 | Lai et al. |
| 6,030,917 A | 2/2000 | Weinberg et al. |
| 6,054,533 A * | 4/2000 | Farkas et al. .................. 525/90 |
| 6,054,544 A | 4/2000 | Finlayson et al. |
| 6,248,540 B1 | 6/2001 | Weinberg et al. |
| 6,251,982 B1 | 6/2001 | Masse et al. |

(Continued)

FOREIGN PATENT DOCUMENTS

EP    0347794    12/1989

(Continued)

OTHER PUBLICATIONS

Wild, L., et al., J. Polym. Sci, 20, 441-455 (1982).
Ward, J., J. Polym. Sci., Polym. Let., 6, 621 (1968).
Randall, J.C., JMS-RW. Macromol. Chem. Phys., C29, 201-317, 1989.

*Primary Examiner* — Thao T. Tran
(74) *Attorney, Agent, or Firm* — Whyte Hirschboeck Dudek SC

(57) ABSTRACT

The invention provides a composition comprising the following: at least one olefin-based polymer, at least one halogenated ethylene-based polymer, or at least one elastomer rubber; at least one thermoplastic polyurethane; and at least one polydiene- or polydiol-based polyurethane. These compositions are well-suited for promoting the adhesion between polar (for example, polyester, polycarbonate and polylactic acid) and non-polar materials and for the manufacture of, among other things, films, fibers, sheets and tie layers, tubes, adhesives, dispersions, protective apparel, footwear, coatings, laminates and foams.

18 Claims, No Drawings

U.S. PATENT DOCUMENTS

| | | |
|---|---|---|
| 6,268,444 B1 | 7/2001 | Klosin et al. |
| 6,306,658 B1 | 10/2001 | Turner et al. |
| 6,316,663 B1 | 11/2001 | Guram et al. |
| 6,335,410 B1 | 1/2002 | Finlayson |
| 6,362,309 B1 | 3/2002 | Lund |
| 6,395,671 B2 | 5/2002 | LaPointe et al. |
| 6,469,099 B1 | 10/2002 | Farah et al. |
| 6,506,842 B1 | 1/2003 | Heck et al. |
| 6,723,810 B2 | 4/2004 | Finlayson et al. |
| 6,825,277 B2 | 11/2004 | Van Issum et al. |
| 6,897,276 B2 | 5/2005 | Boussie et al. |
| 6,919,407 B2 | 7/2005 | Tau et al. |
| 6,953,764 B2 | 10/2005 | Frazier et al. |
| 7,067,592 B2 | 6/2006 | Chino et al. |
| 7,355,089 B2 | 4/2008 | Chang et al. |
| 7,504,347 B2 | 3/2009 | Poon et al. |
| 7,514,517 B2 | 4/2009 | Hoenig et al. |
| 7,524,911 B2 | 4/2009 | Karjala et al. |
| 2003/0004286 A1 | 1/2003 | Klosin et al. |
| 2005/0100754 A1 | 5/2005 | Moncla et al. |
| 2006/0199030 A1 | 9/2006 | Liang et al. |
| 2006/0199744 A1 | 9/2006 | Walton et al. |
| 2006/0199872 A1 | 9/2006 | Prieto et al. |
| 2006/0199887 A1 | 9/2006 | Liang et al. |
| 2006/0199896 A1 | 9/2006 | Walton et al. |
| 2006/0199905 A1 | 9/2006 | Hughes et al. |
| 2006/0199906 A1 | 9/2006 | Walton et al. |
| 2006/0199908 A1 | 9/2006 | Cheung et al. |
| 2006/0199910 A1 | 9/2006 | Walton et al. |
| 2006/0199911 A1 | 9/2006 | Markovich et al. |
| 2006/0199912 A1 | 9/2006 | Fuchs et al. |
| 2006/0199914 A1 | 9/2006 | Harris et al. |
| 2006/0199930 A1 | 9/2006 | Li Pi Shan et al. |
| 2006/0199931 A1 | 9/2006 | Poon et al. |
| 2006/0199983 A1 | 9/2006 | Kammerhofer et al. |
| 2008/0220273 A1* | 9/2008 | Weaver ............... 428/480 |
| 2009/0163663 A1 | 6/2009 | Qureshi |
| 2010/0029827 A1 | 2/2010 | Ansems et al. |
| 2010/0143651 A1 | 6/2010 | Silvis et al. |
| 2010/0292403 A1 | 11/2010 | Ansems et al. |

FOREIGN PATENT DOCUMENTS

| | | |
|---|---|---|
| EP | 0190889 | 4/1993 |
| EP | 0643742 | 12/1993 |
| EP | 0754711 | 7/1995 |
| EP | 0994919 | 4/2000 |
| GB | 1446586 | 8/1976 |
| WO | 9406859 | 3/1994 |
| WO | 9627622 | 9/1996 |
| WO | 9902603 | 1/1999 |
| WO | 00/63293 | 10/2000 |
| WO | 0340195 | 5/2003 |
| WO | 2004024740 | 3/2004 |
| WO | 2005008915 | 1/2005 |
| WO | 2005008916 | 1/2005 |
| WO | 2005008917 | 1/2005 |
| WO | 2005090425 A1 | 9/2005 |
| WO | 2005090427 | 9/2005 |
| WO | 2006035384 | 4/2006 |
| WO | 2006101968 | 9/2006 |
| WO | 2007033115 | 3/2007 |
| WO | 2007033117 | 3/2007 |

* cited by examiner

POLYURETHANE COMPOSITIONS AND ARTICLES PREPARED THEREFROM, AND METHODS FOR MAKING THE SAME

REFERENCE TO RELATED APPLICATIONS

This application claims the benefit of U.S. Provisional Application No. 60/863,887, filed on Nov. 1, 2006, and U.S. Provisional Application No. 60/894,353, filed on Mar. 12, 2007, and U.S. Provisional Application No. 60/952,254, filed on Jul. 27, 2007, and U.S. Provisional Application No. 60/952,266, filed on Jul. 27, 2007; each application is fully incorporated herein by reference.

FIELD OF INVENTION

The invention provides polyurethane compositions comprising the following: a) at least one olefin polymer, at least one halogenated ethylene-based polymer, or at least one elastomeric rubber; b) at least one thermoplastic polyurethane; and c) at least one polydiene- or polydiol based polyurethane. The inventive compositions have improved surface energies, which correlate to improved adhesion properties.

Polyolefins, as a class of materials, have relatively poor adhesion and compatibility with more polar polymeric materials. In most cases, a separate adhesive is required in order to adhere polyolefins to polar substrates, like polyesters, polyamides, polyurethanes, and the like. Similarly, a third component compatibilizer typically has to be used to prepare satisfactory melt blends of polyolefins with other more polar thermoplastics. However significant amounts of compatibilizers are usually required to maintain the intimate blend of the polyolefin and polyurethane.

In North America, approximately 25 million lbs of flexible polyvinyl chloride (f-PVC) goes into thermoformed sheeting for automotive applications, such as instrument and door panels. Such sheeting is grained, and is color matched with other interior components. Sheeting for automotive applications has to meet several end-use requirements. Key end-use requirements include a low gloss value, a high surface scratch/mar resistance, high heat resistance and good cold temperature impact resistance. In addition, the sheeting must have good adhesion to any intermediate polyurethane (PU) foam layer, for example a foam layer used to provide a softening or cushioning effect to an automotive panel.

The polymeric sheets or skins must be of low gloss, or low glare, especially, if the sheet is placed under a window, such as, in the instrument panel (IP), under the front window of an automobile. Moreover, the gloss of the material must remain low over the vehicle life-time. The gloss of a material is typically determined by measuring reflected light at specified angles, and a typical test measurement is done at 60 degrees. The reflection measurements are converted into gloss values, and these values are typically less than, or equal to, 2, for automotive applications. Flexible or plasticized polyvinyl chloride typically has high gloss values. To reduce the gloss of flexible polyvinylchloride, to acceptable levels for automotive applications, a liquid polyurethane top-coating is typically applied.

Thermoplastic polyolefins (TPOs) sheets can also be used in automotive applications. Thermoplastic polyolefin sheets or skins generally have lower gloss values compared to flexible polyvinyl chloride, but are also polyurethane top-coated to primarily enhance the surface scratch/mar characteristics, and with the secondary benefit of lowering the gloss value. New surface graining technologies (for example, micrograining, imparted from a grained roller surface to the extruded sheet, during an extrusion) are emerging, however, which will allow for consistent gloss control over a wide variety of grain patterns. These new technologies could foreseeably eliminate the need for PU top-coating of polyolefins that have the right amount of scratch/mar resistance to meet the application requirements. Examples of such new technologies are described in U.S. Pat. No. 5,902,854, which is incorporated herein by reference.

Another end-use requirement is that the sheeting (f-PVC or TPO) needs to withstand the upper service temperatures experienced in the auto interiors, especially in the heat of the summer. The current criterion is that the sheeting withstand a temp. of 120° C. oven aging over 500 hours, while maintaining 50 percent of the original elongation (ISO 188/ASTM E 145, Type IIA, 500 hr at 120° C.), without melting, distorting, becoming tacky, or exhibiting other physical changes. Concurrent with this requirement, is the necessity that the sheeting provide good impact properties at low temperatures, such as at −40° C. This property is particular important when such sheeting is used to form seamless airbags (occupant safety during airbag deployment in winter is of paramount importance; no flying debris is the criteria). The glass transition temperature (Tg) of plasticized polyvinyl chloride is typically −20° C. to −30° C., and thus, this polymer has impaired cold temperature impact properties at temperatures lower than its Tg. Thermoplastic polyolefins, however, typically have lower glass transition temperatures, compared to that of polyvinyl chloride, and thus, have better cold temperature impact properties. Thermoplastic polyolefins are typically the material of choice for seamless airbags and other safety devices, which deploy during a vehicular impact, particularly in cold climates.

Thermoplastic polyolefins also have better long-term durability compared to flexible polyvinyl chloride, as shown by little change in rheological and/or mechanical properties upon heat aging at 120° C. At 120° C., polyvinyl chloride typically loses plasticizer, and therefore loses elongation (elasticity), and becomes brittle and prone to cracking.

Thermoplastic olefin (TPO) sheeting is increasingly being used for soft covered instrument panels and door panels. The typical assembly process requires joining together, in a molding process, a thermoformed flexible thermoplastic polyolefin skin and a hard surface substrate, by forming a polyurethane foam between the two layers. The hard surface substrate is typically composed of a thermoplastic polyolefin, an acrylonitrile-butadiene-styrene (ABS) or an acrylonitrile-butadiene-styrene/polycarbonate (ABS/PC) blend. In instrument panel applications, the ABS and ABS/PC substrates are being replaced by hard TPOs, which are usually reinforced with a filler. A polyurethane precursor mixture (a liquid isocyanate, a liquid polyol and catalyst) is injected between the TPO skin and the hard surface, and then reacted to form a foamed, intermediate layer.

Thermoplastic polyolefins, due to their nonpolar nature, generally lack adhesion to polar materials, such as polyurethanes. Thus, a flexible thermoplastic olefin sheet is conventionally surface treated with a primer solution, containing one or more polar compounds, to increase the adhesion to a polyurethane surface. Typical primer solutions contain a chlorinated maleated polyolefin. Such a surface treatment requires a large ventilation area, equipped to handle sheeting through a gravure application; a primer application mechanism, such as a dip tank; and a drying means to flash off the water and other solvent carriers. In addition, the flexible thermoplastic olefin skin must adhere, without voids and other visible defects, to the polyurethane foam. The polyurethane foam should adhere to the thermoplastic polyolefin surface, without delamination at the interface (or adhesive failure). A discontinuous application of a primer solution may lead to the formation of voids between the thermoplastic olefin skin and polyurethane foam in areas that lack the primer. Surface voids are a costly problem for automotive parts manufacturers, since parts that have surface voids cannot be used in an automotive assembly, and are instead scraped.

There is a need to develop a polyolefin compositions containing a polyurethane component, and which requires a minimal amount compatibilizer or other type of stabilization agent to maintain the stability of the polymer phases of the composition, and which have high surface energies and good adhesive properties.

International Publication No. 2007/033117 relates to ethylene/α-olefin compositions containing at least one ethylene/α-olefin random interpolymer and at least one polydiene diol-based polyurethane, and where the at least one ethylene/α-olefin interpolymer has a PRR from −6 to 75, and a density less than, or equal to, 0.93 g/cc.

U.S. Pat. No. 6,251,982 discloses a compounded rubber composition comprising: (a) a hydrogenated, polydiene diol based polyurethane having a hard segment content of 10% or greater; (b) a non-polar extender oil in an amount from 10 to 400 phr; and/or (c) one or more thermoplastic resin(s) in an amount from 5 to 100 phr. The invention further relates to molded articles prepared from the compounded rubber composition of the present invention.

U.S. Pat. No. 6,054,533 discloses a compatibilized blend of a thermoplastic elastomer and a polyolefin. The compatibilizer is a thermoplastic polyurethane formed by the reaction of a substantially hydrocarbon intermediate such as a polybutadiene polyol, a diisocyanate such as MDI, and an amine or diol chain extender, such as neopentyl glycol. The compatibilizer has high amounts of soft segments therein, and imparts improved properties to blends of a thermoplastic elastomer and polyolefin, such as good impact resistance, good tensile strength, good tear resistance, and good delamination resistance.

U.S. Pat. No. 6,469,099 discloses a blend of a polymeric hydrocarbon and a thermoplastic polyurethane which is compatibilized with a polymeric hydrocarbon that contains low concentrations of isocyanate reactive group. The compatibilizer can be prepared by reacting a modified polymer having pendant, or incorporated, amine-reactive groups, with a hydroxyl amine, a diamine, or a polyethermonoamine. The compatibilized blend may further include a non-TPU engineering thermoplastic to form compatible blends of the polymeric hydrocarbon and the non-TPU engineering thermoplastic.

International Publication No. WO 00/63293 discloses a thermoplastic polyurethane/olefin-graft polymer blend with an optional compatibilizing polymer. The compatibilizing polymer is a modified polyolefin selected from ionomers, and block and graft olefin polymers that have an unsaturated organic compound in the main or side chain.

European Application No. 0347794A1 discloses a thermoplastic compatible blended composition comprising: (A) from 15 to 60 weight percent of a polyolefin, (B) from 30 to 70 weight percent of a thermoplastic polyurethane, and (C) from 10 to 35 weight percent of at least one modified polyolefin, defined as a random, block or graft olefin copolymer, having in a main or side chain thereof a functional group selected from carboxylic acid, carboxylate ester, carboxylic acid anhydride, carboxylate salts, amide, epoxy, hydroxy, or acyloxy.

Additional compositions are disclosed in International Publication No. WO 96/27622; U.S. Pat. Nos. 4,883,837; 5,623,019; and U.S. Publication No. 2004/0106744.

There remains a need for improved, low cost polyolefin/polyurethane compositions containing low levels, preferably less than 10 weight percent (based on total weight of composition), compatibilizers, and that can be used to for, articles, such as sheets and films, and which have high surface energies, preferably greater than 30 dyne/cm, and good adhesion properties. There is an additional need for low cost compatiblized compositions that have improved heat aging performance, and are particularly suited for automotive interior applications that experience elevated temperatures (as high as 120° C.). There is a further need for such compositions that can be used in automotive interior applications (thermoformed skins), and which provide one or more of the following properties: a luxurious feel, lower gloss, and improved grain replication required for negative pressure thermoforming processes.

There are additional needs for suitable thermoplastic polyolefin compositions, which can be used to form sheets that do not require a polyurethane top-coating for gloss or scratch control, and which have good adhesion to polyurethane foams. There is also a need to develop a weatherable, low gloss and/or good scratch mar resistance sheet that has good adhesion to PU foams, PU adhesives and coatings. Some of these needs and others have been met by the following invention.

SUMMARY OF THE INVENTION

The invention provides a composition comprising the following:
A) at least one olefin-based polymer, at least one halogenated ethylene-based polymer, or at least one elastomer rubber;
B) at least one thermoplastic polyurethane; and
C) at least one polydiene-based polyurethane.

In another embodiment, the invention provides a composition comprising the following:
A) at least one olefin-based polymer, at least one halogenated ethylene-based polymer, or at least one elastomer rubber;
B) at least one thermoplastic polyurethane; and
C) at least one polydiol-based polyurethane.

In one aspect, the at least one olefin-based polymer is selected from the group consisting of the following: homogeneously branched linear ethylene/α-olefin interpolymers, homogeneously branched substantially linear ethylene/α-olefin interpolymers, ethylene/α-olefin interpolymers having a PRR greater than, or equal to 4, and propylene-based interpolymers.

In another aspect, the olefin-based polymer is a propylene-based interpolymer has at least one of the following properties:
(i) $^{13}C$ NMR peaks corresponding to a regio-error at about 14.6 and about 15.7 ppm, the peaks of about equal intensity,
(ii) a skewness index, $S_{ix}$, greater than about −1.20,
(iii) a DSC curve with a $T_{me}$ that remains essentially the same, and a $T_{Max}$ that decreases as the amount of comonomer in the interpolymer is increased, and
(iv) an X-ray diffraction pattern that reports more gamma-form crystals than a comparable interpolymer prepared with a Ziegler-Natta catalyst.

DETAILED DESCRIPTION OF THE INVENTION

Overview

As discussed above, the invention provides a composition comprising the following:
A) at least one olefin-based polymer, at least one halogenated ethylene-based polymer, or at least one elastomer rubber;
B) at least one thermoplastic polyurethane; and
C) at least one polydiene- or polydiol-based polyurethane.

In one embodiment, component C) is a polydiene-based polyurethane. In a preferred embodiment, the polydiene-based polyurethane is a polydiene diol-based polyurethane. In a further embodiment, the polydiene diol-based polyurethane is a polybutadiene diol or polyisoprene diol or a combination thereof, and preferably a polybutadiene diol.

In another embodiment, component C) is a polydiol-based polyurethane. In a further embodiment, the polydiol-based polyurethane comprises at least one diol made from one or more seed oil triglycerides selected from the group consisting of palmitic, stearic, oleic, linoleic and linolenic acid or ester.

Examples of the polydiol-based polyurethanes include, but are not limited to, polyurethanes formed from polyester polyols and seed oil-based polyols.

In one embodiment, the polydiene-based polyurethane and, preferably, a polydiene diol-based polyurethane, is formed from at least one aliphatic or cyclo-aliphatic diisocyanate. In a further embodiment, both the polydiene-based polyurethane, and preferably a polydiene diol-based polyurethane, and the thermoplastic polyurethane are each, independently, formed from at least one aliphatic diisocyanate.

In another embodiment, the polydiol-based polyurethane is formed from at least one aliphatic or cyclo-aliphatic diisocyanate. In a further embodiment, both the poly diol-based polyurethane and the thermoplastic polyurethane are each, independently, formed from at least one aliphatic diisocyanate. In yet a further embodiment, the polydiol-based polyurethane comprises at least one diol made from one or more seed oil triglycerides selected from the group consisting of palmitic, stearic, oleic, linoleic and linolenic acid or ester.

In a preferred embodiment, the at least one olefin-based polymer is selected from the group consisting of the following: homogeneously branched linear ethylene/α-olefin interpolymers, homogeneously branched substantially linear ethylene/α-olefin interpolymers, ethylene/α-olefin interpolymers having a PRR greater than, or equal to 4, and propylene-based interpolymers.

In a further embodiment, the olefin-based polymer is a propylene-based interpolymer that has at least one of the following properties:
(i) $^{13}C$ NMR peaks corresponding to a regio-error at about 14.6 and about 15.7 ppm, the peaks of about equal intensity,
(ii) a skewness index, $S_{ix}$, greater than about −1.20,
(iii) a DSC curve with a $T_{me}$ that remains essentially the same, and a $T_{Max}$ that decreases as the amount of comonomer in the interpolymer is increased, and
(iv) an X-ray diffraction pattern that reports more gamma-form crystals than a comparable interpolymer prepared with a Ziegler-Natta catalyst.

In one embodiment, the at least one polydiene- or polydiol-based polyurethane is present in an amount less than, or equal to, 20 weight percent, based on the total weight of the composition. In another embodiment, the at least one polydiene- or polydiol-based polyurethane is present in an amount less than, or equal to, 10 weight percent, based on the total weight of the composition.

In one embodiment, the at least one polydiene- or polydiol-based polyurethane has a density from 0.90 g/cc to 1.3 g/cc. In one embodiment, the at least one polydiene- or polydiol-based polyurethane has a melt index ($I_2$) from 1 g/10 min to 300 g/10 min. In one embodiment, the at least one polydiene- or polydiol-based polyurethane has a number average molecular weight from 500 g/mole to 1,000,000 g/mole.

In one embodiment, the at least one polydiene- or polydiol-based polyurethane is formed from a composition that comprises from 15 to 40 weight percent of a diisocyanate, based on the total weight of the composition. In one embodiment, the diisocyanate is an aromatic diisocyanate.

In another embodiment, the at least one polydiene- or polydiol-based polyurethane is formed from a composition that comprises from 50 to 75 weight percent of a polydiene diol, based on the total weight of the composition.

In one embodiment, the at least one polydiene- or polydiol-based polyurethane is formed from a composition that comprises from 5 to 15 weight percent of a chain extender, based on the total weight of the composition.

In one embodiment, Component A is a homogeneously branched linear or substantially linear ethylene/α-olefin interpolymer. In a further embodiment, the α-olefin is a $C_3$-$C_{20}$ α-olefin. In another embodiment, the α-olefin is selected from the group consisting of 1-propene, 1-butene, 1-hexene, 1-octene, or mixtures thereof.

In one embodiment, the ethylene/α-olefin interpolymer has a density from 0.85 g/cc to 0.94 g/cc. In one embodiment, the ethylene/α-olefin interpolymer has a melt index ($I_2$) from 0.1 g/10 min to 200 g/10 min. In one embodiment, the ethylene/α-olefin interpolymer has a PRR greater than, or equal to, 4.

In one embodiment, Component A is a propylene-based polymer. In a further embodiment, the propylene-base polymer is a propylene/ethylene interpolymer or a propylene/α-olefin interpolymer, and wherein the α-olefin is a $C_4$-$C_{20}$ α-olefin. In another embodiment, the propylene-base polymer is a propylene/ethylene interpolymer. In another embodiment, the propylene/ethylene interpolymer has a density from 0.85 g/cc to 0.90 g/cc. In another embodiment, the propylene/ethylene interpolymer has a melt flow rate (MRF) from 0.5 g/10 min to 300 g/10 min.

In one embodiment, the propylene-based interpolymer has at least one of the following properties:
(i) $^{13}C$ NMR peaks corresponding to a regio-error at about 14.6 and about 15.7 ppm, the peaks of about equal intensity,
(ii) a skewness index, $S_{ix}$, greater than about −1.20, and
(iii) a DSC curve with a $T_{me}$ that remains essentially the same, and a $T_{Max}$ that decreases as the amount of comonomer in the interpolymer is increased.

In one embodiment, the propylene-based interpolymer has at least one of the following properties:
(i) $^{13}C$ NMR peaks corresponding to a regio-error at about 14.6 and about 15.7 ppm, the peaks of about equal intensity, and
(ii) a skewness index, $S_{ix}$, greater than about −1.20.

In one embodiment, the propylene-based interpolymer has a
(i) $^{13}C$ NMR peaks corresponding to a regio-error at about 14.6 and about 15.7 ppm, the peaks of about equal intensity.

In one embodiment, the propylene-based interpolymer is a propylene/α-olefin interpolymer. In one embodiment, the propylene-based interpolymer is a propylene/ethylene interpolymer.

In one embodiment, the at least one thermoplastic polyurethane comprises chemical units derived from a polyester, and at least one aromatic diisocyanate or at least one aliphatic diisocyanate.

In one embodiment, the at least one thermoplastic polyurethane comprises chemical units derived from a polyester, and at least one aromatic diisocyanate.

In one embodiment, the at least one thermoplastic polyurethane comprises chemical units derived from a polyester, and at least one aliphatic diisocyanate.

In one embodiment, the at least one thermoplastic polyurethane comprises chemical units derived from a polyester and a mixture of 1,3-bis(isocyanatomethyl)-cyclohexane and 1,4-bis(isocyanatomethyl)cyclohexane. In a further embodiment, the weight ratio of the 1,3-bis(isocyanatomethyl)cyclohexane to the 1,4-bis(isocyanatomethyl)cyclohexane is about 1 to 1.

In one embodiment, the polyester is formed from caprolactone.

In one embodiment, the thermoplastic polyurethane comprises a monomeric unit derived from caprolactone. In one embodiment, the thermoplastic polyurethane comprises a monomeric unit derived from diol derivative, derived from N-octyl pyrrolidone. In one embodiment, the thermoplastic polyurethane comprises a monomeric unit derived from polytetramethylene ether glycol. In one embodiment, the thermoplastic polyurethane comprises a monomeric unit derived from a polyether.

In one embodiment, the thermoplastic polyurethane is a PELLETHANE™ polyurethane.

In one embodiment, the at least one thermoplastic polyurethane has a density from 0.90 g/cc to 1.3 g/cc. In one embodiment, the at least one thermoplastic polyurethane has a melt index ($I_2$) from 1 g/10 min to 10 g/10 min.

In one embodiment, an inventive composition comprises one or more additives.

In one embodiment, an inventive composition further comprises a polar polymer selected from the group consisting of polyesters, polyamides, polyethers, polyetherimides, polyvinylalcohols, polycarbonates, polyurethanes, polylactic acids, and polyamide esters.

The invention also provides an article comprising at least one component formed from the composition of any of the preceding claims.

In one embodiment, the article is an sheet, a carpet, an adhesive, a wire sheath, a cable, a protective apparel, an automotive part, a footwear component, a coating, or a foam laminate, an automotive skin, an awning, a tarp, a roofing construction article, a steering wheel, a powder coating, a powder slush molding, a consumer durable, a grip, a handle, a computer component, a belt, an appliqué, a footwear component, a conveyor or timing belt, or a fabric.

In another embodiment, the article is a tie layer between extruded sheets, a tie layer between extruded films, a tie layer between extruded profiles, a tie layer between cast sheets, tie layer between cast films, or tie layer between cast profiles.

The invention also provides an extruded sheet formed from an inventive composition. In a further embodiment, the sheet has a surface energy greater than, or equal to, 30 dyne/cm, preferably greater than, or equal to, 33 dyne/cm, more preferably greater than, or equal to 35 dyne/cm. in another embodiment, the sheet has a thickness from 10 mils to 1000 mils, preferably from 15 mils to 500 mils, and more preferably from 20 mils to 100 mils.

The invention also provides a painted substrate, wherein the substrate is formed from an inventive composition. In one embodiment, the paint comprises at least one additive of selected from the group consisting of an acrylic polymer, an alkyd resin, a cellulose-based material, a melamine resin, a urethane resin, a carbamate resin, a polyester resin, a vinyl acetate resin, a polyol and an alcohol. In another embodiment, the paint is a water-based paint. In another embodiment, the paint is an organic solvent based.

The invention also provides an over-molded article comprising the following: (a) a substrate formed from a composition comprising a polar polymer, and (b) a molded overlay formed from an inventive composition. In one embodiment, the polar polymer is a polycarbonate.

The invention also provides an over-molded article comprising the following: (a) a substrate formed from an inventive composition, and (b) a molded overlay formed from a composition comprising a polar polymer. In one embodiment, the article is in the form of a grip, handle or belt.

The invention also provides a laminated structure comprising a first layer and a second layer, and wherein the first layer is formed from an inventive composition, and wherein the second layer is formed from a composition comprising a polar polymer. In one embodiment, one of the layers is in the form of a foam. In another embodiment, one of the layers is in the form of a fabric. In another embodiment, the laminated structure is in the form of an awning, tarp or automobile skin or steering wheel. In another embodiment, the second layer is formed from a composition comprising a polycarbonate.

The invention also provides a molded article comprising a first component and a second component, and wherein the first component is formed from a composition comprising a polar polymer, and wherein the second component is formed from an inventive composition. In one embodiment, the article is in the form of an automobile skin, an appliqué, a footwear component, a conveyor belt, a timing belt or a consumer durable.

The invention also provides a dispersion comprising an inventive composition. In one embodiment, the dispersion further comprises at least one additive selected from the group consisting of an acrylic polymer, an alkyd resin, a cellulose-based material, a melamine resin, a urethane resin, a carbamate resin, a polyester resin, a vinyl acetate resin, an epoxy a polyol, an alcohol, and combinations thereof In another embodiment, the dispersion is a water-based dispersion. In another embodiment, the dispersion is an organic solvent-based dispersion.

The invention also provides an injection molded article comprising at least one component formed from an inventive composition.

The invention also provides an RF welded article comprising at least one component formed from an inventive composition.

The invention also provides a molded article comprising a first component and a second component, and wherein the first component is formed from a composition comprising a polar polymer, and wherein the second component is formed from an inventive composition. In one embodiment, the article is in the form of an automobile skin, an appliqué, a footwear component, a conveyor belt, a timing belt, artificial leather, or a consumer durable.

The invention also provides a footwear article comprising at least one component formed from an inventive composition. In one embodiment, the article is selected from the group consisting of shoe outsole, shoe midsole, shoe unitsole, an overmolded article, a natural leather article, a synthetic leather article, an upper, a laminated article, a coated article, a boot, a sandal, galoshes, a plastic shoe, and combinations thereof.

The invention also provides a thermoformed sheet comprising at least one layer formed from an inventive composition.

The invention also provides an automotive part comprising at least one layer formed from an inventive composition. In one embodiment, the part is an instrument panel or a door panel.

The invention also provides artificial leather comprising at least one component formed from an inventive composition.

The invention also provides an artificial turf comprising at least one component formed from an inventive composition.

The invention also provides an adhesive comprising at least one component formed from an inventive composition. The invention also provides a coated substrate comprising an inventive adhesive, and at least one component formed from Kevlar.

The invention also provides a method of making an inventive composition, said method comprising melt mixing Components A, B and C. In one embodiment, Components A, B and C are mixed simultaneously. In another embodiment, Components A, B and C are mixed sequentially, in any order. In another embodiment, the melt mixing takes place in an extruder. In another embodiment, the melt mixing takes place in an "in-line" compounding process. "In-line compounding process" and like terms mean a process, typically continuous, in which the components of the composition are continuously fed to and mixed within an extruder or like piece of equipment from which a composition comprising the mixed components is discharged and, optionally, is further processed into an article of manufacture, e.g., a film, sheet, fiber, etc.

An inventive composition may comprise a combination of two or more embodiments as described herein.

A polymer component of an inventive composition may comprise a combination of two or more embodiments as described herein.

An inventive article may comprise a combination of two or more embodiments as described herein.

An inventive method may comprise a combination of two or more embodiments as described herein.

Polydiene- and Polydiol-Based Polyurethanes

Suitable polydiene-based polyurethanes for use in the inventive compositions are described in International Publication No. WO 2007/033117 and International Application No. PCT/US2006/035384, each fully incorporated herein by reference. "Polydiene-based thermoplastic polyurethane", "polydiene-based polyurethane", "pd-TPU" and like terms mean a polyurethane polymer formed, in part, from a polydiene containing at least one isocyanate-reactive group, e.g., hydroxyl and/or amine, preferably a hydroxyl group. "Polydiene diol-based thermoplastic polyurethane", "polydiene diol-based polyurethane" and like terms mean a polyurethane polymer formed, in part, from a polydiene diol containing at least two hydroxyl groups. "Diol-based thermoplastic polyurethane", "d-TPU" and like terms mean a polyurethane polymer formed, in part, from a diol. The diol can be either a natural-sourced diol or a pd-TPU.

In one embodiment, component C) is a polydiene-based polyurethane. In a preferred embodiment, the polydiene-based polyurethane is a polydiene diol-based polyurethane. In a further embodiment, the polydiene diol-based polyurethane is a polybutadiene diol or polyisoprene diol or a combination thereof, and preferably a polybutadiene diol.

In another embodiment, component C) is a polydiol-based polyurethane. In a further embodiment, the polydiol-based polyurethane comprises at least one diol made from one or more seed oil triglycerides selected from the group consisting of palmitic, stearic, oleic, linoleic and linolenic acid or ester.

In one embodiment, the polydiene- or polydiol-based polyurethane has a density less than, or equal to, 1.00 g/cc, preferably less than, or equal to, 0.99 g/cc, and more preferably less than, or equal to, 0.98 g/cc. In another embodiment, the polydiene-based polyurethane has a density greater than, or equal to, 0.94 g/cc, preferably greater than, or equal to, 0.95 g/cc, and more preferably greater than, or equal to, 0.96 g/cc. In another embodiment, the polydiene-based polyurethane has a density from 0.94 g/cc to 1.00 g/cc, preferably from 0.96 g/cc to 0.99 g/cc, and more preferably from 0.96 g/cc to 0.98 g/cc.

In one embodiment, the polydiene- or polydiol-based polyurethane has a melt index ($I_2$) less than, or equal to, 20 g/10 min, preferably less than, or equal to, 15 g/10 min, and more preferably less than, or equal to, 10 g/10 min. In another embodiment, the polydiene-based polyurethane has a melt index ($I_2$) greater than, or equal to, 0.5 g/10 min, preferably greater than, or equal to, 1 g/10 min, and more preferably greater than, or equal to, 2 g/10 min. In another embodiment, the polydiene-based polyurethane has a melt index ($I_2$) from 0.5 g/10 min to 20 g/10 min, preferably from 1 g/cc to 15 g/10 min, and more preferably from 2 g/cc to 10 g/10 min.

In one embodiment, the polydiene- or polydio-based polyurethane contains a hard segment formed from a polydiisocyanate, in an amount from 20 to 40 weight percent, and preferably from 25 to 35 weight percent, based on the total weight of the polyurethane.

In a one embodiment, the polydiene-based polyurethane is a polydiene diol that is formed from conjugated dienes having 4 to 24 carbons, and preferably having 4 to 8 carbons. Typical dienes include butadiene and isoprene, and typical polydienes include polybutadiene and polyisoprene, and hydrogenated polybutadiene and hydrogenated polyisoprene. In a preferred embodiment, these polydienes have at least one, and more preferably at least two, hydroxyl groups in the molecule, and typically have a Mn from 500 to 10,000, more preferably from 1,000 to 5,000, and even more preferably from 1,500 to 3,000 g/mol. Preferably, the polydiene diol is a polybutadiene diol or a polyisoprene diol, and more preferably a polybutadiene diol.

In another embodiment, the polydiene-based polyurethane is a polydiene diol-based polyurethane, and is formed from a composition comprising 15 to 40 weight percent of di-isocyanate, 50 to 75 weight percent of a polydiene diol, and 5 to 15 weight percent of a chain extender, each wt % based on the total weight of the composition. In a further embodiment, the polydiene diol is a polybutadiene diol or a polyisoprene diol, and preferably is a polybutadiene diol. In a further embodiment, the di-isocyanate is an aliphatic or aromatic di-isocyanate, preferably an aromatic di-isocyanate, and more preferably 4,4'-diphenylmethane di-isocyanate. In yet a further embodiment, the chain extender is an aliphatic diol. In another embodiment, the polydiene diol has a Mn from 500 to 10,000, more preferably from 1,000 to 5,000 and even more preferably from 1,500 to 3,000, g/mol. In another embodiment, the polydiene diol is non-hydrogenated. In another embodiment, the polydiene diol is hydrogenated. In another embodiment, the polydiene diol is partially hydrogenated.

In another embodiment, the polydiol-based polyurethane is formed from a natural-sourced diol. As here used, "natural-sourced diol", "natural oil polyols" and like terms mean a diol derived from an agricultural product, e.g., seed oils such soy, sunflower, corn and canola. Such a diol may or may not contain dienic unsaturation. The composition of seed oil triglycerides is well understood. Triglycerides are fatty acid esters of glycerin, and the composition depends on the source of the oil. The nomenclature used is standard in the fats and oils industry, with the number of carbons in the fatty acid indicated first, followed by the number of sites of unsaturation in parentheses. Representative oils include palmitic, stearic, oleic, linoleic and linolenic. For the purpose of making polyols from these triglycerides, oils which contain a high level of unsaturation are desirable. Oils such as soy, canola and sunflower are acceptable due to the relatively low levels of saturated fatty acids that they contain, while feedstocks such as palm oil are considered unusable without further purification or refinement due to high levels of saturated fatty acids.

The polydiene-based polyurethane may contain a combination of two or more embodiments as described above.

The polyurethanes of the present invention are each independently prepared from a polydiol or a functional polydiene containing at least one (preferably about two) "isocyanate-reactive group(s)" attached at the ends of the molecule or attached pendantly within the molecule. This functionality may be any of the groups that react with isocyanates to form covalent bonds. This functionality preferably contains "active hydrogen atoms," with typical examples being hydroxyl, primary amine, secondary amine, sulfhydryl, and mixtures thereof. The term "active hydrogen atoms" refers to hydrogen atoms that, because of their placement in a molecule, display activity according to the Zerewitinoff test, as described by Kohler in J. Am. Chemical Soc., 49, 31-81 (1927), incorporated herein by reference. The content of the unsaturated segment in the polyurethane is from 1 to 95 weight percent, preferably from 5 to 70 weight percent, and preferably from 10 to 50 weight percent, based on the total weight of the polyurethane. In a preferred embodiment, the polyurethane component is prepared from a polydiene diol. In another embodiment, the polyurethane is prepared from a functionalized polydiene, which contains "isocyanate reactive groups" other than hydroxyl.

One method for preparing such functional polydienes is a two-step process in which a conjugated diene is grown by anionic polymerization from both ends of a difunctional initiator. The molecular weight of the polydiene is controlled by the molar ratio of the conjugated diene to the initiator. In the second step, the ends are then capped with alkylene oxide (such as ethylene oxide or propylene oxide) to produce an unsaturated diol. This particular process is described in U.S. Pat. No. 4,039,593, incorporated herein by reference. In such processes, it is possible to add excess alkylene oxide and form short poly(alkylene oxide) chains at the ends of the polydiene. Such materials are within the scope of this invention.

The conjugated dienes used to prepare the functional polydiene typically contains from 4 to 24 carbons, and preferably from 4 to 8 carbons. Typical dienes include butadiene and isoprene, and typical functional polydienes are polybutadiene and polyisoprene, each capped at each end with ethylene oxide. These polydienes have at least one functional group per molecule, and typically have a number average molecular weight (Mn) from 500 to 10,000 grams per mole (g/mol), and preferably from 500 to 5,000 g/mol. The functional group is preferably a hydroxyl group. Two preferred polydiene diols are polybutadiene diol and polyisoprene diol, and more preferably polybutadiene diol.

In one embodiment, the at least one polydiene diol-based polyurethane is formed from a non-hydrogenated polydiene diol. In another embodiment, the at least one polydiene diol-based polyurethane is formed from a hydrogenated polydiene diol. In another embodiment, the at least one polydiene diol-based polyurethane is formed from a partially hydrogenated polydiene diol.

The term "hydrogenation" is known in the art, and is used in reference to the hydrogenation (reaction of hydrogen with alkene groups) of double bonds within the polydiene diol, and is in reference to the final (hydrogenated) product. The term "hydrogenation" refers to the complete hydrogenation of all the double bonds, or the near complete hydrogenation (approximately greater than 95 mole percent) of the double bonds, within the polydiene diol. The term "partial hydrogenation," is used in reference to a hydrogenation reaction, and the final product, both in which a significant amount (approximately greater than 5 mole percent) of the double bonds, within the polydiene diol, are not hydrogenated.

The polyurethane used in the practice of the present invention is prepared by reacting the functional polydiene with an isocyanate and optionally a chain extender. In the 'prepolymer' method, typically one or more functional polydienes are reacted with one or more isocyanates to form a prepolymer. The prepolymer is further reacted with one or more chain extenders. Alternatively, the polyurethanes may be prepared by a one-shot reaction of all of the reactants. Typical polyurethanes have a number average molecular weight from 5,000 to 1,000,000 g/mol, preferably from 10,000 to 500,000 g/mol, and more preferably from 20,000 to 100,000 g/mol.

Some examples of polydiene diols, and corresponding polyurethanes, are described in Pytela et al, "Novel Polybutadiene Diols for Thermoplastic Polyurethanes," International Polyurethane Conference, PU Lat. Am. 2001; and in Pytela et al, "Novel Thermoplastic Polyurethanes for Adhesives and Sealants," Adhesives & Sealant Industry, June 2003, pp. 45-51; each fully incorporated herein by reference. Some examples of some hydrogenated polydiene diols, and corresponding polyurethanes, are described in WO 99/02603, and corresponding European Patent EP 0 994 919 B1; each fully incorporated herein by reference. As discussed in these references, the hydrogenation may be carried out by a variety of established processes, including hydrogenation in the presence of catalysts as Raney Nickel, noble metals, such as platinum, soluble transition metal catalysts and titanium catalysts, as in U.S. Pat. No. 5,039,755, fully incorporated herein by reference. Also, the polymers may have different diene blocks and these diene blocks may be selectively hydrogenated as described in U.S. Pat. No. 5,229,464, fully incorporated herein by reference.

Di-isocyanates suitable for use in preparing the hard segment of the polyurethanes according to this invention include aromatic, aliphatic, and cycloaliphatic di-isocyanates, and combinations of two or more of these compounds. An example of a structural unit derived from di-isocyanate (OCN—R—NCO) is represented by formula (I) below:

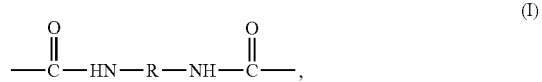

in which R is an alkylene, cycloalkylene, or arylene group. Representative examples of these di-isocyanates can be found in U.S. Pat. Nos. 4,385,133, 4,522,975 and 5,167,899, each fully incorporated herein by reference.

Preferred di-isocyanates include, but are not limited to, 4,4'-di-isocyanato-diphenylmethane, p-phenylene di-isocyanate, 1,3-bis(isocyanatomethyl)-cyclohexane, 1,4-di-isocyanato-cyclohexane, hexamethylene di-isocyanate, 1,5-naphthalene di-isocyanate, 3,3'-dimethyl-4,4'-biphenyl di-isocyanate, 4,4'-di-isocyanato-dicyclohexylmethane, and 2,4-toluene di-isocyanate. More preferred are 4,4'-di-isocyanato-dicyclohexylmethane and 4,4'-di-isocyanato-diphenylmethane. In one embodiment, the di-isocyanate is 4,4'-di-isocyanato-diphenylmethane.

Di-isocyanates also include aliphatic and cycloaliphatic isocyanate compounds, such as 1,6-hexamethylene-di-isocyanate; ethylene di-isocyanate; 1-isocyanato-3,5,5-trimethyl-1-3-isocyanatomethylcyclohexane; 2,4- and 2,6-hexahydrotoluenedi-isocyanate, as well as the corresponding isomeric mixtures; 4,4'-, 2,2'- and 2,4'-dicyclohexyl-methanedi-isocyanate, as well as the corresponding isomeric mixtures. Also, 1,3-tetramethylene xylene di-isocyanate can be used with the present invention. The isocyanate may be selected from organic isocyanates, modified isocyanates, isocyanate-based pre-polymers, and mixtures of two or more of these isocyanates.

In one embodiment, the polydiene-based polyurethane and, preferably, a polydiene diol-based polyurethane, is formed from at least one aliphatic or cyclo-aliphatic diisocyanate. In a further embodiment, both the polydiene-based polyurethane, and preferably a polydiene diol-based polyurethane, and the thermoplastic polyurethane are each, independently, formed from at least one aliphatic diisocyanate.

In another embodiment, the polydiol-based polyurethane is formed from at least one aliphatic or cyclo-aliphatic diisocyanate. In a further embodiment, both the poly diol-based polyurethane and the thermoplastic polyurethane are each, independently, formed from at least one aliphatic diisocyanate. In yet a further embodiment, the polydiol-based polyurethane comprises at least one diol made from one or more seed oil triglycerides selected from the group consisting of palmitic, stearic, oleic, linoleic and linolenic acid or ester.

As discussed above, the polyurethanes can be prepared by mixing all ingredients, at essentially the same time, in a "one-shot" process, or can be prepared by step-wise addition of the ingredients, in a "prepolymer process," with the processes being carried out in the presence of, or without the addition of, optional additives. The polyurethane forming reaction can take place in bulk, or in solution, with, or without, the addition of a suitable catalyst that would promote the reaction of isocyanates with hydroxyl or other functionality. Examples of a typical preparation of these polyurethanes are described in U.S. Pat. No. 5,864,001, fully incorporated herein by reference.

The other main component of the hard segment of the polyurethanes of the present invention is at least one chain extender, which are well know in this technology field. As is known, when the chain extender is a diol, the resulting product is a thermoplastic polyurethane (TPU). When the chain extender is a diamine or an amino alcohol, the resulting product is technically a thermoplastic polyurea (TPUU).

The chain extenders that may be used in the invention are characterized by two or more, preferably two, functional groups, each of which contains "active hydrogen atoms." These functional groups are preferably in the form of hydroxyl, primary amino, secondary amino, or mixtures of two or more of these groups. The term "active hydrogen atoms" refers to hydrogen atoms that, because of their placement in a molecule, display activity according to the Zerewitinoff test as described by Kohler in J. Am. Chemical Soc., 49, 31-81 (1927).

The chain extenders may be aliphatic, cycloaliphatic, or aromatic, and are exemplified by diols, diamines, and amino alcohols. Illustrative of the difunctional chain extenders are ethylene glycol, diethylene glycol, propylene glycol, dipropylene glycol, 1,3-propanediol, 1,3-butanediol, 1,4-butanediol, 1,5-pentanediol and other pentane diols, 2-ethyl-1,3-hexanediol, 2-ethyl-1,6-hexanediol, other 2-ethyl-hexanediols, 1,6-hexanediol and other hexanediols, 2,2,4-trimethylpentane-1,3-diol, decanediols, dodecanediols, bisphenol A, hydrogenated bisphenol A, 1,4-cyclohexanediol, 1,4-bis(2-hydroxyethoxy)-cyclohexane, 1,3-cyclohexanedimethanol, 1,4-cyclohexanediol, 1,4-bis(2-hydroxyethoxy)benzene, Esterdiol 204 (propanoic acid, 3-hydroxy-2,2-dimethyl-, 3-hydroxy-2,2-dimethylpropyl ester available from TCI America), N-methylethanolamine, N-methyl isopropylamine, 4-aminocyclohexanol, 1,2-diaminotheane, 1,3-diaminopropane, diethylenetriamine, toluene-2,4-diamine, and toluene-1,6-diamine. Aliphatic compounds containing from 2 to 8 carbon atoms are preferred. If thermoplastic or soluble polyurethanes are to be made, the chain extenders will be difunctional in nature. Amine chain extenders include, but are not limited to, ethylenediamine, monomethanolamine, and propylenediamine.

Commonly used linear chain extenders are generally diol, diamine or amino alcohol compounds characterized by having a molecular weight of not more than 400 g/mol (or Dalton). In this context, by "linear," it is meant that no branching from tertiary carbon is included. Examples of suitable chain extenders are represented by the following formulae: HO—$(CH_2)_n$—OH, $H_2N$—$(CH_2)_n$—$NH_2$, and $H_2N$—$(CH_2)_n$—OH, where "n" is typically a number from 1 to 50.

One common chain extender is 1,4-butane diol ("butane diol" or "BDO"), and is represented by the following formula: HO—$CH_2CH_2CH_2CH_2$—OH. Other suitable chain extenders include ethylene glycol; diethylene glycol; 1,3-propanediol; 1,6-hexanediol; 1,5-heptanediol; triethyleneglycol; and combinations of two or more of these extenders.

Also suitable, are cyclic chain extenders, which are generally diol, diamine or amino alcohol compounds, characterized by having a molecular weight of not more than 400 g/mol. In this context, by "cyclic," it is meant a ring structure, and typical ring structures include, but are not limited to, the 5 to 8 member ring structures with hydroxyl-alkyl branches. Examples of cyclic chain extender are represented by the following formulae: HO—R-(ring)-R'—OH and HO—R—O-(ring)-O—R'—OH, where R and R' are one to five carbon alkyl chains, and each ring has 5 to 8 members, preferably all carbons. In these examples, one or both of the terminal —OH can be replaced with —NH2. Suitable cyclic chain extenders include cyclohexane dimethanol ("CHDM") and hydroquinone bis-2-hydrxyethyl ether (HQEE). A structural unit of CHDM, a preferred cyclic chain extender, is represented by the following formula: HO—$CH_2$-(cyclohexane ring)-$CH_2$—OH.

The chain extender is incorporated into the polyurethane in amounts determined by the selection of the specific reactant components, the desired amounts of the hard and soft segments, and the index sufficient to provide good mechanical properties, such as modulus and tear strength. The polyurethane compositions used in the practice of this invention may contain from 2 to 25, preferably from 3 to 20 and more preferably from 4 to 18, weight percent of the chain extender component, based on the weight of the composition.

If desired, optionally, small amounts of monohydroxyl-functional or monoaminofunctional compounds, often termed "chain stoppers," may be used to control molecular weight. Illustrative of such chain stoppers are the propanols, butanols, pentanols, and hexanols. When used, chain stoppers are typically present in minor amounts from 0.1 to 2 weight percent of the entire reaction mixture leading to the polyurethane composition.

As is well known to those skilled in the art, the ratio of isocyanate to total functional groups determines the Mn of the polymer. In some cases it is desirable to use a very slight excess of isocyanate.

For linear, high Mn polymers, starting materials with two functional groups per chain are desirable. However, it is possible to accommodate starting materials with a range of functionality. For example, a polydiene with one functional end could be used to cap both ends of a polyurethane with a middle portion consisting of repeating isocyanate-chain extender moieties. Polydienes with more than two functional groups will form branched polymers. Although crosslinking and gels can be a problem, if the degree of functionality is too high, this can usually be controlled by process conditions. Such branched polymers will exhibit some rheological characteristics that are desirable in some cases, such as high melt strength.

Optionally, catalysts that will promote or facilitate the formation of urethane groups may be used in the formulation. Illustrative of useful catalysts are stannous octanoate, dibutyltin dilaurate, stannous oleate, tetrabutyltin titanate, tributyltin chloride, cobalt naphthenate, dibutyltin oxide, potassium oxide, stannic chloride, N,N,N,N'-tetramethyl-1,3-butanediamine, bis[2-(N,N-dimethylamino)ethyl]ether, 1,4-diazabicyclo[2.2.2]octane; zirconium chelates, aluminum chelates and bismuth carbonates. The catalysts, when used, are typically employed in catalytic amounts that may range from 0.001 wt %, and lower, to 2 wt %, and higher, based on the total amount of polyurethane-forming ingredients.

Additives may optionally be used to modify the properties of the polyurethane used in the practice of this invention. Additives may be included in the conventional amounts, as already known in the art and literature. Usually additives are used to provide specific desired properties to the polyurethanes, such as various antioxidants, ultraviolet inhibitors, waxes, thickening agents and fillers. When fillers are used, they may be either organic or inorganic, but are generally inorganic, such as clay, talc, calcium carbonate, silica and the like. Also, fibrous additives, such as glass or carbon fiber, may be added to impart certain properties.

In a preferred embodiment of the invention, the polyurethane is formed from a polydiene diol, an isocyanate and a chain extender, and preferably an aliphatic chain extender. In another embodiment, the polydiene diol-based polyurethane is hydrogenated.

In a further embodiment, the polydiene diol is formed from conjugated dienes having 4 to 24 carbons, and preferably having 4 to 8 carbons. As discussed above, typical dienes include butadiene and isoprene, and typical polydienes include polybutadiene and polyisoprene, and hydrogenated polybutadiene and hydrogenated polyisoprene. In a preferred embodiment, these polydienes have at least one, and more preferably at least two, hydroxyl groups in the molecule, and typically have a Mn from 500 to 10,000, more preferably from 1,000 to 5,000 and even more preferably from 1,500 to 3,000 g/mol. Preferably, the polydiene diol is a polybutadiene diol or a polyisoprene diol, and more preferably a polybutadiene diol.

In another embodiment, the polydiene diol-based polyurethane is formed from a composition comprising 15 to 40 weight percent of di-isocyanate, 50 to 75 weight percent of a polydiene diol, and 5 to 15 weight percent of a chain extender, based on the weight of the composition. In a further embodiment, the polydiene diol is a polybutadiene diol or a polyisoprene diol, and preferably is a polybutadiene diol. In a further embodiment, the di-isocyanate is an aliphatic or aromatic di-isocyanate, and more preferably 4,4'-diphenylmethane di-isocyanate. In yet a further embodiment, the chain extender is an aliphatic diol. In another embodiment, the polydiene diol has a Mn from 500 to 10,000, more preferably from 1,000 to 5,000, and even more preferably from 1,500 to 3,000, g/mol. In another embodiment, the polydiene diol is non-hydrogenated. In another embodiment, the polydiene diol is hydrogenated. In another embodiment, the polydiene diol is partially hydrogenated.

The polydiene- or polydiol based polyurethane used in the practice of the invention may comprise a combination of two or more embodiments as described above.

Olefin-Based Polymers, Halogenated Ethylene-Based Polymers and/or Elastomeric Rubbers The compositions of the invention contain at least one olefin-based polymer, at least one halogenated ethylene-based polymer, or at least one elastomeric rubber. As used in the context of this disclosure, olefin-based polymer, halogenated ethylene-based polymer and elastomeric rubber explicitly exclude olefin multi-block interpolymers.

In one embodiment, the at least one olefin-based polymer is selected from the group consisting of homogeneously branched linear ethylene/α-olefin interpolymers, homogeneously branched substantially linear ethylene/α-olefin interpolymers and propylene-based interpolymers. In a further embodiment, the propylene-based interpolymer has at least one of the following properties:
  (i) $^{13}$C NMR peaks corresponding to a regio-error at about 14.6 and about 15.7 ppm, the peaks of about equal intensity,
  (ii) a skewness index, $S_{ix}$, greater than about −1.20,
  (iii) a DSC curve with a $T_{me}$ that remains essentially the same, and a $T_{Max}$ that decreases as the amount of comonomer in the interpolymer is increased, and
  (iv) an X-ray diffraction pattern that reports more gamma-form crystals than a comparable interpolymer prepared with a Ziegler-Natta catalyst.

A. Ethylene-Base Polymers

Suitable ethylene-base polymers include, for example, high density polyethylene (HDPE), linear low density polyethylene (LLDPE), ultra low density polyethylene (ULDPE), homogeneously branched linear ethylene polymers, homogeneously branched substantially linear ethylene polymers (that is homogeneously branched long chain branched ethylene polymers), and ethylene interpolymers with a PRR greater than, or equal to, 4.

High density polyethylene (HDPE), useful as a polyolefin resin, typically has a density of about 0.94 to about 0.97 g/cc. Commercial examples of HDPE are readily available in the market. Other suitable ethylene polymers include low density polyethylene (LDPE), linear low density polyethylene (LLDPE), and linear very low density polyethylene (VLDPE). Typically the low density polyethylene (LDPE) is made under high-pressure, using free-radical polymerization conditions. Low density polyethylene typically has a density from 0.91 to 0.94 g/cc.

Linear low density polyethylene (LLDPE) is characterized by little, if any, long chain branching, in contrast to conventional LDPE. The processes for producing LLDPE are well known in the art and commercial grades of this polyolefin resin are available. Generally, LLDPE is produced in gas-phase fluidized bed reactors or liquid phase solution process reactors, using a Ziegler-Natta catalyst system.

The linear low density polyethylene (LLDPE), ultra low density polyethylene (ULDPE), homogeneously branched linear ethylene interpolymers, or homogeneously branched substantially linear ethylene interpolymer, typically have polymerized therein at least one α-olefin. The term "interpolymer" used herein indicates the polymer can be a copolymer, a terpolymer or any polymer having more than one polymerized monomer. Monomers usefully copolymerized with ethylene to make the interpolymer include the $C_3$-$C_{20}$ α-olefins, and especially propylene, 1-butene, 1-pentene, 1-hexene, 4-methyl-1-pentene, 1-heptene and 1-octene. Especially preferred comonomers include propylene, 1-butene, 1-hexene and 1-octene.

Overall, suitable ethylene polymers have a melt index, $I_2$, less than, or equal to, 1500 g/10 min, preferably less than, or equal to, 1000 g/10 min, more preferably less than, or equal to, 500 g/10 min, even more preferably less than, or equal to, 100 g/10 min, and most preferably less than, or equal to, 50 g/10 min as measured in accordance with ASTM 1238, Condition 190° C./2.16 kg.

Commercial examples of suitable ethylene-base interpolymers include AFFINITY™, ENGAGE™, ATTANE™, DOWLEX™, ELITE™, all available from The Dow Chemical Company; EXCEED™ and EXACT™ available from Exxon Chemical Company; and TAFMER™ polymers supplied by the Mitsui Chemical Company.

In one embodiment, the ethylene-based polymer is a homogeneously branched linear ethylene/α-olefin interpolymer or a homogeneously branched substantially linear ethylene/α-olefin interpolymer. The terms "homogeneous" and "homogeneously-branched" are used in reference to an ethylene/α-olefin interpolymer, in which the α-olefin comonomer is randomly distributed within a given polymer molecule, and substantially all of the polymer molecules have the same ethylene-to-comonomer ratio.

The homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. That is, homogeneously branched linear ethylene interpolymers lack long chain branching, just as is the case for the linear low density polyethylene polymers or linear high density polyethylene polymers, made using uniform branching distribution polymerization processes, as described, for example, by Elston in U.S. Pat. No. 3,645,992. Commercial examples of homogeneously branched linear ethylene/α-olefin interpolymers include TAFMER™ polymers supplied by the Mitsui Chemical Company, and EXACT™ polymers supplied by ExxonMobil Chemical Company.

The substantially linear ethylene interpolymers used in the present invention are described in U.S. Pat. Nos. 5,272,236; 5,278,272; 6,054,544; 6,335,410; and 6,723,810; the entire contents of each are herein incorporated by reference. The substantially linear ethylene interpolymers are those in which the comonomer is randomly distributed within a given interpolymer molecule, and in which substantially all of the interpolymer molecules have the same ethylene/comonomer ratio within that interpolymer. In addition, the substantially linear ethylene interpolymers are homogeneously branched ethylene interpolymers having long chain branching. The long chain branches have the same comonomer distribution as the polymer backbone, and can have about the same length as the length of the polymer backbone. "Substantially linear," typically, is in reference to a polymer that is substituted, on average, with 0.01 long chain branches per 1000 total carbons to 3 long chain branches per 1000 total carbons. The length of a long chain branch is longer than the carbon length of a short chain branch formed from the incorporation of one comonomer into the polymer backbone.

Some polymers may be substituted with 0.01 long chain branches per 1000 total carbons to 1 long chain branch per 1000 total carbons, or from 0.05 long chain branches per 1000 total carbons to 1 long chain branch per 1000 total carbons, or from 0.3 long chain branches per 1000 total carbons to 1 long chain branch per 1000 total carbons. Commercial examples of substantially linear polymers include the ENGAGE™ polymers and AFFINITY™ polymers (both available from The Dow Chemical Company).

The substantially linear ethylene interpolymers form a unique class of homogeneously branched ethylene polymers. They differ substantially from the well-known class of conventional, homogeneously branched linear ethylene interpolymers, described by Elston in U.S. Pat. No. 3,645,992, and, moreover, they are not in the same class as conventional heterogeneous, "Ziegler-Natta catalyst polymerized" linear ethylene polymers (for example, ultra low density polyethylene (ULDPE), linear low density polyethylene (LLDPE) or high density polyethylene (HDPE) made, for example, using the technique disclosed by Anderson et al. in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

The homogeneously branched, substantially linear ethylene interpolymers useful in the invention have excellent processability, even though they have a relatively narrow molecular weight distribution. Surprisingly, the melt flow ratio ($I_{10}/I_2$), according to ASTM D 1238, of the substantially linear ethylene interpolymers can be varied widely, and essentially independently of the molecular weight distribution ($M_w/M_n$ or MWD). This surprising behavior is completely contrary to conventional homogeneously branched linear ethylene interpolymers, such as those described, for example, by Elston in U.S. Pat. No. 3,645,992, and heterogeneously branched conventional Ziegler-Natta polymerized linear polyethylene interpolymers, such as those described, for example, by Anderson et al., in U.S. Pat. No. 4,076,698. Unlike substantially linear ethylene interpolymers, linear ethylene interpolymers (whether homogeneously or heterogeneously branched) have rheological properties, such that, as the molecular weight distribution increases, the $I_{10}/I_2$ value also increases.

"Long chain branching (LCB)" can be determined by conventional techniques known in the industry, such as $^{13}C$ nuclear magnetic resonance ($^{13}C$ NMR) spectroscopy, using, for example, the method of Randall (Rev. Micromole. Chem. Phys., C29 (2&3), p. 285-297). Two other methods are gel permeation chromatography, coupled with a low angle laser light scattering detector (GPC-LALLS), and gel permeation chromatography coupled with a differential viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301(1949) and Rudin, A., Modern Methods of Polymer Characterization, John Wiley & Sons, New York (1991) pp. 103-112.

In contrast to "substantially linear ethylene polymer," "linear ethylene polymer" means that the polymer lacks measurable or demonstrable long chain branches, that is, the polymer is substituted with an average of less than 0.01 long chain branch per 1000 total carbons.

Homogeneously branched linear ethylene interpolymers are a known class of polymers which have a linear polymer backbone, no measurable long chain branching and a narrow molecular weight distribution. Such polymers are interpolymers of ethylene and at least one α-olefin comonomer of from 3 to 20 carbon atoms, and are preferably copolymers of ethylene with a $C_3$-$C_{20}$ α-olefin, and are more preferably copolymers of ethylene with propylene, 1-butene, 1-pentene, 1-hexene, 1-heptene or 1-octene, and even more preferably, propylene, 1-butene, 1-hexene or 1-octene.

This class of polymers is disclosed for example, by Elston in U.S. Pat. No. 3,645,992, and subsequent processes to produce such polymers using metallocene catalysts have been developed, as shown, for example, in EP 0 129 368, EP 0 260 999, U.S. Pat. No. 4,701,432; U.S. Pat. No. 4,937,301; U.S. Pat. No. 4,935,397; U.S. Pat. No. 5,055,438; and WO 90/07526, and others. The polymers can be made by conventional polymerization processes (for example, gas phase, slurry, solution, and high pressure).

The homogeneous branched ethylene polymers useful in the present invention will preferably have a single melting peak, as measured using differential scanning calorimetry (DSC), in contrast to heterogeneously branched linear ethylene polymers, which have 2 or more melting peaks, due to the heterogeneously branched polymer's broad branching distribution.

In a preferred embodiment of the invention, an ethylene-based interpolymer is an ethylene/α-olefin interpolymer, comprising at least one α-olefin. In another embodiment, the interpolymer further comprises at least one diene.

Comonomers include, but are not limited to, propylene, isobutylene, 1-butene, 1-pentene, 1-hexene, 3-methyl-1-pentene, 4-methyl-1-pentene, and 1-octene, non-conjugated dienes, polyenes, butadienes, isoprenes, pentadienes, hexadienes (for example, 1,4-hexadiene), octadienes, styrene, halo-substituted styrene, alkyl-substituted styrene, tetrafluoroethylenes, vinylbenzocyclobutene, naphthenics, cycloalkenes (for example, cyclopentene, cyclohexene, cyclooctene), and mixtures thereof. Typically and preferably, the ethylene is copolymerized with one $C_3$-$C_{20}$ α-olefin. Preferred comonomers include propene, 1-butene, 1-pentene, 1-hexene, 1-heptene and 1-octene, and more preferably include propene, 1-butene, 1-hexene and 1-octene.

Illustrative α-olefins include propylene, 1-butene, 1-pentene, 1-hexene, 4-methyl-1-pentene, 1-heptene, 1-octene, 1-nonene and 1-decene. The α-olefin is desirably a $C_3$-$C_{10}$ α-olefin. Preferably, the α-olefin is propylene, 1-butene, 1-hexene or 1-octene. Illustrative interpolymers include ethylene/propylene (EP) copolymers, ethylene/butene (EB) copolymers, ethylene/hexene (EH) copolymers, ethylene/octene (EO) copolymers, ethylene/α-olefin/diene modified (EAODM) interpolymers, such as ethylene/propylene/diene modified (EPDM) interpolymers and ethylene/propylene/octene terpolymers. Preferred copolymers include EP, EB, EH and EO polymers. Illustrated ethylene/α-olefin/diene modified (EAODM) interpolymers include the Nordel™ polymers available from The Dow Chemical Company, and the VISTALON polymers available from ExxonMobil.

Suitable diene and triene comonomers include 7-methyl-1,6-octadiene; 3,7-dimethyl-1,6-octadiene; 5,7-dimethyl-1,6-octadiene; 3,7,11-trimethyl-1,6,10-octatriene; 6-methyl-1,5heptadiene; 1,3-butadiene; 1,6-heptadiene; 1,7-octadiene; 1,8-nonadiene; 1,9-decadiene; 1,10-undecadiene; norbornene; tetracyclododecene; or mixtures thereof; and preferably butadiene; hexadienes; and octadienes; and most preferably 1,4-hexadiene; 1,9-decadiene; 4-methyl-1,4-hexadiene; 5-methyl-1,4-hexadiene; dicyclopentadiene; and 5-ethylidene-2-norbornene (ENB).

Additional unsaturated comonomers include 1,3-butadiene, 1,3-pentadiene, norbornadiene, and dicyclopentadiene; $C_{8-40}$ vinyl aromatic compounds including sytrene, o-, m-, and p-methylstyrene, divinylbenzene, vinylbiphenyl, vinylnapthalene; and halogen-substituted $C_{8-40}$ vinyl aromatic compounds such as chlorostyrene and fluorostyrene.

In one embodiment, the ethylene/α-olefin interpolymer has a molecular weight distribution ($M_w/M_n$) less than, or equal to, 4, and preferably less than, or equal to, 3 or less than, or equal to, 2.5. More preferably the ethylene/α-olefin polymers have a molecular weight distribution from 1.1 to 4, and more preferably from about 1.2 to 3, and more preferably 1.2 to 2.5. All individual values and subranges from about 1 to 4 are included herein and disclosed herein.

In another embodiment, the ethylene/α-olefin interpolymer has a melt index ($I_2$) from 0.01 g/10 min to 1000 g/10 min, preferably from 0.01 g/10 min to 500 g/10 min, and more preferably from 0.01 g/10 min to 100 g/10 min, as determined using ASTM D-1238 (190° C., 2.16 kg load). All individual values and subranges from 0.01 g/10 min to 1000 g/10 min are includes herein and disclosed herein.

In another embodiment, the ethylene/α-olefin interpolymer has a percent crystallinity of less than, or equal to, 60 percent, preferably less than, or equal to, 50 percent, and more preferably less than, or equal to, 40 percent, as measured by DSC. Preferably, these polymers have a percent crystallinity from 2 percent to 60 percent, including all individual values and subranges from 2 percent to 60 percent. Such individual values and subranges are disclosed herein.

In another embodiment, the ethylene/α-olefin interpolymer has a density less than, or equal to, 0.93 g/cc, preferably less than, or equal to, 0.92 g/cc, and more preferably less than, or equal to, 0.91 g/cc. In another embodiment, the ethylene/α-olefin interpolymer has a density greater than, or equal to, 0.85 g/cc, preferably greater than, or equal to, 0.86 g/cc, and more preferably greater than, or equal to, 0.87 g/cc.

In another embodiment, the ethylene/α-olefin interpolymer has a density from 0.85 g/cm³ to 0.93 g/cm³, and preferably from 0.86 g/cm³ to 0.92 g/cm³, and more preferably from 0.87 g/cm³ to 0.91 g/cm³. All individual values and subranges from 0.85 g/cm³ to 0.93 g/cm³ are included herein and disclosed herein.

In another embodiment, the ethylene/α-olefin (EAO) interpolymers are long chain branched interpolymers, as compared to current commercially available linear (short chain branches or no branches) ethylene/α-olefin interpolymers. As discussed above, "long-chain branching" or "LCB" means a chain length that exceeds that of a short chain that results from incorporation of an alpha-olefin into the backbone of an ethylene/α-olefin polymer. In another embodiment, the ethylene/α-olefin interpolymers are prepared from at least one catalyst that can form long chain branches within the interpolymer backbone.

Long chain branching can be incorporated into a polyolefin backbone using a branching monomer. For example, in U.S. Pat. No. 3,821,143, a 1,4-hexadiene is used as a branching monomer to prepare ethylene/propylene/diene (EPDM) polymers having LCB. Such branching agents are sometimes referred to as "H branching agents." U.S. Pat. Nos. 6,300,451 and 6,372,847 also use various H type branching agents to prepare polymers having LCB.

Long chain branching may also be incorporated into a polyolefin backbone using a constrained geometry catalyst. Constrained geometry catalysts (CGC) have the ability to incorporate long chain branches, such as, for example, vinyl terminated macromonomers, into the polymer backbone to form LCB polymers (see U.S. Pat. No. 5,278,272 (hereinafter the '272 patent) and U.S. Pat. No. 5,272,236). Such branching is referred to as "T type branching." All of these patents are incorporated herein, in their entireties, by reference.

The '272 patent teaches that such CGC are unique in their ability to incorporate long chain branches into a polymer backbone. There are various other methods that can be used to define the degree of LCB in a molecule. One such method is taught in U.S. Pat. No. 6,372,847. This method uses Mooney stress relaxation data to calculate a MLRA/ML ratio. MLRA is the Mooney Relaxation Area and ML is the Mooney viscosity of the polymer. Another method is Processing Rheology ratio (PRR), which uses interpolymer viscosities to calculate estimated levels of LCB in a polymer.

Interpolymer viscosity is conveniently measured in poise (dyne-second/square centimeter (d-sec/cm$^2$)), at shear rates within a range of 0.1-100 radian per second (rad/sec), and at 190° C., under a nitrogen atmosphere, using a dynamic mechanical spectrometer (such as a RMS-800 or ARES from Rheometrics), under a dynamic sweep made from 0.1 to 100 rad/sec. The viscosities at 0.1 rad/sec and 100 rad/sec may be represented, respectively, as $V_{0.1}$ and $V_{100}$, with a ratio of the two referred to as RR and expressed as $V_{0.1}/V_{100}$.

The PRR value is calculated by the formula:
PRR=RR+[3.82−interpolymer Mooney Viscosity ($ML_{1+4}$ at 125° C.)]×0.3. The PRR determination is described in U.S. Pat. No. 6,680,361, fully incorporated herein by reference. U.S. Pat. No. 6,680,361 also describes the synthesis of ethylene/α-olefin interpolymers having PRR values of 4 and higher.

In a one embodiment, the ethylene/α-olefin interpolymer has a PRR from 1 to 70. In another embodiment, the ethylene/α-olefin interpolymer has a PRR from 4 to 70, preferably from 8 to 70, more preferably from 12 to 60, even more preferably from 15 to 55, and most preferably from 18 to 50. Current commercial ethylene/α-olefin resins, having normal levels of LCB (0.01-3 LCB/1000 carbons), typically have PRR values less than 3. In another embodiment, the ethylene/α-olefin interpolymer has a PRR less than 3, and preferably less than 2. In another embodiment, the ethylene/α-olefin interpolymers have a PRR from −1 to 3, preferably from 0.5 to 3, and more preferably from 1 to 3. All individual PRR values and subranges from −1 to 70 are included herein and disclosed herein.

T-type LCB polymers are disclosed in U.S. Pat. No. 5,272, 236, in which the degree of LCB is from 0.01 LCB/1000 carbon atoms to 3 LCB/1000 carbon atoms, and in which the catalyst is a constrained geometry catalyst. According to P. Doerpinghaus and D. Baird, in *The Journal of Rheology*, 47 (3), pp 717-736 May/June 2003, "Separating the Effects of Sparse Long-Chain Branching on Rheology from Those Due to Molecular Weight in Polyethylenes," free radical processes, such as those used to prepare low density polyethylene (LDPE), produce polymers having extremely high levels of LCB. For example, the resin NA952 in Table I of Doerpinghaus and Baird is a LDPE prepared by a free radical process, and, according to Table II, contains 3.9 LCB/1000 carbon atoms. Ethylene alpha olefins (ethylene-octene copolymers), available from The Dow Chemical Company (Midland, Mich., USA), that are considered to have average levels of LCB, include resins Affinity PL1880 and Affinity PL1840 of Tables I and II, respectively, and contain 0.018 and 0.057 LCB/1000 carbon atoms.

Ethylene/α-olefin interpolymers suitable for the invention can be made by the process described in WO 00/26268. Table 1 lists the LCB levels of various types of ethylene/α-olefin interpolymers useful in the invention. EAO-1, EAO-2-1, EAO-8 and EAO-9 were prepared by the procedure described in WO 00/26268, using a mixed catalyst system described in U.S. Pat. No. 6,369,176. EAO-7-1 was prepared in dual reactors by the procedure described in WO 00/26268. EAO-E-A was prepared as described in U.S. Pat. Nos. 5,272,236 and 5,278,272. U.S. Pat. Nos. 5,272,236; 5,278,272; and 6,369, 176 are each fully incorporated, herein, by reference.

In one embodiment, the ethylene/α-olefin interpolymers have a PRR greater than, or equal to 4, preferably greater than, or equal to 8. In another embodiment, the ethylene/alpha-olefin interpolymers have a PRR greater than or equal to 15, preferably greater than or equal to 20. In a further embodiment, the interpolymer has a molecular weight distribution (MWD) of 1.5 to 5, more preferably 1.8 to 4 and most preferably 2.0 to 3.5. All individual values and subranges from 1.5 to 5 are included herein and disclosed herein. In a further embodiment, the ethylene/α-olefin interpolymers have a density less than, or equal to, 0.93 g/cc, preferably less than, or equal to, 0.92 g/cc, and more preferably less than, or equal to, 0.91 g/cc. In another embodiment, the ethylene/α-olefin interpolymers have a density greater than, or equal to, 0.86 g/cc, preferably greater than, or equal to, 0.87 g/cc, and more preferably greater than, or equal to, 0.88 g/cc. In another embodiment, the ethylene/α-olefin interpolymers have a density from 0.86 g/cc to 0.93 g/cc, and all individual values and subranges from 0.86 g/cc to 0.93 g/cc are included herein and disclosed herein.

In another embodiment, the ethylene/α-olefin interpolymers have a PRR greater than, or equal to 4, and a melt index, I2, greater than, or equal to, 0.1 g/10 min, preferably greater than, or equal to, 0.5 g/10 min, and more preferably greater than, or equal to 1.0 g/10 min. In another embodiment, the ethylene/α-olefin interpolymers have a melt index, I2, less than, or equal to, 30 g/10 min, preferably less than, or equal to, 25 g/10 min, and more preferably less than, or equal to 20 g/10 min. In another embodiment, the ethylene/α-olefin interpolymers have a melt index, $I_2$, from 0.1 g/10 min to 30 g/10 min, preferably from 0.1 g/10 min to 20 g/10 min, and more preferably from 0.1 g/10 min to 15 g/10 min. all individual values and subranges from 0.1 g/10 min to 30 g/10 min are included herein and disclosed herein.

An ethylene-based polymer may have a combination of two or more suitable embodiments as described herein.

TABLE 1

| | Ethylene/α-Olefin Random Interpolymers | | | | | |
|---|---|---|---|---|---|---|
| EAO | Mooney Viscosity | MLRA/MV | PRR | Comonomer(s) | Wt % Ethylene | Density g/cc |
| T-Branches (Low Levels) | | | | | | |
| EAO-A | 26.2 | 0.3 | −2.9 | butene | | |
| EAO-B | 48.6 | 1.2 | −5.5 | butene | | |

TABLE 1-continued

Ethylene/α-Olefin Random Interpolymers

| EAO | Mooney Viscosity | MLRA/MV | PRR | Comonomer(s) | Wt % Ethylene | Density g/cc |
|---|---|---|---|---|---|---|
| T-Branches (Low to Commercial Levels) | | | | | | |
| EAO-C | 21.5 | 0.8 | 0.6 | octene | | |
| EAO-D | 34.4 | 1.2 | −0.8 | octene | | |
| EAO-E | 34.1 | 1.2 | −0.5 | octene | | |
| EAO-E-A | 32 | | 0 | octene | 58 | 0.86 |
| EAO-F | 18.3 | 0.6 | −0.5 | butene | | |
| T-Branches (High Levels) | | | | | | |
| EAO-1 | 40.1 | 3.8 | 29 | butene | 87 | 0.90 |
| EAO-2 | 27 | 2.8 | 22 | butene | | |
| EAO-2-1 | 26 | | 19 | butene | 87 | 0.90 |
| EAO-3 | 36.8 | 2.4 | 15 | butene | | |
| EAO-4 | 17.8 | 2.3 | 12 | butene | | |
| EAO-5 | 15.7 | 2.0 | 10 | butene | | |
| EAO-6 | 37.1 | 7.6 | 70 | propylene | | |
| EAO-7 | 17.4 | 3.4 | 26 | 69.5 wt % ethylene/ 30 wt % propylene/ 0.5% ENB | 69.5 | |
| EAO-7-1 | 20 | | 21 | propylene/diene | 69.5 | 0.87 |
| EAO-8 | 26 | | 45 | propylene | 70 | 0.87 |
| EAO-9 | 30 | | 17 | octene | 70 | 0.88 |
| H-Branches | | | | | | |
| EAO-G | 24.5 | 10.9 | | 76.8 wt % ethylene/ 22.3 wt % propylene/ 0.9% ENB | | |
| EAO-H | 27 | 7.1 | 72 | 72 wt % ethylene/ 22 wt % propylene/ 6% hexadiene | | |
| EAO-I | 50.4 | 7.1 | | 71 wt % ethylene/ 23 wt % propylene/ 6% hexadiene | | |
| EAO-J | 62.6 | 8.1 | 55 | 71 wt % ethylene/ 23 wt % propylene/ 6% hexadiene | | |

Mooney viscosity: $ML_{1+4}$ at 125° C.

B. Propylene-Based Polymers for use as Olefin-Based Polymer

Suitable propylene-based interpolymers include propylene homopolymers, propylene interpolymers, as well as reactor copolymers of polypropylene (RCPP), which can contain about 1 to about 20 weight percent ethylene or an α-olefin comonomer of 4 to 20 carbon atoms. The propylene interpolymer can be a random or block copolymer, or a propylene-based terpolymer.

Suitable comonomers for polymerizing with propylene include ethylene, 1-butene, 1-pentene, 1-hexene, 1-heptene, 1-octene, 1-nonene, 1-decene, 1-unidecene, 1 dodecene, as well as 4-methyl-1-pentene, 4-methyl-1-hexene, 5-methyl-1-hexene, vinylcyclohexane, and styrene. The preferred comonomers include ethylene, 1-butene, 1-hexene, and 1-octene, and more preferably ethylene.

Optionally, the propylene-based polymer comprises monomers having at least two double bonds which are preferably dienes or trienes. Suitable diene and triene comonomers include 7-methyl-1,6-octadiene; 3,7-dimethyl-1,6-octadiene; 5,7-dimethyl-1,6-octadiene; 3,7,11-trimethyl-1,6,10-octatriene; 6-methyl-1,5heptadiene; 1,3-butadiene; 1,6-heptadiene; 1,7-octadiene; 1,8-nonadiene; 1,9-decadiene; 1,10-undecadiene; norbornene; tetracyclododecene; or mixtures thereof; and preferably butadiene; hexadienes; and octadienes; and most preferably 1,4-hexadiene; 1,9-decadiene; 4-methyl-1,4-hexadiene; 5-methyl-1,4-hexadiene; dicyclopentadiene; and 5-ethylidene-2-norbornene (ENB).

Additional unsaturated comonomers include 1,3-pentadiene, norbornadiene, and dicyclopentadiene; $C_{8-40}$ vinyl aromatic compounds including sytrene, o-, m-, and p-methylstyrene, divinylbenzene, vinylbiphenyl, vinylnapthalene; and halogen-substituted $C_{8-40}$ vinyl aromatic compounds such as chlorostyrene and fluorostyrene.

The propylene interpolymers of particular interest include propylene/ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, propylene/ethylene/1-octene, propylene/styrene, and propylene/ethylene/styrene.

Suitable polypropylenes are formed by means within the skill in the art, for example, using single site catalysts (metallocene or constrained geometry) or Ziegler Natta catalysts. The propylene and optional comonomers, such as ethylene or alpha-olefin monomers are polymerized under conditions within the skill in the art, for instance, as disclosed by Galli, et al., Angew. Macromol. Chem., Vol. 120, 73 (1984), or by E. P. Moore, et al. in Polypropylene Handbook, Hanser Publishers, New York, 1996, particularly pages 11-98. Polypropylene polymers include Shell's KF 6100 homopolymer polypropylene; KS 4005 polypropylene copolymer (previously available from Solvay); KS 300 polypropylene terpolymer (previously available from Solvay); and INSPIRE™ polymers and VERSIFY™ polymers, both available from The Dow Chemical Company.

Preferably, the propylene-based polymer has a melt flow rate (MFR) in the range of 0.01 to 2000 g/10 min, more preferably in range of 0.1 to 1000 g/10 min, and more preferably 0.5 to 500 g/10 min, and even more preferably 1 to 100 g/10 min, as measured in accordance with ASTM D 1238 at 230° C./2.16 kg.

The propylene-based polymer used in the present invention may be of any molecular weight distribution (MWD). Propylene-based polymers of broad or narrow MWD are formed by means within the skill in the art. Propylene-based polymers having a narrow MWD can be advantageously provided by visbreaking or by manufacturing reactor grades (non visbroken) using single-site catalysis, or by both methods.

The propylene-based polymer can be reactor-grade, visbroken, branched or coupled to provide increased nucleation and crystallization rates. The term "coupled" is used herein to refer to propylene-based polymers which are rheology-modified, such that they exhibit a change in the resistance of the molten polymer to flow during extrusion (for example, in the extruder immediately prior to the annular die). Whereas "visbroken" is in the direction of chain-scission, "coupled" is in the direction of crosslinking or networking. As an example of coupling, a couple agent (for example, an azide compound) is added to a relatively high melt flow rate polypropylene polymer, such that after extrusion, the resultant polypropylene polymer composition attains a substantially lower melt flow rate than the initial melt flow rate. Preferably, for coupled or branched polypropylene, the ratio of subsequent MFR to initial MFR is less than, or equal, to 0.7:1, more preferably less than or equal to 0.2:1.

A suitable branched propylene-based polymers for use in the present invention are commercially available, for instance from Basell Polyolefins Inc., North America, under the trade designations Profax PF-611 and PF-814, and SR260S, and Daploy WB130 HMS (Borealis). Alternatively, suitable branched or coupled propylene-based polymers can be prepared by means, within the skill in the art, such as by peroxide or electron-beam treatment, for instance as disclosed by DeNicola et al., in U.S. Pat. No. 5,414,027 (the use of high energy (ionizing) radiation in a reduced oxygen atmosphere); EP 0 190 889 to Himont (electron beam irradiation of isotactic polypropylene at lower temperatures); U.S. Pat. No. 5,464,907 (Akzo Nobel NV); EP 0 754 711 Solvay (peroxide treatment); and U.S. patent application Ser. No. 09/133,576, filed Aug. 13, 1998 (azide coupling agents). Each of these patents/applications is incorporated herein by reference.

Suitable polypropylene base polymers also include VERSIFY™ polymers (The Dow Chemical Company) and VISTAMAXX™ polymers (ExxonMobil Chemical Co.), LICOCENE™ polymers (Clariant), EASTOFLEX™ polymers (Eastman Chemical Co.), REXTAC™ polymers (Hunstman), and VESTOPLAST™ polymers (Degussa). Other suitable polymers include propylene-α-olefins block copolymers and interpolymers, and other propylene based block copolymers and interpolymers known in the art.

In one embodiment, the propylene-based interpolymer is a propylene/α-olefin interpolymer, comprising at least one α-olefin. In another embodiment, the interpolymer further comprises at least one diene. In another embodiment, the propylene-based interpolymer is a propylene/ethylene interpolymer. In a further embodiment, the propylene-based interpolymer is a propylene/ethylene copolymer.

Preferred comonomers include, but are not limited to, ethylene, isobutylene, 1-butene, 1-pentene, 1-hexene, 3-methyl-1-pentene, 4methyl-1-pentene, 1-octene, non-conjugated dienes, polyenes, butadienes, isoprenes, pentadienes, hexadienes (for example, 1,4-hexadiene), octadienes, styrene, halo-substituted styrene, alkyl-substituted styrene, tetrafluoroethylenes, vinylbenzocyclobutene, naphthenics, cycloalkenes (for example, cyclopentene, cyclohexene, cyclooctene), and mixtures thereof Typically and preferably, the comonomer is an ethylene or a $C_4$-$C_{20}$ α-olefin. Preferred comonomers include ethylene, 1-butene, 1-pentene, 1-hexene, 1-heptene and 1-octene, and more preferably include ethylene, 1-butene, 1-hexene and 1-octene.

In another embodiment, the propylene-based polymer is a propylene/α-olefin interpolymer, which has a molecular weight distribution less than, or equal to, 5, and preferably less than, or equal to, 4, and more preferably less than, or equal to 3. More preferably the propylene/α-olefin interpolymer has a molecular weight distribution from 1.1 to 5, and more preferably from 1.5 to 4.5, and more preferably from 2 to 4. In another embodiment, the molecular weight distribution is less than 3.5, preferably less than 3.0, more preferably less than 2.8, more preferably less than 2.5, and most preferably less than 2.3. All individual values and subranges from about 1 to 5 are included herein and disclosed herein.

In another embodiment, the propylene/α-olefin interpolymer has a melt flow rate (MFR) less than, or equal to 2000 g/10 min, preferably less than, or equal to 1000 g/10 min, and more preferably less than, or equal to 500 g/10 min, and even more preferably less than, or equal to 100 g/10 min, as measured in accordance with ASTM D 1238 at 230° C./2.16 kg. In another embodiment, propylene/α-olefin interpolymer has a melt flow rate (MFR) greater than, or equal to 0.01 g/10 min, preferably greater than, or equal to 0.1 g/10 min, more preferably greater than, or equal to 0.5 g/10 min, and even more preferably greater than, or equal to 1 g/10 min, as measured in accordance with ASTM D 1238 at 230° C./2.16 kg.

In another embodiment, the propylene/α-olefin interpolymer has a melt flow rate (MFR) in the range of 0.01 to 2000 grams/10 minutes, more preferably in range of 0.1 to 1000 grams/10 minutes, more preferably from 0.5 to 500 grams/10 min, and even more preferably from 1 to 100 grams/10 min, as measured in accordance with ASTM D 1238 at 230° C./2.16 kg. All individual values and subranges from 0.01 to 2000 grams/10 min are included herein and disclosed herein.

In another embodiment, the propylene/α-olefin interpolymer has a percent crystallinity of less than, or equal to, 50 percent, preferably less than, or equal to, 40 percent, and more preferably less than, or equal to, 35 percent, as measured by DSC. Preferably, these polymers have a percent crystallinity from 2 percent to 50 percent, including all individual values and subranges from 2 percent to 50 percent. Such individual values and subranges are disclosed herein.

In another embodiment, the propylene/α-olefin interpolymer has a density less than, or equal to, 0.90 g/cc, preferably less than, or equal to, 0.89 g/cc, and more preferably less than, or equal to, 0.88 g/cc. In another embodiment, the propylene/α-olefin interpolymer has a density greater than, or equal to, 0.83 g/cc, preferably greater than, or equal to, 0.84 g/cc, and more preferably greater than, or equal to, 0.85 g/cc.

In another embodiment, the propylene/α-olefin interpolymer has a density from 0.83 $g/cm^3$ to 0.90 $g/cm^3$, and preferably from 0.84 $g/cm^3$ to 0.89 $g/cm^3$, and more preferably from 0.85 $g/cm^3$ to 0.88 $g/cm^3$. All individual values and subranges from 0.83 $g/cm^3$ to 0.90 $g/cm^3$, are included herein and disclosed herein.

In another embodiment, the propylene-based polymer is a propylene/ethylene interpolymer, which has a molecular weight distribution less than, or equal to, 5, and preferably less than, or equal to, 4, and more preferably less than, or equal to 3. More preferably the propylene/ethylene interpolymer has a molecular weight distribution from 1.1 to 5, and more preferably from 1.5 to 4.5, and more preferably from 2 to 4. In another embodiment, the molecular weight distribution is less than about 3.5, preferably less than 3.0, more preferably less than 2.8, more preferably less than 2.5, and most preferably less than 2.3. All individual values and subranges from about 1 to 5 are included herein and disclosed herein.

In another embodiment, the propylene/ethylene interpolymer has a melt flow rate (MFR) less than, or equal to 2000 g/10 min, preferably less than, or equal to 1000 g/10 min, and more preferably less than, or equal to 500 g/10 min, and even more preferably less than, or equal to 100 g/10 min, as measured in accordance with ASTM D 1238 at 230° C./2.16 kg. In another embodiment, propylene/α-olefin interpolymer has a melt flow rate (MFR) greater than, or equal to 0.01 g/10 min, preferably greater than, or equal to 0.1 g/10 min, more preferably greater than, or equal to 0.5 g/10 min, and even more preferably greater than, or equal to 1 g/10 min, as measured in accordance with ASTM D 1238 at 230° C./2.16 kg.

In another embodiment, the propylene/ethylene interpolymer has a melt flow rate (MFR) in the range of 0.01 to 2000 grams/10 minutes, more preferably in range of 0.1 to 1000 grams/10 minutes, more preferably from 0.5 to 500 grams/10 min, and even more preferably from 1 to 100 grams/10 min, as measured in accordance with ASTM D 1238 at 230° C./2.16 kg. All individual values and subranges from 0.01 to 2000 grams/10 min are included herein and disclosed herein.

In another embodiment, the propylene/ethylene interpolymer has a percent crystallinity of less than, or equal to, 50 percent, preferably less than, or equal to, 40 percent, and more preferably less than, or equal to, 35 percent, as measured by DSC. Preferably, these polymers have a percent crystallinity from 2 percent to 50 percent, including all individual values and subranges from 2 percent to 50 percent. Such individual values and subranges are disclosed herein.

In another embodiment, the propylene/ethylene interpolymer has a density less than, or equal to, 0.90 g/cc, preferably less than, or equal to, 0.89 g/cc, and more preferably less than, or equal to, 0.88 g/cc. In another embodiment, the propylene/α-olefin interpolymer has a density greater than, or equal to, 0.83 g/cc, preferably greater than, or equal to, 0.84 g/cc, and more preferably greater than, or equal to, 0.85 g/cc.

In another embodiment, the propylene/ethylene interpolymer has a density from 0.83 g/cm³ to 0.90 g/cm³, and preferably from 0.84 g/cm³ to 0.89 g/cm³, and more preferably from 0.85 g/cm³ to 0.88 g/cm³. All individual values and subranges from 0.83 g/cm³ to 0.90 g/cm³, are included herein and disclosed herein.

In another embodiment, the propylene interpolymer comprises units derived from propylene in an amount of at least about 60, preferably at least about 80 and more preferably at least about 85, weight percent of the interpolymer (based on the total weight of polymerizable monomers). In another embodiment, the amount of units derived from ethylene in propylene/ethylene copolymers is at least about 0.1, preferably at least about 1 and more preferably at least about 5 weight percent, and the maximum amount of units derived from ethylene present in these copolymers is typically not in excess of about 35, preferably not in excess of about 30 and more preferably not in excess of about 20, weight percent of the copolymer (based on the total weight of polymerizable monomers). The amount of units derived from an additional unsaturated comonomer(s), if present, is typically at least about 0.01, preferably at least about 1 and more preferably at least about 5, weight percent, and the typical maximum amount of units derived from the unsaturated comonomer(s) typically does not exceed about 35, preferably it does not exceed about 30 and more preferably it does not exceed about 20, weight percent of the interpolymer (based on the total weight of polymerizable monomers). The combined total of units derived from ethylene and any unsaturated comonomer typically does not exceed about 40, preferably it does not exceed about 30, and more preferably it does not exceed about 20, weight percent of the interpolymer (based on the total weight of polymerizable monomers).

In another embodiment, the interpolymer of this invention comprises propylene and one or more unsaturated comonomers, other than ethylene, also typically comprise units derived from propylene in an amount of at least about 60, preferably at least about 70 and more preferably at least about 80, weight percent of the interpolymer (based on the total weight of polymerizable monomers). The one or more unsaturated comonomers of the interpolymer comprise at least about 0.1, preferably at least about 1, and more preferably at least about 3, weight percent, and the typical maximum amount of unsaturated comonomer does not exceed about 40, and preferably it does not exceed about 30, weight percent of the interpolymer (based on the total weight of polymerizable monomers).

Preferred propylene-based polymers suitable in the inventive compositions comprise propylene, and typically, ethylene and/or one or more unsaturated comonomers, and are characterized as having at least one, preferably more than one, of the following properties: (i) $^{13}C$ NMR peaks corresponding to a regio-error at about 14.6 and about 15.7 ppm, the peaks of about equal intensity, (ii) a skewness index, $S_{ix}$, greater than about −1.20, (iii) a DSC curve with a $T_{me}$ that remains essentially the same, and a $T_{Max}$ that decreases as the amount of comonomer (i.e., units derived from ethylene and/or the unsaturated comonomer(s)) in the interpolymer is increased, and (iv) an X-ray diffraction pattern that reports more gamma-form crystals than a comparable interpolymer prepared with a Ziegler-Natta catalyst. Preferably the propylene-based interpolymer is a propylene/ethylene interpolymer. Preferred propylene-based polymers are the VERSIFY™ polymers available from The Dow Chemical Company. It is noted that in property (i) the distance between the two $^{13}C$ NMR peaks is 1.1 ppm. This distance should be fairly constant.

A propylene-based polymer may comprise a combination of two or more embodiments as described herein. These propylene-based interpolymers are made using a nonmetallocene, metal-centered, heteroaryl ligand catalyst. Typically the interpolymers of this embodiment are characterized by at least one, preferably at least two, more preferably at least three, and even more preferably all four, of these properties.

With respect to the X-ray property of subparagraph (iv) above, a "comparable" interpolymer is one having the same monomer composition within 10 weight percent, and the same M. (weight average molecular weight) within 10 weight percent. For example, if an inventive propylene/ethylene/1-hexene interpolymer is 9 weight percent ethylene and 1 weight percent 1-hexene, and has a Mw of 250,000, then a comparable polymer would have from 8.1 to 9.9 weight percent ethylene, from 0.9 to 1.1 weight percent 1-hexene, and a Mw from 225,000 to 275,000, and prepared with a Ziegler-Natta catalyst.

In a preferred embodiment, the propylene-based interpolymer is an interpolymer of propylene, ethylene and, optionally, one or more unsaturated comonomers, for example, $C_4$-$C_{20}$ α-olefins, $C_4$-$C_{20}$ dienes, vinyl aromatic compounds (example, styrene). These interpolymers are characterized as comprising at least about 60 weight percent of units derived from propylene, from 0.1 to 35 weight percent of units derived from ethylene, and from 0 to 35 weight percent of units derived from one or more unsaturated comonomers, with the proviso that the combined weight percent of units derived from ethylene and the unsaturated comonomer(s) does not exceed about 40 weight percent, preferably does not exceed 30 weight percent or 25 weight percent (based on total weight of polymerizable monomers).

In another embodiment, propylene-based interpolymer comprises propylene and one or more unsaturated comonomers. These interpolymers are characterized in having at least about 60 weight percent of the units derived from propylene, and from 0.1 to 40 weight percent of the units derived from the unsaturated comonomer(s). Weight percentages are based on total weight of polymerizable monomers.

The unsaturated comonomers used include, $C_4$-$C_{20}$ α-olefins, especially $C_4$-$C_{12}$ α-olefins such as 1-butene, 1-pentene, 1-hexene, 4-methyl-1-pentene, 1-heptene, 1-octene, 1-decene, 1-dodecene and the like; $C_4$-$C_{20}$ diolefins, preferably 1,3-butadiene, 1,3-pentadiene, norbornadiene, 5-ethylidene-2-norbornene (ENB) and dicyclopentadiene; $C_{8-40}$ vinyl aromatic compounds including sytrene, o-, m-, and p-methylstyrene, divinylbenzene, vinylbiphenyl, vinylnapthalene; and halogen-substituted $C_{8-40}$ vinyl aromatic compounds such as chlorostyrene and fluorostyrene.

In one embodiment, the weight average molecular weight (Mw) of the propylene-based interpolymer of this invention is from 30,000 to 1,000,000. The molecular weight distribution (Mw/Mn) of the propylene-based interpolymer is typically from 2 to 6.

In another embodiment, propylene-based interpolymers of this invention are characterized as having substantially isotactic propylene sequences. "Substantially isotactic propylene sequences," and similar terms, mean that the sequences have an isotactic triad (mm) measured by $^{13}$C NMR of greater than about 0.85, preferably greater than about 0.90, more preferably greater than about 0.92, and most preferably greater than about 0.93. Isotactic triads are well known in the art, and are described in, for example, U.S. Pat. No. 5,504,172, and International Publication No. WO 00/01745, which refers to the isotactic sequence in terms of a triad unit in the copolymer molecular chain determined by 13C NMR spectra.

The propylene interpolymers of this invention include, but are not limited to, propylene/ethylene, propylene/ethylene/1-butene, propylene/ethylene/ENB, propylene/ethylene/1-hexene, propylene/ethylene/1-octene. Suitable propylene-base interpolymers include VERSIFY™ polymers (available from The Dow Chemical Company).

In one embodiment, the propylene-based interpolymer has a melt flow rate (MFR) greater than, or equal to, 0.1, preferably greater than, or equal to 0.2, more preferably greater than, or equal to 0.5 g/10 min. In another embodiment, the propylene-based interpolymer has a melt flow rate (MFR) less than, or equal to, 100, preferably less than, or equal to 50, more preferably less than, or equal to 20 g/10 min. The MFR is measured according to ASTM D-1238 (2.16 kg, 230° C.). In a preferred embodiment, the propylene-based interpolymer is a propylene/ethylene interpolymer. In a further embodiment, the ethylene content of the interpolymer ranges from 0.1 to 30 weight percent, preferably from 0.5 to 25 weight percent, and more preferably from 1 to 20 weight percent, based on the total weight of polymerizable monomers.

In another embodiment, the propylene-based interpolymer has a melt flow rate (MFR) from 0.1 to 100 g/10 min, preferably from 0.5 to 50 g/10 min, and more preferably from 1 to 10 g/10 min, and even more preferably from 1.5 to 8 g/10 min. All individual values and subranges from 0.1 to 100 g/10 min, are included herein and disclosed herein. The MFR is measured according to ASTM D-1238 (2.16 kg, 230° C.). In a preferred embodiment, the propylene-based interpolymer is a propylene/ethylene interpolymer. In a further embodiment, the ethylene content of the interpolymer ranges from 0.1 to 30 weight percent, preferably from 0.5 to 25 weight percent, and more preferably from 1 to 20 weight percent, based on the total weight of polymerizable monomers.

In another embodiment, the propylene-based interpolymer has a density less than, or equal to, 0.90 g/cc, preferably less than, or equal to, 0.89 g/cc, and more preferably less than, or equal to, 0.88 g/cc. In another embodiment, the propylene-based interpolymer has a density greater than, or equal to, 0.83 g/cc, preferably greater than, or equal to, 0.84 g/cc, and more preferably greater than, or equal to, 0.85 g/cc. In a preferred embodiment, the propylene-based interpolymer is a propylene/ethylene interpolymer. In a further embodiment, the ethylene content of the interpolymer ranges from 0.1 to 30 weight percent, preferably from 0.5 to 25 weight percent, and more preferably from 1 to 20 weight percent, based on the total weight of polymerizable monomers.

In another embodiment, the propylene-based interpolymer has a density from 0.83 g/cc to 0.90 g/cc, and preferably from 0.84 g/cc to 0.89 g/cc, and more preferably from 0.85 g/cc to 0.88 g/cc. All individual values and subranges from 0.83 g/cc to 0.90 g/cc, are included herein and disclosed herein. In a preferred embodiment, the propylene-based interpolymer is a propylene/ethylene interpolymer. In a further embodiment, the ethylene content of the interpolymer ranges from 0.1 to 30 weight percent, preferably from 0.5 to 25 weight percent, and more preferably from 1 to 20 weight percent, based on the total weight of polymerizable monomers.

In another embodiment, the propylene-based interpolymer has a molecular weight distribution less than, or equal to, 6, and preferably less than, or equal to, 5.5, and more preferably less than, or equal to 5. In another embodiment, the molecular weight distribution is greater than, or equal to, 2, preferably greater than, or equal to, 2.5, more preferably greater than, or equal to 3. In a preferred embodiment, the propylene-based interpolymer is a propylene/ethylene interpolymer. In a further embodiment, the ethylene content of the interpolymer ranges from 0.1 to 30 weight percent, preferably from 0.5 to 25 weight percent, and more preferably from 1 to 20 weight percent, based on the total weight of polymerizable monomers.

In another embodiment, the propylene-based interpolymer has a molecular weight distribution from 1.5 to 6, and more preferably from 2.5 to 5.5, and more preferably from 3 to 5. All individual values and subranges from 1.5 to 6 are included herein and disclosed herein. In a preferred embodiment, the propylene-based interpolymer is a propylene/ethylene interpolymer. In a further embodiment, the ethylene content of the interpolymer ranges from 0.1 to 30 weight percent, preferably from 0.5 to 25 weight percent, and more preferably from 1 to 20 weight percent, based on the total weight of polymerizable monomers.

As discussed above, the propylene-based interpolymers are made using a metal-centered, heteroaryl ligand catalyst, in combination with one or more activators, for example, an alumoxane. In certain embodiments, the metal is one or more of hafnium and/or zirconium. More specifically, in certain embodiments of the catalyst, the use of a hafnium metal has been found to be preferred, as compared to a zirconium metal, for heteroaryl ligand catalysts. The catalysts, in certain embodiments, are compositions comprising the ligand and metal precursor, and, optionally, may additionally include an activator, combination of activators, or activator package.

The catalysts used to make the propylene-based interpolymers additionally include catalysts comprising ancillary ligand-hafnium complexes, ancillary ligand-zirconium complexes and optionally activators, which catalyze polymerization and copolymerization reactions, particularly with monomers that are olefins, diolefins or other unsaturated compounds. Zirconium complexes, hafnium complexes, compositions or compounds can be used. The metal-ligand complexes may be in a neutral or charged state. The ligand to metal ratio may also vary, the exact ratio being dependent on the nature of the ligand and metal-ligand complex. The metal-ligand complex or complexes may take different forms, for example, they may be monomeric, dimeric, or of an even higher order. Suitable catalyst structures and associated ligands are described in U.S. Pat. No. 6,919,407, column 16, line 6 to column 41, line 23, which is incorporated herein by reference.

In a further embodiment, the propylene-based polymer comprises at least 50 weight percent propylene (based on the total amount of polymerizable monomers) and at least 5 weight percent ethylene (based on the total amount of polymerizable monomer), and has 13C NMR peaks, corresponding to a region error, at about 14.6 and 15.7 ppm, and the peaks are of about equal intensity (for example, see U.S. Pat. No. 6,919,407, column 12, line 64 to column 15, line 51).

The propylene-based interpolymers can be made by any convenient process. In one embodiment, the process reagents, that is, (i) propylene, (ii) ethylene and/or one or more unsaturated comonomers, (iii) catalyst, and, (iv) optionally, solvent and/or a molecular weight regulator (e.g., hydrogen), are fed to a single reaction vessel of any suitable design, for example, stirred tank, loop, or fluidized-bed. The process reagents are contacted within the reaction vessel under appropriate conditions (for example, solution, slurry, gas phase, suspension, high pressure) to form the desired polymer, and then the output of the reactor is recovered for post-reaction processing. All of the output from the reactor can be recovered at one time (as in the case of a single pass or batch reactor), or it can be recovered in the form of a bleed stream, which forms only a part, typically a minor part, of the reaction mass (as in the case of a continuous process reactor, in which an output stream is bled from the reactor, at the same rate at which reagents are added to maintain the polymerization at steady-state conditions).

"Reaction mass" means the contents within a reactor, typically during, or subsequent to, polymerization. The reaction mass includes reactants, solvent (if any), catalyst, and products and by-products. The recovered solvent and unreacted monomers can be recycled back to the reaction vessel. Suitable polymerization conditions are described in U.S. Pat. No. 6,919,407, column 41, line 23 to column 45, line 43, incorporated herein by reference.

A propylene-based polymer may have a combination of two or more suitable embodiments as described herein.

B. Halogenated Ethylene-Based Polymers

A halogenated polymer may comprise a combination of two or more appropriate embodiments as described herein.

Suitable halogenated ethylene-based polymers include chlorinated ethylene-based polymers and fluorinated ethylene-based polymers. Suitable chlorinated ethylene-based polymers include Tyrin™ chlorinated polymers available from The Dow Chemical Company.

Examples of chlorinated ethylene interpolymers include those prepared from copolymers comprising ethylene and at least one ethylenically unsaturated monomer, selected from the group consisting of $C_3$-$C_{10}$ alpha monoolefins. Chlorinated graft copolymers are included as well. Specific examples of suitable chlorinated ethylene copolymers, which may be employed in the compositions of this invention, include copolymers of ethylene with propylene, 1-butene, 3-methyl-1-pentene, 1-pentene, 1-hexene, 1-heptene or octene. The copolymers may be dipolymers, terpolymers, or higher order copolymers. Chlorinated polyethylene is a preferred chlorinated olefin elastomer. Some particular examples of chlorinated elastomers are described further below. Chlorinated ethylene ester copolymers, such as ethylene methyl acrylate and ethylene methyl methacrylate, may also be suitable for used in the invention.

Suitable chlorinated ethylene-based polymers may be selected from the group consisting of a) chlorinated polyethylene homopolymers prepared from polyethylenes having an $I_{10}$ value of from 0.01 to 120 dg/min, and more preferably from 0.05 to 100 dg/min, and b) chlorinated ethylene copolymers prepared from ethylene copolymers having an $I_{10}$ value of from 0.01 to 120 dg/min that comprise copolymerized units of i) ethylene and ii) up to 25 weight percent (based on the total weight of monomers) of a copolymerizable monomer, and having $I_{10}$ values of from 0.05 to 0.8 dg/minute. Such polymers preferably have a chlorine content from 15 to 48 weight percent by weight, and more preferably from 25 to 38 weight percent based on total weight of polymer. In one embodiment, the molecular weights of the non-chlorinated polyolefin base resins range from 400,000 to 1,000,000 g/mole.

In one embodiment, the chlorinated ethylene-based polymers may be prepared from ethylene-based polymers that are branched or unbranched. The ethylene-based polymer may be prepared by free radical processes, Ziegler-Natta catalysis, or catalysis with metallocene catalyst systems, for example those disclosed in U.S. Pat. Nos. 5,272,236 and 5,278,272, each incorporated herein, in its entirety, by reference.

A halogenated ethylene-based polymer may have a combination of two or more suitable embodiments as described herein.

C. Elastomeric Rubbers for Compatibilized Blends

An elastomeric rubber may comprise a combination of two or more appropriate embodiments as described herein.

Examples of applicable elastomeric rubbers include homopolymers of conjugated dienes, especially butadiene or isoprene, and random or block co- and terpolymers of at least one conjugated diene, especially butadiene or isoprene, with at least one aromatic α-olefin, especially styrene and 4-methylstyrene, aromatic diolefin, especially divinylbenzene. Especially preferred is the random copolymerization, optionally terpolymerization, of at least one conjugated diene with at least one aromatic α-olefin, and optionally, at least one aromatic diolefin or aliphatic α-olefin, especially butadiene or isoprene with styrene, 4-methylstyrene and/or divinylbenzene.

Preferred modified elastomeric polymers (or modified polymers) include modified polybutadiene, modified polyisoprene, modified styrene-butadiene copolymer, modified styrene-isoprene copolymer, modified butadiene-isoprene copolymer, and modified isoprene-styrene copolymer. More preferred elastomers (or polymers) include modified polybutadiene and modified styrene-butadiene copolymer. The terms "modified elastomeric polymers" and "modified polymers" refer to the "chain end modified polymers" as discussed above.

In one embodiment, the elastomeric rubber is selected from the group consisting of homopolymers of isoprene, homopolymers of butadiene, copolymers of butadiene with styrene, copolymers of isoprene with styrene, terpolymers butadiene with isoprene and styrene, and combinations thereof. In another embodiment, the elastomeric rubber is selected from the group consisting of homopolymers of butadiene and copolymers of butadiene with styrene.

Preferred elastomeric rubbers include: cis-1,4-isoprene polymer, natural rubber, 3,4-isoprene polymer, styrene/butadiene copolymer polymer, styrene/isoprene/butadiene terpolymer, cis-1,4-butadiene polymer, trans-1,4-butadiene polymer, low to high vinyl butadiene polymers (having a vinyl content of 10-90 percent), acrylonitrile/butadiene copolymers, and chloroprene polymers. Of these, styrene-butadiene copolymer, natural rubbers, polyisoprene, and polybutadiene are very preferable. In one embodiment, the rubber has a Mooney viscosity (ML 1+4, 100° C.) in the range from 20 to 200, and preferably from 25 to 150 (measured in accordance with ASTM D 1646 (2004).

Examples of applicable elastomeric rubbers include the following: BR-polybutadiene; ABR-butadiene/C1-C4-alkyl acrylate copolymers; HIPS-butadiene/styrene copolymers; CR-polychloroprene; IR-polyisoprene; SBR-styrene/butadiene copolymers with styrene contents of 1 to 60, and preferably 20 to 50 wt %; IIR-isobutylene/isoprene copolymers; NBR-butadiene/acrylonitrile copolymers with acrylonitrile contents of 5 to 60, preferably 20 to 50 wt %; HNBR-partially hydrogenated or fully hydrogenated NBR rubber; EPDM-ethylene/propylene/diene copolymers and mixtures of theses rubbers.

Additional preferred rubbers are as follows: (a) polybutadiene having a Mooney range from 30 to 80, and a vinyl bond content ranging from 5 to 30 weight percent, based on the conjugation diolefin portion of the elastomeric rubber; (b) polybutadiene having a Mooney range from 30 to 80, and a vinyl bond content ranging from 45 to 80 weight percent, based on the conjugation diolefin portion of the elastomeric rubber; (c) butadiene-styrene copolymer having a Mooney range from 45 to 80, a vinyl bond content ranging from 50 to 80 weight percent, based on the conjugation diolefin portion of the elastomeric rubber, and a styrene content of 15 to 30 weight percent (in the copolymer), having 50 weight percent or more of the styrene units linked singly, and 10 weight percent or less linked to "blocks" of eight or more styrene units; and (d) modified butadiene-styrene copolymer having a Mooney range from 45 to 80, a vinyl bond content ranging from 5 to 50 weight percent, based on the conjugation diolefin portion of the elastomeric rubber, and a styrene content of 30 to 55 weight percent (in the copolymer), having 40 weight percent or more of the styrene units linked singly, and 10 weight percent or less linked to "blocks" of eight or more styrene units.

Polyisoprene

Polyisoprenes include both natural polyisprene and synthetic polyisoprene. Suitable polyisoprenes include, but are not limited to, natural cis-1,4-polyisoprene, synthetic cis-1,4-polyisoprene, high vinyl 3,4-polyisoprene and 3,4-polyisoprene.

In one embodiment, the polyisoprene has a Mooney Viscosity (ML 1+4 at 100° C.) from 20 to 100, and preferably from 40 to 80.

Suitable examples of polyisoprenes include the following technical grades: SMR (Standard Malaysian Rubber), such as SRM 5 and SMR 20; TSR (Technical Specified Rubber) and RSS (Ribbed Smoked Sheets).

A polyisoprene may comprise a combination of two or more appropriate embodiments as described herein.

Polybutadiene

Suitable polybutadienes includes, but is not limited to, natural cis-1,4-polybutadiene, trans-1,4-polybutadiene, vinyl-1,2-polybutadiene, copolymers of styrene and butadiene, copolymers of isoprene and butadiene, and interpolymers of styrene, isoprene and butadiene.

In one embodiment, the polybutadiene has a Mooney Viscosity (ML 1+4 at 100° C.) from 10 to 100, preferably from 15 to 90, and more preferably from 20 to 80.

Examples of suitable polybutadienes include EUROPRENE NEOCIS BR 40 from POLIMERI EUROPA, and BUNA CB 24 from LANXESS.

A polybutadiene may comprise a combination of two or more appropriate embodiments as described herein.

Thermoplastic Polyurethanes

The polyurethane component has no limitation in respect of its formulation, other than (i) it is different from the polydiene-based polyurethane or the polydiol-based polyurethane of component C) as described above in one or more of chemical composition, density and melt index ($I_2$), and (ii) it is thermoplastic in nature, which means it is prepared from substantially difunctional ingredients, for example, organic diisocyanates and components being substantially difunctional in active hydrogen containing groups. However, some times minor proportions of ingredients with functionalities higher than two may be employed. This is particularly true when using extenders such as glycerin, trimethylolpropane, and the like. Such thermoplastic polyurethane compositions are generally referred to as TPU materials. Accordingly, any of the TPU materials known in the art can be employed in the present compositions. For representative teaching on the preparation of TPU materials see Polyurethanes: Chemistry and Technology, Part II, Saunders and Frisch, 1964 pp 767 to 769, Interscience Publishers, New York, N.Y. and Polyurethane Handbook, Edited by G. Oertel 1985, pp 405 to 417, Hanser Publications, distributed in U.S.A. by Macmillan Publishing Co., Inc., New York, N.Y. For particular teaching on various TPU materials and their preparation see U.S. Pat. Nos. 2,929,800; 2,948,691; 3,493,634; 3,620,905; 3,642,964; 3,963,679; 4,131,604; 4,169,196; Re 31,671; 4,245,081; 4,371,684; 4,379,904; 4,447,590; 4,523,005; 4,621,113; and 4,631,329; the disclosures of which are hereby incorporated herein by reference.

The preferred TPU is a polymer prepared from a mixture comprising an organic diisocyanate, at least one polymeric diol and at least one difunctional extender. The TPU may be prepared by the prepolymer, quasi-prepolymer, or one-shot methods in accordance with the methods described in the incorporated references above.

Di-isocyanates suitable for use in preparing the hard segment of the polyurethanes according to this invention include aromatic, aliphatic, and cycloaliphatic di-isocyanates and combinations of two or more of these compounds. An example of a structural unit derived from di-isocyanate (OCN—R—NCO) is represented by formula (I) below:

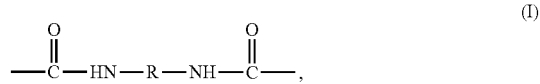

in which R is an alkylene, cycloalkylene, or arylene group. Representative examples of these di-isocyanates can be found in U.S. Pat. Nos. 4,385,133, 4,522,975 and 5,167,899. Preferred di-isocyanates include, but are not limited to, 4,4'-di-isocyanatodipheny-lmethane, p-phenylene di-isocyanate, 1,3-bis(isocyanatomethyl)-cyclohexane, 1,4-di-isocyanato-cyclohexane, hexamethylene di-isocyanate, 1,5-naphthalene di-isocyanate, 3,3'-dimethyl-4,4'-biphenyl di-isocyanate, 4,4'-di-isocyanato-dicyclohexylmethane, and 2,4-toluene di-isocyanate. More preferred are 4,4'-di-isocyanato-dicyclohexylmethane and 4,4'-di-isocyanato-diphenylmethane. A preferred is 4,4'-di-isocyanatodiphenylmethane.

Di-isocyanates also include aliphatic and cycloaliphatic isocyanate compounds, such as 1,6-hexamethylene-di-isocyanate; ethylene di-isocyanate; 1-isocyanato-3,5,5-trimethyl-1-3-isocyanatomethylcyclohexane; 2,4- and 2,6-hexahydrotoluenedi-isocyanate, as well as the corresponding isomeric mixtures; 4,4'-, 2,2'- and 2,4'-dicyclohexyl-methanedi-isocyanate, as well as the corresponding isomeric mixtures. Also, 1,3-tetramethylene xylene di-isocyanate can be used with the present invention. The isocyanate may be selected from organic isocyanates, modified isocyanates, isocyanate-based pre-polymers, and mixtures of two or more of these isocyanates.

Any of the organic diisocyanates previously employed in TPU preparation can be employed, including aromatic, aliphatic, and cycloaliphatic diisocyanates, and mixtures thereof. Illustrative isocyanates include, but are not limited to, methylenebis(phenyl isocyanate), including the 4,4'-isomer, the 2,4'-isomer and mixtures thereof; m- and p-phenylene diisocyanates; chlorophenylene diisocyanates; α,α'-xylylene diisocyanate; 2,4- and 2,6-toluene diisocyanate and the mixtures of these latter two isomers, which are available commercially, tolidine diisocyanate; hexamethylene diisocyanate; 1,5-naphthalene diisocyanate; isophorone diisocyanate and the like; cycloaliphatic diisocyanates, such as methylenebis(cyclohexyl isocyanate), including the 4,4'-isomer, the 2,4'-isomer and mixtures thereof, and all the geometric isomers thereof, including trans/trans, cis/trans, cis/cis, and mixtures thereof; cyclohexylene diisocyanates (1,2-; 1,3-; or 1,4-); 1-methyl-2,5-cyclohexylene diisocyanate; 1-methyl-2,4-cyclohexylene diisocyanate; 1-methyl-2,6-cyclohexylene diisocyanate; 4, 4'-isopropylidenebis-(cyclohexyl isocyanate); 4,4'-diisocyanatodicyclohexyl, and all geometric isomers and mixtures thereof and the like.

Also included are the modified forms of methylenebis(phenyl isocyanate). By the latter are meant those forms of methylenebis(phenyl isocyanate) which have been treated to render them stable liquids at ambient temperature (circa 20° C.). Such products include those which have been reacted with a minor amount (up to about 0.2 equivalents per equivalent of polyisocyanate) of an aliphatic glycol or a mixture of aliphatic glycols, such as the modified methylenebis(phenyl isocyanates) described in U.S. Pat. Nos. 3,394,164; 3,644,457; 3,883,571; 4,031,026; 4,115,429; 4,118,411; and 4,299,347; each incorporated herein by reference. The modified methylenebis(phenyl isocyanates) also include those, which have been treated so as to convert a minor proportion of the diisocyanate to the corresponding carbodiimide, which then interacts with further diisocyanate to form uretone-imine groups, the resulting product being a stable liquid at ambient temperatures as described, for example, in U.S. Pat. No. 3,384,653; incorporate herein by reference. Mixtures of any of the above-named polyisocyanates can be employed if desired.

Suitable classes of organic diisocyanates include the aromatic and cycloaliphatic diisocyanates. Preferred species within these classes are methylenebis(phenyl isocyanate) including the 4,4'-isomer, the 2,4'-isomer, and mixtures thereof, and methylenebis(cyclohexyl isocyanate), inclusive of the isomers described above. In a preferred embodiment the isocyanate is a mixture of 1,3-bis(isocyanatomethyl)cyclohexane and 1,4-bis(isocyanatomethyl)cyclohexane. In a further embodiment, these two isocyanates are present in a weight ratio of about 1 to 1.

In one embodiment, the polydiene-based polyurethane and, preferably, a polydiene diol-based polyurethane, is formed from at least one aliphatic or cyclo-aliphatic diisocyanate. In a further embodiment, both the polydiene-based polyurethane, and preferably a polydiene diol-based polyurethane, and the thermoplastic polyurethane are each, independently, formed from at least one aliphatic diisocyanate.

In another embodiment, the polydiol-based polyurethane is formed from at least one aliphatic or cyclo-aliphatic diisocyanate. In a further embodiment, both the poly diol-based polyurethane and the thermoplastic polyurethane are each, independently, formed from at least one aliphatic diisocyanate. In yet a further embodiment, the polydiol-based polyurethane comprises at least one diol made from one or more seed oil triglycerides selected from the group consisting of palmitic, stearic, oleic, linoleic and linolenic acid or ester.

The polymeric diols which can be used include those conventionally employed in the art for the preparation of TPU elastomers. The polymeric diols are responsible for the formation of soft segments in the resulting polymer, and preferably have molecular weights (number average) falling in the range from 200 to 10,000 g/mole, preferably from 400 to 4,000 g/mole, and, more preferably from 500 to 3,000 g/mole. It is not unusual, and, in some cases, it can be advantageous, to employ more than one polymeric diol. Exemplary of the diols are polyether diols, polyester diols, hydroxy-terminated polycarbonates, hydroxy-terminated polybutadienes, hydroxy-terminated polybutadiene-acrylonitrile copolymers, hydroxy-terminated copolymers of dialkyl siloxane and alkylene oxides, such as ethylene oxide, propylene oxide, and the like, and mixtures, in which any of the above polyols are employed as major component (greater than 50% w/w) with amine-terminated polyethers and amino-terminated polybutadiene-acrylonitrile copolymers. Additional examples of the diols include the natural oil diols.

Suitable polyether polyols include polyoxyethylene glycols, polyoxypropylene glycols, which, optionally, have been capped with ethylene oxide residues; random and block copolymers of ethylene oxide and propylene oxide; polytetramethylene glycol; random and block copolymers of tetrahydrofuran and ethylene oxide and/or propylene oxide; and products derived from any of the above reaction with difunctional carboxylic acids or esters derived from said acids, in which latter case, ester interchange occurs, and the esterifying radicals are replaced by polyether glycol radicals. The preferred polyether polyols are random and block copolymers of ethylene and propylene oxide of functionality about 2.0 and polytetramethylene glycol polymers of functionality about 2.0.

Suitable polyester polyols include those prepared by polymerizing epsilon-caprolactone using an initiator such as ethylene glycol, ethanolamine, and the like; and those prepared by esterification of polycarboxylic acids such as phthalic, terephthalic, succinic, glutaric, adipic azelaic, and the like acids, with polyhydric alcohols, such as ethylene glycol, butanediol, cyclohexanedimethanol, and the like.

Suitable amine-terminated polyethers are the aliphatic primary diamines structurally derived from polyoxypropylene glycols. Polyether diamines of this type were available from Jefferson Chemical Company under the trademark JEFFAMINE (now available from Basell).

Suitable polycarbonates containing hydroxyl groups include those prepared by reaction of diols, such as propane-1,3-diol, butane-1,4-diol, hexan-1,6-diol, 1,9-nonanediol, 2-methyloctane-1,8-diol, diethylene glycol, triethylene glycol, dipropylene glycol, and the like, with diarylcarbonates, such as diphenylcarbonate, or with phosgene.

Suitable silicon-containing polyethers include the copolymers of alkylene oxides with dialkylsiloxanes, such as dimethylsiloxane, and the like (see, for example, U.S. Pat. No. 4,057,595, or U.S. Pat. No. 4,631,329 cited supra, and already incorporated herein).

Suitable hydroxy-terminated polybutadiene copolymers include the compounds available under the trade name Poly BD Liquid Resins from Arco Chemical Company. Hydroxy-terminated polybutadiene copolymers are also available from Sartomer. Illustrative of the hydroxy- and amine-terminated butadiene/acrylonitrile copolymers are the materials available under the trade name HYCAR hydroxyl-terminated (HT) Liquid Polymers and amine-terminated (AT) Liquid Polymers, respectively. Preferred diols are the polyether and polyester diols set forth above.

The difunctional extender employed can be any of those known in the TPU art disclosed above. Typically the extenders can be aliphatic straight and branched chain diols having from 2 to 10 carbon atoms, inclusive, in the chain. Illustrative of such diols are ethylene glycol, 1,3-propanediol, 1,4-butanediol, 1,5-pentanediol, 1,6-hexanediol, neopentyl glycol, and the like; 1,4-cyclohexanedimethanol; hydroquinonebis-(hydroxyethyl)ether; cyclohexylenediols (1,4-, 1,3-, and 1,2-isomers), isopropylidenebis(cyclohexanols); diethylene glycol, dipropylene glycol, ethanolamine, N-methyldiethanolamine, and the like; and mixtures of any of the above. As noted previously, in some cases, minor proportions (less than about 20 equivalent percent) of the difunctional extender may be replaced by trifunctional extenders, without detracting from the thermoplasticity of the resulting TPU; illustrative of such extenders are glycerol, trimethylolpropane, and the like.

While any of the diol extenders, described and exemplified above, can be employed alone, or in admixture, it is preferred to use 1,4-butanediol, 1,6-hexanediol, neopentyl glycol, 1,4-cyclohexanedimethanol, ethylene glycol, and diethylene glycol, either alone, or in admixture, with each other, or with one or more aliphatic diols previously named. Particularly preferred diols are 1,4-butanediol, 1,6-hexanediol and 1,4-cyclohexanedimethanol.

The chain extender is incorporated into the polyurethane in amounts determined by the selection of the specific reactant components, the desired amounts of the hard and soft segments, and the index sufficient to provide good mechanical properties, such as modulus and tear strength. The polyurethane compositions used in the practice of this invention may contain from 2 to 25, preferably from 3 to 20 and more preferably from 4 to 18, wt % of the chain extender component.

If desired, optionally, small amounts of monohydroxyl-functional or monoaminofunctional compounds, often termed "chain stoppers," may be used to control molecular weight. Illustrative of such chain stoppers are the propanols, butanols, pentanols, and hexanols. When used, chain stoppers are typically present in minor amounts from 0.1 to 2 weight percent of the entire reaction mixture leading to the polyurethane composition.

The equivalent proportions of polymeric diol to said extender can vary considerably depending on the desired hardness for the TPU product. Generally speaking, the proportions fall within the respective range of from about 1:1 to about 1:20, preferably from about 1:2 to about 1:10. At the same time the overall ratio of isocyanate equivalents to equivalents of active hydrogen containing materials is within the range of 0.90:1 to 1.10:1, and preferably, 0.95:1 to 1.05:1.

The TPU forming ingredients can be reacted in organic solvents, but are preferably reacted, in the absence of solvent, by melt-extrusion, at a temperature of from about 125° C. to about 250° C., preferably from about 160° C. to about 225° C.

It is frequently desirable, but not essential, to include a catalyst in the reaction mixture employed to prepare the compositions of the invention. Any of the catalysts, conventionally employed in the art, to catalyze the reaction of an isocyanate with a reactive hydrogen containing compound, can be employed for this purpose; see, for example, Saunders et al., Polyurethanes, Chemistry and Technology, Part I, Interscience, New York, 1963, pages 228-232; see also, Britain et al., J. Applied Polymer Science, 4, 207-211, 1960; each incorporated herein by reference. Such catalysts include organic and inorganic acids salts of, and organometallic derivatives of, bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Representative organotin catalysts are stannous octoate, stannous oleate, dibutyltin dioctoate, dibutyltin dilaurate, and the like. Representative tertiary organic amine catalysts are triethylamine; triethylenediamine; N,N,N',N'-tetramethylethylenediamine; N,N,N',N'-tetraethylethylenediamine, N-methylmorpholine; N-ethylmorpholine; N,N,N',N'-tetramethylguanidine; N,N,N',N'-tetramethyl-1,3-butanediamine; N,N-dimethylethanolamine; N,N-diethylethanolamine; and the like. The amount of catalyst employed, is generally within the range of about 0.02 to about 2.0 percent by weight, based on the total weight of the reactants.

As discussed above, the polyurethanes can be prepared by mixing all ingredients, at essentially the same time in a "one-shot" process, or can be prepared by step-wise addition of the ingredients in a "prepolymer process," with the processes being carried out in the presence of, or without the addition of, optional additives. The polyurethane forming reaction can take place in bulk, or in solution, with, or without, the addition of a suitable catalyst that would promote the reaction of isocyanates with hydroxyl or other functionality. Examples of a typical preparation of these polyurethanes are described in U.S. Pat. No. 5,864,001.

As discussed above, the other main component of the hard segment of the polyurethanes of the present invention is at least one chain extender, which are well know in this technology field. As is known, when the chain extender is a diol, the resulting product is a thermoplastic polyurethane (TPU). When the chain extender is a diamine or an amino alcohol, the resulting product is technically a thermoplastic polyurea (TPUU).

The chain extenders that may be used in the invention are characterized by two or more, preferably two, functional groups, each of which contains "active hydrogen atoms."These functional groups are preferably in the form of hydroxyl, primary amino, secondary amino, or mixtures of two or more of these groups. The term "active hydrogen atoms" refers to hydrogen atoms that, because of their placement in a molecule, display activity according to the Zerewitinoff test as described by Kohler in *J. Am. Chemical Soc.*, 49, 31-81 (1927).

The chain extenders may be aliphatic, cycloaliphatic, or aromatic and are exemplified by diols, diamines, and amino alcohols. Illustrative of the difunctional chain extenders are ethylene glycol, diethylene glycol, propylene glycol, dipropylene glycol, 1,3-propanediol, 1,3-butanediol, 1,4-butanediol, 1,5-pentanediol and other pentane diols, 2-ethyl-1,3-hexanediol, 2-ethyl-1,6-hexanediol, other 2-ethyl-hexanediols, 1,6-hexanediol and other hexanediols, 2,2,4-trimethylpentane-1,3-diol, decanediols, dodecanediols, bisphenol A, hydrogenated bisphenol A, 1,4cyclohexanediol, 1,4-bis(2-hydroxyethoxy)-cyclohexane, 1,3-cyclohexanedimethanol, 1,4-cyclohexanediol, 1,4-bis(2-hydroxyethoxy)benzene, Esterdiol 204 (propanoic acid, 3-hydroxy-2,2-dimethyl-, 3-hydroxy-2,2-dimethylpropyl ester available from TCI America), N-methylethanolamine, N-methyl isopropylamine, 4-aminocyclo-hexanol, 1,2-diaminotheane, 1,3-diaminopropane, diethylenetriamine, toluene-2,4-diamine, and toluene-1,6-diamine. Aliphatic compounds containing from 2 to 8 carbon atoms are preferred. If thermoplastic or soluble polyurethanes are to be made, the chain extenders will be difunctional in nature. Amine chain extenders include, but are not limited to, ethylenediamine, monomethanolamine, and propylenediamine.

Commonly used linear chain extenders are generally diol, diamine or amino alcohol compounds characterized by having a molecular weight of not more than 400 g/mol (or Dalton). In this context, by "linear" it is meant that no branching from tertiary carbon is included. Examples of suitable chain extenders are represented by the following formulae: HO—$(CH_2)_n$—OH, $H_2N$—$(CH_2)_n$—$NH_2$, and $H_2N$—$(CH_2)_n$—OH, where "n" is typically a number from 1 to 50.

One common chain extender is 1,4-butane diol ("butane diol" or "BDO"), and is represented by the following formula: HO—$CH_2CH_2CH_2CH_2$—OH. Other suitable chain extenders include ethylene glycol; diethylene glycol; 1,3-propanediol; 1,6-hexanediol; 1,5-heptanediol; triethyleneglycol; 1,2-ethyl hexenediol (EHD diol); and combinations of two or more of these extenders. In one embodiment, the chain extender is 1,2-ethyl hexenediol (EHD diol).

Also suitable, are cyclic chain extenders which are generally diol, diamine or amino alcohol compounds characterized by having a molecular weight of not more than 400 g/mol. In this context, by "cyclic" it is meant a ring structure, and typical ring structures include, but are not limited to, the 5 to 8 member ring structures with hydroxyl-alkyl branches. Examples of cyclic chain extender are represented by the following formulae: HO—R-(ring)-R'—OH and HO—R—O-(ring)-O—R'—OH, where R and R' are one to five carbon alkyl chains, and each ring has 5 to 8 members, preferably all carbons. In these examples, one or both of the terminal —OH can be replaced with —$NH_2$. Suitable cyclic chain extenders include cyclohexane dimethanol ("CHDM") and hydroquinone bis-2-hydrxyethyl ether (HQEE). A structural unit of CHDM, a preferred cyclic chain extender, is represented by the following formula: HO—$CH_2$-(cyclohexane ring)-$CH_2$—OH.

The chain extender is incorporated into the polyurethane in amounts determined by the selection of the specific reactant components, the desired amounts of the hard and soft segments and the index sufficient to provide good mechanical properties, such as modulus and tear strength. The polyurethane compositions used in the practice of this invention may contain from 2 to 25, preferably from 3 to 20 and more preferably from 4 to 18, wt % of the chain extender component.

If desired, optionally, small amounts of monohydroxyl-functional or monoaminofunctional compounds, often termed "chain stoppers," may be used to control molecular weight. Illustrative of such chain stoppers are the propanols, butanols, pentanols, and hexanols. When used, chain stoppers are typically present in minor amounts from 0.1 to 2 wt % of the entire reaction mixture leading to the polyurethane composition.

As is well known to those skilled in the art, the ratio of isocyanate to total functional groups determines the Mn of the polymer. In some cases it is desirable to use a very slight excess of isocyanate.

For linear, high Mn polymers, starting materials with two functional groups per chain are desirable. However, it is possible to accommodate starting materials with a range of functionality. For example, a polydiene with one functional end could be used to cap both ends of a polyurethane with the middle portion consisting of repeating isocyanate-chain extender moieties. Polydienes with more than two functional groups will form branched polymers. Although crosslinking and gels can be a problem, if the degree of functionality is too high, this can usually be controlled by process conditions. Such branched polymers will exhibit some rheological characteristics that are desirable in some cases, such as high melt strength.

As discussed above, catalysts that will promote or facilitate the formation of urethane groups may optionally be used in the formulation. Illustrative of useful catalysts are stannous octanoate, dibutyltin dilaurate, stannous oleate, tetrabutyltin titanate, tributyltin chloride, cobalt naphthenate, dibutyltin oxide, potassium oxide, stannic chloride, N,N,N',N'-tetramethyl-1,3-butanediamine, bis[2-(N,N-dimethylamino)ethyl] ether, 1,4-diazabicyclo[2.2.2]octane; zirconium chelates, aluminum chelates and bismuth carbonates. The catalysts, when used, are typically employed in catalytic amounts that may range from 0.001 wt %, and lower, to 2 wt %, and higher, based on the total amount of polyurethane-forming ingredients.

Additives may be used to modify the properties of the polyurethane used in the practice of this invention. Additives may be included in the conventional amounts as already known in the art and literature. Usually additives are used to provide specific desired properties to the polyurethanes such as various antioxidants, ultraviolet inhibitors, waxes, thickening agents and fillers. When fillers are used, they may be either organic or inorganic, but are generally inorganic such as clay, talc, calcium carbonate, silica and the like. Also, fibrous additives, such as glass or carbon fiber, may be added to impart certain properties.

The polyurethane used in the practice of the present invention is preferably prepared by reacting the functional polyester with an isocyanate, and optionally a chain extender. In the 'prepolymer' method, typically one or more functional polydienes are reacted with one or more isocyanates to form a prepolymer. The prepolymer is further reacted with one or more chain extenders. Alternatively, the polyurethanes may be prepared by a one-shot reaction of all of the reactants. Typical polyurethanes have a number average molecular weight from 5,000 to 1,000,000 g/mol, and more preferably from 20,000 to 100,000 g/mol.

In a preferred embodiment of the invention, the polyurethane is formed from a polyester, an isocyanate and a chain extender, and preferably an aliphatic chain extender. In a preferred embodiment, these polyesters have at least one, and more preferably at least two ester groups in the molecule, and typically have a Mn from 500 to 10,000, more preferably from 1,000 to 5,000 and even more preferably from 1,500 to 3,000 g/mol.

In another embodiment, the polyurethane is formed from a composition comprising 10 to 40 wt % of di-isocyanate, preferably 15 to 35 wt % of di-isocyanate; 50 to 85 wt % of a polyester, preferably 55 to 80 wt % of a polyester, and more preferably 60 to 80 wt % of a polyester; and 2 to 15 wt % of a chain extender, preferably 2 to 10 wt % of a chain extender (each weight percentage based on the total weight of reactants). In a further embodiment, the di-isocyanate is an aliphatic or aromatic di-isocyanate, and more preferably 4,4'-diphenylmethane di-isocyanate. In yet a further embodiment, the chain extender is an aliphatic diol. In another embodiment, the polydiene diol has a Mn from 500 to 10,000, more preferably from 1,000 to 5,000 and even more preferably from 1,500 to 3,000, g/mol.

In one embodiment, the polyurethane has a density greater than, or equal to, 0.90 g/cc, preferably greater than, or equal to, 0.95 g/cc, and more preferably greater than, or equal to, 1.00 g/cc. In another embodiment, the polyurethane has a density less than, or equal to, 1.30 g/cc, preferably less than, or equal to, 1.25 g/cc, and more preferably less than, or equal to, 1.20 g/cc. In another embodiment, the polyurethane has a density from 0.90 g/cc to 1.30 g/cc, preferably from 0.95 g/cc to 1.25 g/cc, and more preferably from 1.00 g/cc to 1.20 g/cc. All individual values and subranges from 0.90 g/cc to 1.30 g/cc are included and described herein.

In another embodiment, the polyurethane has a melt index greater than, or equal to, 0.1 g/10 min, preferably greater than, or equal to, 0.5 g/10 min, and more preferably greater than, or equal to, 1 g/10 min (ASTM D-1238-04, 190° C., 8.7 kg). In another embodiment, the polyurethane has a melt index less than, or equal to, 100 g/10 min, preferably less than, or equal to, 50 g/10 min, more preferably less than, or equal to, 20 g/10 min, and even more preferably less than, or equal to, 10 g/10 min (ASTM D-1238-04, 230-C, 8.7 kg). In another embodiment, the polyurethane has a melt index from 0.1 g/10 min to 100 g/10 min, preferably from 0.5 g/10 min to 50 g/10 min, more preferably from 1 g/0 min to 20 g/10 min, and even more preferably from 1 g/10 min to 10 g/10 min. In a preferred embodiment, the polyurethane has a melt index from 6 g/10 min to 10 g/10 min, and preferably from 7 g/10 min to 9 g/10 min. All individual values and subranges from 0.1 g/10 min to 100 g/10 min are included and described herein.

Preferred polyurethanes include the Pellethane™ thermoplastic polyurethane elastomers available from The Dow Chemical Company.

Additional polyurethanes suitable for use in the invention include, but are not limited to, ESTANE thermoplastic polyurethanes, TECOFLEX thermoplastic polyurethanes, CARBOTHANE thermoplastic polyurethanes, TECOPHILIC thermoplastic polyurethanes, TECOPLAST thermoplastic polyurethanes, and TECOTHANE thermoplastic polyurethanes, all available from Noveon; ELASTOLLAN thermoplastic polyurethanes and other thermoplastic polyurethanes available from BASF; and commercial thermoplastic polyurethanes available from Bayer, Huntsman and Merquinsa.

The polyurethane component of the compatibilized blends used in the practice of the invention may contain a combination of two or more suitable embodiments as described above.

If desired, the polyurethanes can have incorporated in them, at any appropriate stage of preparation, additives such as pigments, fillers, lubricants, stabilizers, antioxidants, coloring agents, fire retardants, and the like, which are commonly used in conjunction with polyurethane elastomers.

Compositions

Compositions of the invention contain the following: a) at least one olefin-based polymer, at least one chlorinated ethylene-based polymer, or at least one elastomeric rubber; b) at least one polyurethane; and c) at least one polydiene- or polydiol-based polyurethane. Preferably, the one polydiene- or polydiol-based polyurethane is present in an amount less than, or equal to, 20 weight percent, more preferably less than, or equal to, 15 weight percent, and even more preferably less than, or equal to, 10 weight percent, based on the total weight of the composition.

In one embodiment, the composition comprises from 15 to 35 weight percent, and preferably from 20 to 30 weight percent of the thermoplastic polyurethane, based on the total weight of the composition.

In another embodiment, the composition comprises from 55 to 80 weight percent, and preferably from 60 to 75 weight percent of an ethylene-based polymer, as described herein, or a propylene-based polymer, as described herein.

In another embodiment, the composition comprises from 55 to 80 weight percent, and preferably from 60 to 75 weight percent of a halogenated ethylene-based polymer, based on the total weight of the composition. Preferably the halogenated ethylene-based polymer based polymer is a chlorinated ethylene-based polymer or a chlorinated propylene-based polymer.

In another embodiment, the composition comprises from 55 to 80 weight percent, and preferably from 60 to 75 weight percent of an elastomeric rubber, based on the total weight of the composition.

In another embodiment, the composition comprises from 55 to 80 weight percent, and preferably from 60 to 75 weight percent of an ethylene/α-olefin interpolymer, as described herein, based on the total weight of the composition. Preferably, the α-olefin is selected from the group consisting of propylene, 1-butene, 1-hexene and 1-octene, and more preferably 1-octene.

In another embodiment, the composition comprises from 55 to 80 weight percent, and preferably from 60 to 75 weight percent of a propylene/ethylene interpolymer, as described herein, based on the total weight of the composition.

In one embodiment, the composition comprises from 5 to 10 weight percent of the polydiene- or polydiol-based polyurethane; from 15 to 35 weight percent of the thermoplastic polyurethane; and from 55 to 80 weight percent of an ethylene/α-olefin interpolymer, as described herein, each based on the total weight of the composition. Preferably, the α-olefin is selected from the group consisting of propylene, 1-butene, 1-hexene and 1-octene, and more preferably 1-octene.

In another embodiment, the composition comprises from 5 to 10 weight percent of the polydiene- or polydiol-based polyurethane; from 20 to 30 weight percent of the thermoplastic polyurethane; and from 60 to 75 weight percent of an ethylene/α-olefin interpolymer, as described herein, each based on the total weight of the composition. Preferably, the α-olefin is selected from the group consisting of propylene, 1-butene, 1-hexene and 1-octene, and more preferably 1-octene.

In another embodiment, the composition comprises from 5 to 10 weight percent of the polydiene- or polydiol-based polyurethane; from 15 to 35 weight percent of the thermoplastic polyurethane; and from 55 to 80 weight percent of a propylene/ethylene interpolymer, each based on the total weight of the composition.

In one embodiment, the composition comprises from 5 to 10 weight percent of the polydiene- or polydiol-based polyurethane; from 20 to 30 weight percent of the thermoplastic polyurethane; and from 60 to 75 weight percent of a propylene/ethylene interpolymer, each based on the total weight of the composition.

In another embodiment, the composition comprises from 5 to 10 weight percent of the polydiene- or polydiol-based polyurethane; from 15 to 35 weight percent of the thermoplastic polyurethane; and from 55 to 80 weight percent of a propylene/α-olefin interpolymer, each based on the total weight of the composition. Preferably, the α-olefin is selected from the group consisting of 1-butene, 1-hexene and 1-octene, and more preferably 1-octene.

In another embodiment, the composition comprises from 5 to 10 weight percent of the polydiene- or polydiol-based polyurethane; from 20 to 30 weight percent of the polyurethane; and from 60 to 75 weight percent of a propylene/α-olefin interpolymer, each based on the total weight of the composition. Preferably, the α-olefin is selected from the group consisting of 1-butene, 1-hexene and 1-octene, and more preferably 1-octene.

Additives such as process oils, slip agents, anti-block, AO, UV, fillers, may be added to the inventive compositions. Typically the composition will contain one or more stabilizers, for example, antioxidants, such as Irganox™ 1010 and Irgafos™ 168, both supplied by Ciba Specialty Chemicals. An example of a hindered phenolic antioxidant is Irganox® 1076 antioxidant, available from Ciba-Geigy Corp. Polymers are typically treated with one or more stabilizers before an extrusion or other melt processes. Other polymeric additives include, but are not limited to, ultraviolet light absorbers, antistatic agents, pigments, dyes, nucleating agents, fillers, slip agents, fire retardants, plasticizers, processing aids, lubricants, stabilizers, smoke inhibitors, viscosity control agents and anti-blocking agents. Additional additives include, but not limited to, surface tension modifiers, pigments, process oil, wax, blowing agents, anti-block agents, foaming agents, antistatic agents, release agents, blowing agents, foaming agents, antistatic agents, release agents, flame resistant agents, abrasion and scratch mar additives, antimicrobial agents, antistatic agents, and crosslinking agents.

In one embodiment, the compositions o this invention further comprise a styrenic block copolymer. These styrenic block copolymer may be a triblock copolymer including but not limited to styrene-butadiene-styrene triblock copolymers (SBS) and hydrogenated SBS copolymers, styrene-butadiene diblock copolymers and hydrogenated styrene-butadiene diblock copolymers, styrene-isoprene-styrene triblock copolymers (SIS) and hydrogenated SIS copolymers, styrene-isoprene diblock copolymers and hydrogenated styrene-isoprene diblock copolymers, styrene-ethylene-butylene-styrene (SEBS) tetrablock copolymers and hydrogenated SEBS copolymers, styrene-acrylonitrile copolymers (SAN), and elastomer-modified SAN. The styrenic polymer may be a hydrogenated styrene-butadiene-styrene triblock copolymer, available from Shell Chemical under the trade name KRATON G-1652.

In one embodiment, the compositions of this invention further comprise a crosslinking agent. If crosslinking is desired, then it can be effected by the use of any one of a number of different agents, e.g., by the use of thermally activated initiators, e.g., peroxides and azo compounds; photoinitiators, e.g., benzophenone; a vinyl silane, e.g., vinyl tri-ethoxy or vinyl tri-methoxy silane; and the like. Alternatively, crosslinking can be obtained by substituting a crosslinking technique for a crosslinking agent, e.g., the use of radiation techniques other than sunlight and UV light, e.g., E-beam and x-ray, and moisture cure although both of these techniques can benefit from the use of an initiator. These crosslinking agents and techniques are used in known amounts and using known equipment and procedures.

In one embodiment, the compositions used in the practice of the invention have a melt index ($I_2$) from 0.01 to 100, preferably from 0.1 to 50, and more preferably from 1 to 40 and even more preferably from 5 to 40, g/10 min as determined using ASTM D-1238 (190° C., 2.16 kg load). In another embodiment, the blend has an $I_2$ greater than, or equal to, 0.01, preferably greater than, or equal to 1 and more preferably greater than, or equal to 5, g/10 min. In another embodiment the composition has an $I_2$ less than, or equal to 100, preferably less than or equal to 50 and more preferably less than or equal to 20, g/10 min. The $I_2$ of the composition as described above is measured on a neat blend, i.e., a blend without other components that may significantly affect the measurement of the $I_2$.

In another embodiment, the compositions have a percent crystallinity of less than or equal to 50, preferably less than or equal to 30 and more preferably less than or equal to 20, percent as measured by DSC. Preferably, these polymers have a percent crystallinity from 2 to 50 percent, including all individual values and subranges from 2 to 50 percent. The crystallinity of the composition as described above is measured on a neat blend, i.e., a blend without other components that may significantly affect the measurement of the crystallinity.

In another embodiment, the compositions have a density greater than, or equal to, 0.855, preferably greater than, or equal to, 0.86 and more greater than, or equal to, 0.87, grams per cubic centimeter (g/cm$^3$ or g/cc). In another embodiment, the composition has a density less than or equal to 1, preferably less than or equal to 0.97, more preferably less than or equal to 0.96 and even more preferably less than or equal to 0.95, g/cm. In one embodiment, the density is from 0.855 to 0.97, preferably from 0.86 to 0.95 and more preferably from 0.865 to 0.93, g/cm$^3$. The density of the blend as described above is measured on a neat blend, i.e., a blend without other components that may significantly affect the measurement of the density. In those embodiments in which the composition comprises one or more filler, e.g., barium sulfate, talc, etc., the maximum density can exceed 1 g/cm$^3$, for example, the maximum density can approach or exceed 1.4 g/cm3 depending upon, among other things, the nature and amount of filler.

In another embodiment, the compositions, neat, and in fabricated form, have a tensile strength from 5 to 40, preferably from 8 to 30 and even more preferably from 9 to 20, MegaPascal (MPa).

In another embodiment, the compositions, neat, and in fabricated form, have an elongation in the machine direction or the cross machine direction from 50 to 600, or from 50 to 500, as measured according to ASTM D-638-03.

In another embodiment, the compositions in neat form have a melt strength from 0.5 to 50, and more preferably from 0.5 to 20 and even more preferably from 0.5 to 10, centiNewton (cN).

In another embodiment, the compositions in neat form have a surface tension from 10 to 100, and more preferably from 20 to 70 and even more preferably from 30 to 50, dyne per centimeter at room temperature or 23° C. (dyn/cm).

In another embodiment, the compositions in neat form have a surface tension greater than or equal to 32, more preferably greater than or equal to 33, and even more preferably greater than or equal to 35, dyn/cm at room temperature or 23° C.

In another embodiment the an inventive composition, when extruded at a 200° C. die temp (180° C.-190° C. zone temps), at 80 lbs/hr, through a flat coathanger die, which is 40 mils in thickness and 2 feet in width, produces surface energies greater than 35 dyne/cm.

In another embodiment, an inventive composition is formed into an extruded sheet, which maintains at least 50 percent, preferably at least 60 percent of its original elongation after heat aging at 120° C. for 500 hours (ASTM D-882-02).

In one embodiment, the invention provides for such compositions wherein the olefin-based polymer, and preferably an ethylene/α-olefin interpolymer is present as a continuous or co-continuous phase with the thermoplastic polyurethane.

In another embodiment, the invention provides for such compositions wherein the olefin-based polymer, and preferably an ethylene/α-olefin interpolymer is present as a co-continuous phase with the thermoplastic polyurethane.

The compositions of the invention may be prepared by combining one or more olefin-based polymers, and preferably one or more ethylene/α-olefin interpolymers with one or more thermoplastic polyurethanes. Typically, the inventive compositions are prepared by post-reactor blending the polymer components (for example, the ethylene/α-olefin interpolymer, the thermoplastic polyurethane and polydiene- or polydiol-based polyurethane). Illustrative of a post-reactor blending is an extrusion, in which two or more solid polymers are fed into an extruder, and physically mixed into a substantially homogeneous composition. The inventive compositions may be crosslinked and/or foamed. In a preferred embodiment, the inventive compositions are prepared by blending the ethylene/α-olefin interpolymer and the polydiene diol-based polyurethane in a melt process. In a further embodiment, the melt process is a melt extrusion process, and preferably an "in-line" process.

In another embodiment, the compositions further contain a polypropylene polymer component, such as a homopolymer of propylene, a copolymer of propylene with ethylene or at least one α-olefin, or a blend of a homopolymer and a copolymer, a nucleated homopolymer, a nucleated copolymer, or a nucleated blend of a homopolymer and a copolymer. The α-olefin in the propylene copolymer may be 1-butene, 1-pentene, 1-hexene, 1-heptene, 1-octene or 4-methyl-1-pentene. Ethylene is the preferred comonomer. The copolymer may be a random copolymer or a block copolymer or a blend of a random copolymer and a block copolymer. The polymers may also be branched. As such, this component is preferably selected from the group consisting of polypropylene homopolymers and propylene/ethylene copolymers, or mixtures thereof. This component may a melt flow rate (MPR) (230° C. and 2.16 kg weight) from 0.1 g/10 min to 150 g/10 min, preferably from 0.3 g/10 min to 60 g/10 min, more preferably from 0.8 g/10 min to 40 g/10 min, and most preferably from 0.8 g/10 min to 25 g/10 min. All individual values and subranges from 0.1 to 150 g/10 min are included herein and disclosed herein. This component may also have a density from 0.84 g/cc to 0.92 g/cc, more preferably from 0.85 g/cc to 0.91 g/cc, and most preferably from 0.86 g/cc to 0.90 g/cc. All individual values and subranges from 0.84 g/cc to 0.92 g/cc are included herein and disclosed herein. This component may have has a melting point greater than 125° C.

As used herein, "nucleated" refers to a polymer that has been modified by addition of a nucleating agent such as Millad®, a dibenzyl sorbitol commercially available from Milliken. Other conventional nucleating agents may also be used.

An inventive composition may comprise a combination of two or more suitable embodiments as described herein.

Applications

The invention provides an article comprising at least one component formed from an inventive composition. The inventive compositions are particularly suitable for extruded sheets and tie layers between extruded sheets, tie layers between cast sheets, tie layers between films, and tie layers between profiles. Additional articles include a carpet component, an adhesive, a fabric a dispersion, a wire sheath, a cable, a protective apparel, a coating, and a foam laminate.

In another embodiment, the article is an automotive skin; an awning; a tarp; a roofing construction article (for example, adhesives to epoxy, urethane or acrylic-based substrates for all roofing applications, such as insulation bonding, liquid roofing, façade sealant, expansion joints, wet-room sealants, pitched roof, acrylics-adhered roof, bitumen bonding, and PUR-adhered refurbishment); a steering wheel; a powder coating; a powder slush molding; a consumer durable; a grip; a handle; a computer component; a belt; an appliqués; a footwear component; a conveyor or timing belt; lubricants and engine oil components; fibers; fabrics; artificial leather; injection molded objects, such as injection molded toys; artificial turf; and dispersions.

Specific applications include adhesives to polyurethane films and foams, adhesives to polyesters; dyes; paint adhesives and paint adhesion enablers; weldability applications; automotive interiors and exteriors; compatibilizers for polymer compositions; and toughening agents for polymer compositions.

In particular, the inventive compositions can be used in the following applications: (a) outsoles, mid-soles and stiffeners, to be assembled with standard polyurethane adhesive systems currently used by footwear industry, (b) painting of soles and mid-soles with polyurethane paints, currently used by footwear industry, and (c) over-molding of polyolefins and bi-component polyurethanes for multilayered soles and mid-soles. In addition, the inventive compositions can be used in other applications, such as automotive applications and construction applications. Automotive applications include, but are not limited to, the manufacture of bumper fascias, vertical panels, soft TPO skins, and interior trim. Construction applications include, but are not limited to, the manufacture of furniture and toys.

Additional applications include adhesion of co-extruded films, where one or more substrates are compatible or reactive with hydroxyl groups, and the lamination of polyolefin based films to other polar substrates (for example, glass lamination). Further applications include artificial leather to be adhered to polar substrates, such as polyurethane, polyvinyl chloride (PVC), and others substrates. Artificial leather is used for automotive interiors adhering to polyurethane for seating, head liners.

The inventive compositions are also suitable for Health & Hygiene products, such as wipes, cleaning tissues, foams or directly dyeable fibers. The inventive compositions can be used to enhance hydrophilicity of the elastomer for novel membrane structures for separation or breathability. The inventive compositions are also suitable for use as self-adhearable elastomers onto metal or textile structures for automotive. As discussed above, the inventive compositions are well suited for blends and compatibilizers with enhanced interaction towards polar polymers, such as TPU, EVA, PVC, PC, PET, PLA (polylactic acid), polyamide esters, and PBT. Such bends can be used for novel compounds for footwear, automotive, consumer, durables, appliances, electronic housing, apparel, and conveyor belts. The inventive compositions can also serve as compatibilizers between natural fibers and other polyolefins for use in applications, such as wood binding formulations or cellulose binding formulations. The compositions of the invention are also useful in blends with one or more polyether block amides, such as Pebax® polymers available from Arkema. The inventive compositions may also be used as impact modifiers for nylon.

The inventive compositions can also be used to enhance the interaction to fillers, such as silica, carbon black or clay, for use in formulations for toners, tires, coatings or other compounds. The inventive compositions may also be used in engine oil viscosity modifiers, engine oil dispersants, dyeable or printable fibers for apparel, paint adhesion promoters, adhesives for glass, metal and PVDC barrier resins, dispersions, components in primers and sizing agents.

Thus the invention also provides a painted substrate, the substrate formed from an inventive composition as described herein, and the paint comprising at least one of an acrylic polymer, alkyd resin, cellulose-based material, melamine resin, urethane resin, carbamate resin, polyester resin, vinyl acetate resin, polyol and alcohol. In a further embodiment, the paint is a water-based. In another embodiment, the paint is an organic solvent based. This embodiment of the invention works well with a wide variety of paint formulations. The major components of solvent-borne paints and coatings are solvents, binders, pigments, and additives. In paint, the combination of the binder and solvent is referred to as the paint vehicle. Pigment and additives are dispersed within the vehicle. The amount of each constituent varies with the particular paint, but solvents traditionally make up about 60 percent of the total formulation. Typical solvents include toluene, xylene, methyl ethyl ketone, methyl isobutyl ketone and water. Binders account for about 30 weight percent, pigments for 7 to 8 weight percent, and additives for 2 to 3 weight percent. Some of the polymers and other additives used in paint formulations include: acrylic polymers, alkyd resins, cellulose based materials, such as cellulose acetate butyrate, melamine resins, carbamate resins, polyester resins, vinyl acetate resins, urethane resins, polyols, alcohols, inorganic materials such as titanium dioxide (rutile), mica flakes, iron oxide, silica, aluminum, and the like.

The invention also provides an over-molded article, the article formed from a polar substrate and a molded overlay formed from an inventive composition, as described herein. In another embodiment, the invention provides an over-molded article, the article formed from a substrate comprising an inventive composition, as described herein, and a molded overlay comprising a polar material. In further embodiment, the article is in the form of a grip, handle or belt.

In another embodiment, the invention provides an over molded article comprising a polycarbonate, as the base sheet having variable thickness, and preferably having at least textured face on which inventive compositions can be adhered, typically by a compression molding process, at a moderate temperature of 140° C. This article can be further laminated with polyolefin using conventional welding techniques, such as by pressure and heat, or a second polycarbonate sheet with a textured surface can be adhered to the exposed surface of the inventive composition.

The invention also provides a laminated structure comprising a first layer and a second layer, the first layer is formed from an inventive composition, as described herein, and the second layer is formed from a composition comprising a polar material. In a further embodiment, one of the layers is in the form of a foam. In another embodiment, one of the layers is in the form of a fabric. In a further embodiment, the laminated structure is in the form of an awning, a tarp, an automobile skin or a steering wheel.

In another embodiment, the invention provides a laminate structure comprising a polycarbonate, as the base sheet having variable thickness, and preferably having at least one textured surface on which an inventive composition of the invention can be adhered, typically by a compression molding process at moderate temperature of 140° C. This article can be further laminated with polyolefin using conventional welding techniques, for example, by pressure and heat. In addition, a second polycarbonate sheet with a textured surface, interfacing the inventive composition, can be laminated over the compatibilized blends.

Another embodiment of this invention is a multi-laminate structure of polycarbonate and polyolefin films, intercalated for increased toughness of the final structure. Another embodiment would be a compatibilized blend coating deposited on the surface of polycarbonate to provide a scratch resistant assembly coat, which could be thermoformed, for example at a thermoforming temperature of 160° C.

The invention also provides a molded article comprising a first component and a second component, the first component is formed from a polar material, and the second component formed from an inventive composition, as described herein. In a further embodiment, the article is in the form of an automobile skin, appliqué, footwear, conveyor belt, timing belt or consumer durable.

"Laminates", "laminations" and like terms mean two or more layers, for example, film layers, in intimate contact with one another. Laminates include molded articles bearing a coating. Laminates are not blends, although one or more layers of a laminate may comprise a blend.

"Polar", "polar polymer" and like terms mean that the polymer molecules have a permanent dipole, i.e., the polymer molecule has a positive end and a negative end. In other words, the electrons in a polar molecule are not shared equally among the atoms of the molecule. In contrast, "nonpolar", "nonpolar polymer" and like terms mean that the polymer molecules do not have a permanent dipole, i.e., the polymer does not have a positive end and a negative end. The electrons in a nonpolar molecule are essentially equally shared among the atoms of the molecule. Most hydrocarbon liquids and polymers are nonpolar.

Polymers substituted with carboxyl, hydroxyl, and the like, are often polar polymers. Articles prepared from nonpolar polymers have relatively low surface energy, that is, less than about 32 dyne per centimeter (dyne/cm), and articles prepared from polar polymers have relatively high surface energy, that is, 32, or more, dyne/cm. The nonpolar material of this invention typically comprises one or more nonpolar thermoplastic olefinic polymers, typically elastomers, free of any significant amount of polar functionality, for example, hydroxyl, carboxyl, carbonyl, ester, ether, amide, mercaptan, halide, and the like groups. The polar material of this invention typically comprises one or more polymers comprising one or more polar functionalities. Typical polymers comprising one more polar functionalities include, but are not limited to, polyesters, polyethers, polylactic acid, polycarbonates, nylons, polysulfides, polysulfones, polyurethanes, polyvinyl alcohol, poly(vinyl acetate), poly(vinyl chloride), acrylonitrile, ABS, polyamide esters, and polysiloxanes.

"Insignificant amount of polar functionality," and like terms, mean that a polymer does not comprise a sufficient number of polar functional groups to impart a surface energy of at least about 32 dyne/cm to an article made from it.

"Over-molding," and like terms, refer to a process in which one resin is injection into a mold containing a pre-placed substrate, and the resin is molded over this substrate. Over-molding is typically used to improve the performance and properties of a final product by over-molding one resin over another polymer substrate. Over-molding can be used to form seamless, integrated parts. Examples of over-molded parts include flexible grip handles on power tools and kitchen utensils, which provide additional gripping properties, without the hygienic concern normally associated with mechanical assemblies. The substrate may be any suitable material, such as a plastic, metal or ceramic part.

"Molded overlay," and like terms, refer to an article comprising at least two parts (an injection molded part and a substrate) that are bound together. The injection molded part is placed on top of the substrate, outside the injection mold. An adhesive may be used to bind the injection molded part to the substrate. The substrate may be any suitable material, such as a plastic, metal or ceramic part.

The substrates to which an inventive composition can be applied, include a wide range of materials, both polar and nonpolar, such as, but not limited to, polymers, metal, wood, concrete, glass, ceramic, and various composites of two or more of these materials. Alternatively, these materials can be applied to an article formed from an inventive composition.

As discussed above, application methods include painting, printing, dying, over-molding, and the like, including the many variations on each, for example, spreading, spraying, dipping, extrusion, and other processes. The inventive compositions can be crosslinked before, during or after application to a substrate, and they can be crosslinked in any convenient manner, for example, peroxide, sulfur, moisture, silane, radiation, heat and the like. In one embodiment, the inventive composition is applied to a substrate, and the inventive composition is crosslinked, as it is applied, and/or after it is applied. For crosslinking, the inventive composition will usually contain unsaturation, for example, a diene-containing polyolefin (PO).

As discussed above, the inventive compositions can be used to form a tie layer between polar and nonpolar materials, particularly between polar and nonpolar polymeric materials, for example, between a film layer of a nonpolar-PO, such as polyethylene or polypropylene, and a film layer of a polar polymer, such as polylactic acid (PLA) or polyamide or polyester. The compositions of this invention are particularly well suited as tie layers for binding together the following: (a) a polyethylene or polypropylene film, or a polyethylene or polypropylene surface of a molded article, to (b) a film, or surface of a molded article, of an ethylene/acrylic acid copolymer (EAA) or a copolymer of PLA or polyethylene terephthalate (PET). Any processes that combine co-extrusion, extrusion lamination, adhesive lamination, and/or foam casting or extrusion can be used to create these laminated structures, including structures in which one layer comprises a foam.

The inventive compositions may also be used in dispersions, such as aqueous-based dispersions for use as primers in olefinic footwear that promote adhesion to PU glues and leather; fabric coating adhesion (adhesion to PET, Nylon, PP, elastomer rich TPO comprising of POE, EPDM or other non-polar elastomers or combination thereof etc.).

In one embodiment, the dispersions of this invention can be prepared by dispersing the TPU (based on any non-polar polyol) in a previously prepared polyolefin dispersion, i.e., the polyolefin dispersion serves as the aqueous phase in the dispersion process.

In other embodiments, the dispersion can be prepared by:
a) Preparing a polyurethane prepolymer using a non-polar polyol such as polybutadiene diol or a seed-oil based polyester polyol, and a diisocyanate, or
b) Dispersing the polyurethane prepolymer in an aqueous phase comprising a polyolefin dispersion and chain extender; the polyurethane prepolymer can be dispersed in the aqueous phase by incorporating a suitable surfactant or by making the prepolymer self-dispersing using a conventional functionalization approach, or
c) Physically blending a polyolefin dispersion and a polyurethane dispersion prepared using a non-polar polyol, such as polybutadiene diol or a seed-oil based polyol, or
d) Following the procedures of US 2005/0100754, incorporated herein by reference, or
e) Dispersing a pre-blend of an inventive composition, or post blending two or more dispersions.

In one embodiment, each polyurethane component of the dispersion is formed, independently, from an aliphatic isocyanate.

The dispersions of these compositions can also be used as paint adhesion promoters for non-polar thermoplastic and thermoset parts for automotive exteriors and interiors. They can also be used as primers for painting or printing of non-polar plastic parts for toys, and other molded or extruded parts and films.

In one embodiment, the polydiene-based polyurethane and, preferably, a polydiene diol-based polyurethane, is formed from at least one aliphatic or cyclo-aliphatic diisocyanate. In a further embodiment, both the polydiene-based polyurethane, and preferably a polydiene diol-based polyurethane, and the thermoplastic polyurethane are each, independently, formed from at least one aliphatic diisocyanate.

In another embodiment, the polydiol-based polyurethane is formed from at least one aliphatic or cyclo-aliphatic diisocyanate. In a further embodiment, both the poly diol-based polyurethane and the thermoplastic polyurethane are each, independently, formed from at least one aliphatic diisocyanate. In yet a further embodiment, the polydiol-based polyurethane comprises at least one diol made from one or more seed oil triglycerides selected from the group consisting of palmitic, stearic, oleic, linoleic and linolenic acid or ester.

Additional preferred applications include automotive thermoformed skins (for polyurethane (PU) foam adhesion without the use of current water based primers based on chlorinated maleated polyolefins), house wrap—where high Moisture Vapor Transmission Rate is required and good adhesion to polypropylene woven fabric (scrim); adhesive films (blown or cast); co-extruded films, where the POE/TPU is used as a thin adhesive tie layer (for example, roofing membrane that needs adhesion using PU glues). The compositions, with proper choice of diol, isocyanate, POE and compatibilizer, can be used in coatings, paints, adhesives, glues, films, printability, dyeability, artificial leather, protective clothing, artificial turf, carpet fibers, textiles, medical (blood bags, tubing), toys, flexible overmolded goods, soft grips, sportwear, and the like, where adhesion to the polyolefin is crucial, and the inventive composition results in increased surface energy (>37 dyne/cm) for adhesion to polar materials. If the polyurethane components were completely aliphatic (no aromaticity, no un-saturation), the POE/TPU composition can be used to form a weatherable coating layer (as opposed to adhesive tie layer).

Definitions

Any numerical range recited herein, includes all values from the lower value to the upper value, in increments of one unit, provided that there is a separation of at least two units between any lower value and any higher value. As an example, if it is stated that a compositional, physical or mechanical property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (for example, 1.1, 1.5, etc.), one unit is considered to be 0.0001, 0.001, 0.01 or 0.1, as appropriate. For ranges containing numbers less than ten (for example, 1 to 5), one unit is typically considered to be 0.1. These are only examples of what is specifically intended, and all possible combinations of numerical values between the lowest value and the highest value enumerated, are to be considered to be expressly stated in this application. Numerical ranges have been recited, as discussed herein, in reference to melt index, melt flow rate, molecular weight distribution, percent crystallinity, density and other properties.

"Composition" and like terms mean a mixture of two or more materials. Included in compositions are pre-reaction, reaction and post-reaction mixtures the latter of which will include reaction products and by-products as well as unreacted components of the reaction mixture and decomposition products, if any, formed from the one or more components of the pre-reaction or reaction mixture.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend.

"Polymer" means a polymeric compound prepared by polymerizing monomers, whether of the same or a different type. The generic term polymer thus embraces the term homopolymer, usually employed to refer to polymers prepared from only one type of monomer, and the term interpolymer as defined below. The terms "ethylene/α-olefin polymer" and "propylene/α-olefin polymer" are indicative of interpolymers as described below.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Olefin-based polymer", "polyolefin", "PO" and like terms means a polymer that comprises more than 50 mole percent units derived from polymerized olefin monomer, for example ethylene or propylene (based on the total amount of polymerizable monomers). Representative polyolefins include polyethylene, polypropylene, polybutene, polyisoprene and their various interpolymers. In the context of this disclosure, "olefin-based polymer" and like terms explicitly exclude olefin multi-block interpolymers.

"Multi-block interpolymer", "multi-block copolymer", "segmented copolymer" and like terms refer to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block copolymers of the prior art, including copolymers produced by sequential monomer addition, fluxional catalysts, or anionic polymerization techniques, the multi-block copolymers used in the practice of this invention are characterized by unique distributions of both polymer polydispersity (PDI or Mw/Mn or MWD), block length distribution, and/or block number distribution, due, in a preferred embodiment, to the effect of the shuttling agent(s) in combination with multiple catalysts used in their preparation. Representative olefin multi-block interpolymers include the olefin multi-block interpolymers manufactured and sold by The Dow Chemical Company under the trademark INFUSE™. In the context of this disclosure, "multi-block interpolymers" and like terms explicitly excludes olefin-based polymers, halogenated ethylene-based polymers and elastomer rubbers.

"Ethylene multi-block copolymer" means a multi-block copolymer comprising units derived from ethylene and one or more copolymerizable comonomers, in which the ethylene-derived units comprise a plurality of the polymerized monomer units of at least one block or segment in the polymer, preferably at least 90, more preferably at least 95 and most preferably at least 98, mole percent of the block. Based on total polymer weight, the ethylene multi-block copolymers used in the practice of the present invention preferably have an ethylene content from 25 to 97, more preferably from 40 to 96, even more preferably from 55 to 95 and most preferably from 65 to 85, percent. In the context of this disclosure, "ethylene multi-block copolymer" and like terms explicitly excludes olefin-based polymers, halogenated ethylene-based polymers and elastomer rubbers.

"Ethylene-based polymer" and like terms means a polymer that comprises more than 50 mole percent polymerized ethylene monomer (based on the total amount of polymerizable monomers). As used in the context of this disclosure, ethylene-based polymer and like terms explicitly excludes ethylene multi-block interpolymers.

"Halogenated ethylene-based polymer" and like terms means a polymer that comprises more than 50 mole percent polymerized ethylene monomer (based on the total amount of polymerizable monomers and in which a portion or all of the polymerized ethylene monomer is halogenated. As used in the context of this disclosure, halogenated ethylene-based polymer and like terms explicitly excludes halogenated ethylene multi-block interpolymers.

"Ethylene/α-olefin interpolymer" and like terms means an interpolymer that comprises more than 50 mole percent polymerized ethylene monomer (based on the total amount of polymerizable monomers), and at least one α-olefin. As used in the context of this disclosure, ethylene/α-olefin interpolymer and like terms explicitly excludes ethylene/α-olefin multi-block interpolymers.

"Random ethylene/α-olefin interpolymer" and like terms are used in this disclosure consistent with their use in the art in reference to polymers, and they refer to ethylene-based interpolymers in which the comonomer(s) is/are randomly distributed along the polymer chain. As used in the context of this disclosure, random ethylene/α-olefin interpolymer and like terms explicitly excludes ethylene/α-olefin multi-block interpolymers.

"Propylene-based polymer" and like terms means a polymer that comprises more than 50 mole percent polymerized propylene monomer (based on the total amount of polymerizable monomers). As used in the context of this disclosure, propylene-based polymer and like terms explicitly excludes propylene multi-block interpolymers.

"Propylene/α-olefin interpolymer" and like terms means an interpolymer that comprises more than 50 mole percent polymerized propylene monomer (based on the total amount of polymerizable monomers), and at least one α-olefin. As used in the context of this disclosure, propylene/α-olefin interpolymer and like terms explicitly excludes propylene/α-olefin multi-block interpolymers.

The term, "propylene/ethylene interpolymer" and like terms means an interpolymer that comprises more than 50 mole percent polymerized propylene monomer (based on the total amount of polymerizable monomers) with the remainder of the interpolymer comprising at least some, e.g., typically at least 1 mole percent, polymerized ethylene monomer. This term, as used herein, does not refer to a propylene/ethylene multi-block interpolymer.

"Polydiene-based polyurethane" and like terms mean a polyurethane polymer formed, in part, from a polydiene containing at least one isocyanate-reactive group, e.g., hydroxyl and/or amine.

"Polydiol-based polyurethane" and like terms mean a polyurethane polymer formed, in part, from a polydiol containing at least two hydroxyl groups.

"Polydiene diol-based polyurethane" and like terms mean a polyurethane polymer formed, in part, from a polydiene containing at least two hydroxyl groups.

Test Methods

Density is determined in accordance with American Society for Testing and Materials (ASTM) procedure ASTM D792-00, Method B.

Melt index (I2) in g/10 min, is measured using ASTM D-1238-04 (version C), Condition 190° C./2.16 kg. The notation "I10" refers to a melt index, in g/10 min, measured using ASTM D-1238-04, Condition 190° C./10.0 kg. The notation "I21" refers to a melt index, in g/10 min, measured using ASTM D-1238-04, Condition 190° C./21.6 kg. Polyethylene is typically measured at 190C while polypropylene is typically measured at 230° C. MFR means melt flow rate for propylene based polymers and is measured using ASTM D-1238 condition 230C/2.16 kg. For urethane based polymers, including blend comprising such polymers, except PELLETHANE™ polymers, melt index is measured according to ASTM D-1238 condition 190° C./2.16 kg. For PELLETHANE™ (Pellethane™ 2102-80A AND 2103-70A) melt index is measured according to ASTM D-1238 condition 190° C./8.7 kg.

Differential Scanning Calorimeter (DSC) is performed using a TAI model Q1000 DSC equipped with an RCS cooling accessory and an auto-sampler. A nitrogen purge gas flow of 50 cc/min is used. The sample is pressed into a thin film and melted in the press at about 175° C. and then air-cooled to room temperature (25° C.). Material (3-10 mg) is then cut into a 3 mm diameter disk, accurately weighed, placed in a light aluminum pan (ca 50 mg), and then crimped shut. The thermal behavior of the sample is investigated with the following temperature profile. The sample is rapidly heated to 180° C. and held isothermally for 3 minutes in order to remove any previous thermal history. The sample is then cooled to −90° C. at 10° C./min cooling rate and held at −90° C. for 3 minutes. The sample is then heated to 150° C. at 10° C./min heating rate. The cooling and second heating curves are recorded. Ultimate tensile strength and elongation at break are measured according to ASTM D-638-03. Both measurements are performed at 23° C. on die-cut D638-type IV specimens. Melting temperature (Tm) is determined from the second heating curve. Crystallization temperature (Tc) is determined from the first cooling curve.

Surface tension is measured in accordance with ASTM D2578-04a, Method B, and DIN 53364 (1986). ARCOTEC test inks are used, which are fluids of defined surface tension, and are available in ranges from 28 to 56 mN/m. Tests are run at room temperature (23C).

Surface energy is measured using ARCOTEC™ test inks and test pens available from Lotar Enterprises. As a starting point for each check, a test ink or test pen with a medium value should be applied, e.g., 38 mN/m (dyne/cm). If the line of ink stays unchanged, for at least 2 seconds on the surface of the material, without turning into droplets, the surface energy of the material is the same, or higher, than the surface tension of the fluid. In this case, the test ink/test pen with the next higher value is applied to the surface, e.g., 40 mN/m (dyne/cm). This check has to be repeated with the next higher value of surface tension, up to the point, at which, within 2 seconds, the line of fluid turns into separate droplets. If already at the starting point (38 mN/m (dyne/cm)) droplets are formed from the line of fluid, the check is continued with test inks/test pens of lower values, which is often the case with metals. As a general limit often 32 mN/m (dyne/cm) are mentioned. If the surface energy level is below this value, the adhesion will be poor, above this value the adhesion will be good or sufficient.

Sheet hardness properties are measured according to ASTM D2240-05. The tensile properties are determined according to standard test method ASTM D638-03.

Melt tension is measured on selected polymer samples on a Goettfert Rheotens melt tensile tester at a temperature of 190° C. The Rheotens tester is composed of two counter rotating wheels, which pull a molten strand, extruded from a capillary die, at a constant velocity. The wheels are equipped with a balance to measure the stress response of the melt, as the wheels accelerate. The wheels are allowed to accelerate until strand rupture. The force to break the strand is taken as the melt tension in centiNewton (cN).

The RR (V0.1/V100) is determined by examining samples using melt rheology techniques on a Rheometric Scientific, Inc. ARES (Advanced Rheometric Expansion System) dynamic mechanical spectrometer (DMS). The samples are examined at 190° C., using the dynamic frequency mode, and 25 millimeter (mm) diameter parallel plate fixtures with a 2 mm gap. With a strain rate of 8%, and an oscillatory rate that is incrementally increased from 0.1 to 100 rad/sec, five data points are taken for each decade of frequency analyzed. Each sample (either pellets or bale) is compression molded into 3 inch (7.62 centimeter (cm)) diameter plaques by ⅛ inch (0.049 cm) thick at 20,000 psi (137.9 megapascals (MPa)) pressure for one minute at 180° C. The plaques are quenched and cooled (over a period of 1 minute) to room temperature. The "25 mm plaques" are cut from the center portion of larger plaques. These 25 mm diameter aliquots are then inserted into the ARES, at 190° C., and allowed to equilibrate for five minutes, prior to initiation of testing. The samples are maintained in a nitrogen environment throughout the analyses to minimize oxidative degradation. Data reduction and manipulation are accomplished by the ARES2/A5:RSI Orchestrator Windows 95 based software package. RR measures the ratio of the viscosity versus shear rate curve.

Interpolymer Mooney Viscosity, MV, (ML 1+4 at 125° C.) is measured in accordance with ASTM D1646-04. The processing rheology ration, PRR, is calculated from the MV and the RR in accordance with the formula; PRR=RR+[3.82−interpolymer Mooney Viscosity ($ML_{1+4}$ at 125° C.)]×0.3. ML refers to Mooney Large Rotor. The viscometer is a Monsanto MV2000 instrument.

Tensile Strength and elongation were measured in accordance with ASTM D-882-02. The samples were extruded sheets.

Tear, Type C, was measured in accordance with ASTM D-882-02. Samples were extruded sheets.

Gloss (60 degrees) was measured in accordance with ASTM D-2457-03. Samples were extruded sheets.

Heat Aging Study. For each analysis, the sample (extruded sheet) was thermally treated at 120° C. in a convection oven (Lindberg Blue Oven, Model ESP-400C-5, forced air) for the period of time as noted in Tables 2 or 3 below. After this thermal treatment, the sample was equilibrated to room temperature (16 hr-96 hr 9see ASTM D573, 10.5)). The tensile strength and elongation were then measured in accordance with ASTM D-882-02.

Moisture Vapor Transmission Test (ASTM E 96/E 96M-05, Imperial Method)—was used to determine the moisture vapor transmission rate (MVT) and Permeance by the desiccant method. The temperature and relative humidity for the evaluation were 72° F. and 50%, respectively. Non-laminated films were sealed to the open mouth of a test dish containing a desiccant, and the assembly placed in the controlled atmosphere of 72° F. and 50% relative humidity. Periodic weighings determine the rate of water vapor movement through the specimen into the desiccant. To a deviation of 13.3 of ASTM E 96/E 96M-05, the MVT and Permeance were normalized to film thickness giving the normalized MVT and permeability coefficient, respectively by multiplying the MVT and Permeance by the thickness of the film measured. This was done since the Permeance and MVT are directly related to the thickness of the specimen, and the thickness variability resulted in the process of the film fabrication.

Analysis of $T_{me}$ and $T_{MAX}$

Differential scanning calorimetry (DSC) is a common technique that can be used to examine the melting and crystallization of semi-crystalline polymers. General principles of DSC measurements, and applications of DSC to studying semi-crystalline polymers, are described in standard texts (e.g., E. A. Turi, ed., Thermal Characterization of Polymeric Materials, Academic Press, 1981). Certain of the interpolymers of this invention are characterized by a DSC curve, with a $T_{me}$ that remains essentially the same, and a $T_{Max}$ that decreases as the amount of unsaturated comonomer in the interpolymer is increased. The Tme refers to the temperature at which the melting ends. The $T_{Max}$ refers to the peak melting temperature.

Differential Scanning Calorimetry (DSC) analysis is determined using a model Q1000 DSC from TA Instruments, Inc. The calibration of the DSC is done as follows. First, a baseline is obtained by running the DSC from −90° C. to 290° C., without any sample in the aluminum DSC pan. Then 7 milligrams of a fresh indium sample is analyzed by heating the sample to 180° C., cooling the sample to 140° C., at a cooling rate of 10° C./min, followed by keeping the sample isothermally at 140° C. for one minute, followed by heating the sample from 140° C. to 180° C., at a heating rate of 10° C./min. The heat of fusion and the onset of melting of the indium sample are determined, and checked to be within 0.5° C. from 156.6° C. for the onset of melting, and within 0.5 J/g from 28.71 J/g for the heat of fusion. Then deionized water is analyzed by cooling a small drop of fresh sample in the DSC pan from 25° C. to −30° C., at a cooling rate of 10° C./min. The sample is kept isothermally at −30° C. for two minutes, and heated to 30° C., at a heating rate of 10° C./min. The onset of melting is determined and checked to be within 0.5° C. from 0° C.

The polypropylene samples are pressed into a thin film at a temperature of 190° C. About 5 to 8 mg of sample is weighed out, and placed in the DSC pan. The lid is crimped on the pan to ensure a closed atmosphere. The sample pan is placed in the DSC cell, and heated at a high rate of about 100° C./min, to a temperature of about 30° C. above the melt temperature. The sample is kept at this temperature for about 3 minutes. Then the sample is cooled at a rate of 10° C./min to −40° C., and kept isothermally at that temperature for three minutes. Consequently the sample is heated at a rate of 10° C./min, until complete melting. The resulting enthalpy curves are analyzed for peak melt temperature, onset and peak crystallization temperatures, heat of fusion and heat of crystallization, Tme, and any other DSC analyses of interest. See also U.S. Pat. No. 6,919,407, column 61, line 24 to column 65, line 55, incorporated herein by reference.

$^{13}$C NMR

The $^{13}$C NMR spectroscopy is one of a number of techniques known in the art of measuring comonomer incorporation into a polymer. An example of this technique is described for the determination of comonomer content for ethylene/α-olefin copolymers in Randall (Journal of Macromolecular Science, Reviews in Macromolecular Chemistry and Physics, C29 (2 & 3), 201-317 (1989)). The basic procedure for determining the comonomer content of an olefin interpolymer involves obtaining the $^{13}$C NMR spectrum under conditions where the intensity of the peaks, corresponding to the different carbons in the sample, is directly proportional to the total number of contributing nuclei in the sample. Methods for ensuring this proportionality are known in the art, and involve allowance for sufficient time for relaxation after a pulse, the use of gated-decoupling techniques, relaxation agents, and the like. See also U.S. Pat. No. 6,919,407, columns 13-15, incorporated herein by reference.

The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotopically labeled comonomer. The mole percent comonomer can be determined by the ratio of the integrals corresponding to the number of moles of comonomer to the integrals corresponding to the number of moles of all of the monomers in the interpolymer, as described in Randall, for example.

The data is collected using a Varian UNITY Plus 400 MHz NMR spectrometer, corresponding to a $^{13}$C resonance frequency of 100.4 MHz. Acquisition parameters are selected to ensure quantitative —C data acquisition in the presence of the relaxation agent. The data is acquired using gated 1H decoupling, 4000 transients per data file, a 7 sec pulse repetition delay, spectral width of 24,200 Hz, and a file size of 32K data points, with the probe head heated to 130° C. The sample is prepared by adding approximately 3 mL of a 50/50 mixture of tetrachloroethane-d2/orthodichlorobenzene that is 0.025M in chromium acetylacetonate (relaxation agent) to 0.4 g sample in a 10 mm NMR tube. The headspace of the tube is purged of oxygen by displacement with pure nitrogen. The sample is dissolved and homogenized by heating the tube and its contents to 150° C., with periodic refluxing initiated by heat gun. Following data collection, the chemical shifts are internally referenced to the mmmm pentad at 21.90 ppm.

For propylene/ethylene copolymers, the following procedure is used to calculate the percent ethylene in the polymer. Integral regions are determined as follows:

TABLE A

| Integral Regions for Determining % Ethylene | |
|---|---|
| Region designation | PPM |
| A | 44-49 |
| B | 36-39 |
| C | 32.8-34 |
| P | 31.0-30.8 |
| Q | Peak at 30.4 |
| R | Peak at 30 |
| F | 28.0-29.7 |
| G | 26-28.3 |

TABLE A-continued

Integral Regions for Determining % Ethylene

| Region designation | PPM |
|---|---|
| H | 24-26 |
| I | 19-23 |

Region D is calculated as D=P−(G−Q)/2. Region E=R+Q+(G−Q)/2.

TABLE B

Calculation of Region D

PPP = (F + A − 0.5 D)/2
PPE = D
EPE = C
EEE = (E − 0.5 G)/2
PEE = G
PEP = H
Moles P = sum P centered triads
Moles E = sum E centered triads
Moles P = (B + 2A)/2
Moles E = (E + G + 0.5B + H)/2

The C2 values are calculated as the average of the two methods above (triad summation and algebraic) although the two do not usually vary.

The mole fraction of propylene insertions resulting in regio-errors is calculated as one half of the sum of the two of methyls showing up at 14.6 and 15.7 ppm divided by the total methyls at 14-22 ppm attributable to propylene. The mole percent of the regio-error peaks is the mole fraction times 100.

Isotacticity at the triad level (mm) is determined from the integrals of the mm triad (22.70-21.28 ppm), the mr triad (21.28-20.67 ppm) and the rr triad (20.67-19.74). The mm isotacticity is determined by dividing the intensity of the mm triad by the sum of the mm, mr, and rr triads. For ethylene copolymers the mr region is corrected by subtracting 37.5-39 ppm integral. For copolymers with other monomers that produce peaks in the regions of the mm, mr, and rr triads, the integrals for these regions are similarly corrected by subtracting the intensity of the interfering peak using standard NMR techniques, once the peaks have been identified. This can be accomplished, for example, by analysis of a series of copolymers of various levels of monomer incorporation, by literature assignments, by isotopic labeling, or other means which are known in the art.

The $^{13}$C NMR peaks corresponding to a regio-error at about 14.6 and about 15.7 ppm are believed to be the result of stereoselective 2,1-insertion errors of propylene units into the growing polymer chain. In a typical P/E* polymer, these peaks are of about equal intensity, and they represent about 0.02 to about 7 mole percent of the propylene insertions into the homopolymer or copolymer chain. For some embodiments, they represent about 0.005 to about 20 mole % or more of the propylene insertions. In general, higher levels of regio-errors lead to a lowering of the melting point and the modulus of the polymer, while lower levels lead to a higher melting point and a higher modulus of the polymer.

Temperature-Rising Elution Fractionation

The determination of crystallizable sequence length distribution can be accomplished on a preparative scale by temperature-rising elution fractionation (TREF). The relative mass of individual fractions can be used as a basis for estimating a more continuous distribution. L. Wild, et al., *Journal of Polymer Science: Polymer. Physics* Ed., 20, 441 (1982), scaled down the sample size and added a mass detector to produce a continuous representation of the distribution as a function of elution temperature. This scaled down version, analytical temperature-rising elution fractionation (ATREF), is not concerned with the actual isolation of fractions, but with more accurately determining the weight distribution of fractions.

While TREF was originally applied to interpolymers of ethylene and higher α-olefins, it can also be used for the analysis of interpolymers of propylene with ethylene (or higher α-olefins). The analysis of interpolymers of propylene requires higher temperatures for the dissolution and crystallization of pure, isotactic polypropylene, but most of the copolymerization products of interest elute at similar temperatures as observed for interpolymers of ethylene. The following table (Table 2) is a summary of conditions used for the analysis of copolymers of propylene. Except as noted the conditions for TREF are consistent with those of Wild, et al., ibid, and Hazlitt, *Journal of Applied Polymer Science: Appl. Polym. Symp.*, 45, 25 (1990).

TABLE 2

Parameters Used for TREF

| Parameter | Explanation |
|---|---|
| Column type and size | Stainless steel shot with 1.5 cc interstitial volume |
| Mass detector | Single beam infrared detector at 2920 cm$^{-1}$ |
| Injection temperature | 150° C. |
| Temperature control device | GC oven |
| Solvent | 1,2,4-trichlorobenzene |
| Concentration | 0.1 to 0.3% (weight/weight) |
| Cooling Rate 1 | 140° C. to 120° C. @ −6.0° C./min |
| Cooling Rate 2 | 120° C. to 44.5° C. @ −0.1° C./min |
| Cooling Rate 3 | 44.5° C. to 20° C. @ −0.3° C./min |
| Heating Rate | 20° C. to 140° C. @ 1.8° C./min |
| Data acquisition rate | 12/min |

The data obtained from TREF are expressed as a normalized plot of weight fraction as a function of elution temperature. The separation mechanism is analogous to that of copolymers of ethylene, whereby the molar content of the crystallizable component (ethylene) is the primary factor that determines the elution temperature. In the case of copolymers of propylene, it is the molar content of isotactic propylene units that primarily determines the elution temperature. FIG. 5 of U.S. Pat. No. 6,919,407 is a representation of the typical type of distribution one would expect for a propylene/ethylene copolymer made with a metallocene polymer and an example of a P/E* copolymer.

The shape of the metallocene curve in FIG. 5 in U.S. Pat. No. 6,919,407 is typical for a homogeneous copolymer. The shape arises from the inherent, random incorporation of comonomer. A prominent characteristic of the shape of the curve is the tailing at lower elution temperature compared to the sharpness or steepness of the curve at the higher elution temperatures. A statistic that reflects this type of asymmetry is skewness. Equation 1 mathematically represents the skewness index, $S_{ix}$, as a measure of this asymmetry (see U.S. Pat. No. 6,919,407, column 11, lines 15-23).

$$S_{ix} = \{\text{Summation of } [w_i \times (T_i - T_{Max})^{1/3}]\}^{1/3} \div \{\text{Summation of } [w_i \times (T_i - T_{Max})^2]\}^{1/2}$$

The value, $T_{Max}$, is defined as the temperature of the largest weight fraction eluting between 50° C. and 90° C. in the TREF curve. The $T_i$ and $w_i$ are the elution temperature and weight fraction, respectively, of an arbitrary, ith fraction in the TREF distribution. The distributions have been normalized (the sum of the $w_i$ equals 100%) with respect to the total area of the curve eluting above 30° C. Thus, the index reflects only the shape of the crystallized polymer and any uncrystallized polymer (polymer still in solution at or below 30° C.) has been omitted from the calculation shown in Equation 1 (see U.S. Pat. No. 6,919,407, columns 9-11).

The following examples illustrate, but do not, either explicitly or by implication, limit the present invention.

EXAMPLES

The following polymers were used in the examples below.

Engage™ 7086 or ENR 7086.01, a random ethylene/1-butene copolymer having a density of 0.901 g/cc, and a melt index (I2) of less than 0.5 g/10 min (available from The Dow Chemical Company).

Pellethane™ 2102-80A is a thermoplastic polyurethane, with a density of 1.18 g/cc, and a melt index (I2) of 4 g/10 min as measured at 190° C. and 8.7 kg (available from The Dow Chemical Company).

TPU-1: Polybutadiene diol based TPU having a Tg of $-34$C, specific gravity@25C of 0.995 g/cc, tensile strength of 1711 psi, I2 of 1, hard segment content of 35 wt %, softening point of 90C, and 559% elongation (available from Sartomer Company, Inc.)

Hydrogenated poly bd TPU is a hydrogenated polybutadiene diol based TPU.

Ebony color concentrate is available from Americhem. The ID is 53169-H1-101. The carrier resin is ESCORENE AN 13K.

Fusabond MN439D is a MAH-grafted ethylene/octene-1 copolymer (MAH graft—level medium as defined by manufacturer); density=0.87 g/cc and melt index (I2)=1.6 g/10 min (available from DuPont).

A. Formation of Extruded Sheets

Extruded sheets were formed from the inventive compositions as shown in Table 3. All weight percentages are based on the total weight of the composition.

Components were fed into the hopper of a WP-ZSK twin screw extruder individually, or together in a dry blend. The mode of addition did not affect the properties of the extruded sheet. The extruder speed was approximately 500 RPM, and the zone temperatures were as follows: Zone 1=approx. 140° C. and Zones 2-8=approx. 170° C. The extruded strand was pelletized upon exiting the extruder to form compounded pellets.

The compounded pellets were dried overnight in a conventional static oven at approximately 80° C. to remove residual moisture. The dried pellets were fed into a Killion extruder (3 roll stack), and extruded into a sheet of thickness 20-40 mils. Sheets used in Table 2 were extruded to a thickness of 20-40 mils. The extruder speed was approximately 75-100 RPM, and the zone temperatures were as follows: zone 1=180° C., zone 2-4=190° C. The compositions were extruded at 80 lbs/hr through a flat coat-hanger die that is 20-40 mils thick and 2 feet in width. This results in shear rates of approx 96 s$^{-1}$ (for 40 mil thickness) and 385 s$^{-1}$ (for 20 mil thickness). The processing provided extruded films with relatively high surface energies.

The surface energy, thermal stability, elongation, tear strength and gloss were measured on each film, and are reported in Table 3 below. The inventive films 1,3,5 and 6 have good surface energies, in addition to good thermal and mechanical properties. Examples 5 and 6 with 5-10 wt % of the polydiene diol based TPU have a high surface energy and pass the heat aging test. As a comparison, Example 40-6 (higher level of TPU-1) passes the high surface energy test, but fails the heat aging test. Examples 40-1 and 40-2, each with a higher level of hydrogenated polydiene diol based TPU pass the heat aging test, and have high surface energy when the hydrogenated TPU content is between 24-37 wt % percent. However, these two examples are high cost solutions due to the high content of high cost hydrogenated polydiene diol TPU. The inventive compositions in Examples 1 and 3 are lower cost solutions that use only 5 wt % of the hydrogenated TPU as a compatibilizer, in addition to the less expensive PELLETHANE TPU. Examples 1 and 3 have high surface energy and pass heat aging requirements. Use of traditional compatibilizers such as MAH-grafted polymers in comparative 40-7 results in low surface energy.

TABLE 3

|  | 1 | 2 | 3 | 4 | 5 | 6 | 40-1 | 40-2 | 40-6 | 40-7 |
|---|---|---|---|---|---|---|---|---|---|---|
| ENR 7086.01 | 62 | 62 | 74 | 74 | 62 | 62 | 61.74 | 73.5 | 61.74 | 51.74 |
| PELLETHANE 2102-80A | 31 | 26 | 19 | 14 | 31 | 26 | 0 | 0 | 0 | 36.26 |
| Exp. Hydrogenated poly bd TPU | 5 | 10 | 5 | 10 | 0 | 0 | 36.26 | 24.5 | 0 | 0 |
| Ebony black concentrate | 2 | 2 | 2 | 2 | 2 | 2 | 2 | 2 | 2 | 2 |
| TPU-1 | 0 | 0 | 0 | 0 | 5 | 10 |  |  | 36.26 |  |
| Fusabond 493D(1% MAH graft | 0 | 0 | 0 | 0 | 0 | 0 | 0 | 0 | 0 | 10 |
| Total | 100 | 100 | 100 | 100 | 100 | 100 | 100 | 100 | 100 | 100 |
| Surface energy pressed pellets | 41 | 32 | 36 | 36 | 44 | 41 | NM | NM | NM | NM |
| Surface energy extruded sheeting | 38 | NM | 38 | NM | 41 | NM | 35 | 38 | 41 | 32 |
| Surface criteria Pass/Fail (>35 dyne - pass) | Pass |  | Pass |  | Pass |  | Pass | Pass | Pass | Fail |
| Heat aging @ 120° C. |  | NM |  | NM |  | NM |  |  |  |  |
| Original Tensile, (MPA) | 11 |  | 16 |  | 12.8 |  | 18.6 | 24.5 | 9.9 | 26 |
| 72 hr | 11 |  | 18 |  | 17 |  | NM | NM | 13.8 | NM |
| 7 Day | 9 |  | 20 |  | 17.8 |  | 10.3 | 21.1 | 15 | 30.8 |
| 14 Day | NM |  | NM |  | NM |  | 17.8 | 20.5 | 22.2 | 27.6 |
| 21 Day | 18.22 |  | 21.8 |  | 20.8 |  | 17 | 19.8 | 20.9 | 28 |
| Original Elongation, % | 485 |  | 550 |  | 502 |  | 633 | 646 | 431 | 600 |
| 72 hr | 548 |  | 647 |  | 582 |  | NM | NM | 351 | NM |
| 7 Day | 380 |  | 670 |  | 564 |  | NM | 702 | 198 | 593 |
| 14 Day | NM |  | NM |  | NM |  | 687 | 750 | 69 | 548 |

TABLE 3-continued

|  | 1 | 2 | 3 | 4 | 5 | 6 | 40-1 | 40-2 | 40-6 | 40-7 |
|---|---|---|---|---|---|---|---|---|---|---|
| 21 Day | 641 |  | 696 |  | 573 |  | 634 | 725 | 5 | 623 |
| Heat Aging Pass/Fail | Pass |  | Pass |  | Pass |  | Pass | Pass | Fail | Pass |
| Die C tear strength | 76.4 |  | 80.3 |  | 75.2 |  | NM | NM | NM | 47.3 |
| Density, g/cc | 0.982 |  | 0.956 |  | 0.984 |  | 0.9372 | 0.9232 | 0.9409 | 0.9854 |
| 60 degree gloss |  |  |  |  |  |  | 6.3 | 9 | 3 | 3.6 |
| Gloss Pass/Fail |  |  |  |  |  |  | Fail | Fail | Pass | Pass |

The inventive compositions, as shown in Table 3, may also be used in aqueous and non-aqueous dispersions.

Aqueous dispersions may be prepared by melt blending the inventive composition and water in an extruder to produce a stable, uniform dispersion with an average particle size, typically around 300 nm. The solids content of the dispersions is typically from 35 to 50 weight percent, based on the total weight of the dispersion. A dispersing agent, for example, UNICID™ 350 acid (6 wt % on a solids basis; of a synthetic C26 carboxylic acid converted to potassium salt, and available from Baker Petrolite), is added to the dispersion. The dispersions are then applied as a cast film to biaxially-oriented polypropylene (BOPP) film (or any other substrate on which an adhesive might be required, e.g., polyester, nylon, other polyolefins, etc.), and the surface energy measured.

The compositions of the invention may also be used as an adhesion promoter to polyurethane, either pure or in blends, extruded to provide artificial turf (or artificial grass yarn.).

For example, an inventive composition may be extruded on a tape extrusion line and stretched 5 times. Sample tapes can then bundled, and stacked as five strands on top of each other, mimicking bundles of artificial turf yarn after being tufted into a carpet. The bundles can be held in a mold, and a polycondensating diol-isocyanate blend, for example as shown in Table 4 below, may be injected into the mold onto one section of the bundle. After curing for about 30 minutes, at 25° C., a sample of the resultant polymer can be evaluated for adhesion to a polyurethane.

TABLE 4

| Diol Formulation | |
|---|---|
| Voranol EP 1900 | 90 pbw |
| 1,4 BD | 10 pbw |
| Sylosiv P3 | 5 pbw |
| DABCO 33 LV | 0.2 pbw |
| Isocyanates | |
| Isonate M143 ratio | 40:100 |

Isonate M143 available from The Dow Chemical Company is a light-yellow, low viscosity, modified diphenylmethane diisocyanate containing a high percentage of pure diphenylmethane diisocyanate, and a lesser amount of polycarbodiimide adducts.

Voranol EP 1900 polyol available from The Dow Chemical Company is 4000 molecular weight diol based on propylene oxide with ethylene oxide capping.

SYLOSIV® zeolite powders available from Shimtek are non-toxic moisture scavengers for 1K- and 2K-Polyurethane systems.

DABCO 33 LV available from Air Products is a strong, multi-purpose gelation catalyst and is 33% crystalline triethylene diamine in 67% dipropylene glycol.

Thus, the inventive composition may be used as an adhesion promoter towards polyurethane, in artificial turf, and other applications, and which can be incorporated reactively into polyolefins, the latter being used for the production for artificial turf to improve the tuft lock of the yarn in the artificial turf carpet.

Adhesion is promoted via the functional group reacting to the polyurethane coating applied as a polymerizing mixture to the carpet backing. On the carpet backing side, the tufted artificial grass yarn/tape surface is exposed and the coating thereon applied. The concentration of the adhesion promoter can be 100 percent of an inventive composition, and can extend down to 10 percent of an inventive composition in a blend with any polyethylene or propylene deemed appropriate for use in artificial grass yarn applications.

An inventive composition may also be used in the fabrication of hydrophilic artificial grass yarn, with the purpose of creating a more "player friendly" surface properties. In particular, blends of thermoplastic polyurethane with polyethylenes compatibilized with an inventive composition may be used to form artificial turf.

Although the invention has been described in considerable detail in the preceding examples, this detail is for the purpose of illustration and is not to be construed as a limitation on the invention as described in the following claims. All U.S. patents and allowed U.S. patent applications or published U.S. patent applications are incorporated within this specification by reference.

We claim:
1. A composition comprising the following:
   A) 55 to 80 weight percent of an olefin-based polymer;
   B) 15 to 35 weight percent of a thermoplastic polyurethane; and
   C) 5 to 10 weight percent of a polydiene-based or polydiol-based polyurethane other than B),
   wherein the olefin-based polymer is selected from the group consisting of homogeneously branched linear ethylene/α-olefin interpolymers, homogeneously branched substantially linear ethylene/α-olefin interpolymers, ethylene/α-olefin interpolymers having a PRR greater than, or equal to 4, and propylene/α-olefin interpolymer.
2. The composition of claim 1, wherein the olefin-based polymer is a propylene/α-olefin-based interpolymer that has at least one of the following properties:
   (i) 13C NMR peaks corresponding to a regio-error at about 14.6 and about 15.7 ppm, the peaks of about equal intensity,
   (ii) a skewness index, $S_{ix}$, greater than about −1.20,
   (iii) a DSC curve with a $T_{me}$ that remains essentially the same, and a $T_{Max}$ that decreases as the amount of comonomer in the interpolymer is increased, and
   (iv) an X-ray diffraction pattern that reports more gamma-form crystals than a comparable interpolymer prepared with a Ziegler-Natta catalyst.
3. The composition of claim 1, wherein the polydiene-based polyurethane is formed from a composition that comprises 15 to 40 weight percent of a diisocyanate, based on the total weight of the composition.

4. The composition of claim 3, wherein the diisocyanate is an aromatic diisocyanate.

5. The composition of claim 1, wherein the thermoplastic polyurethane comprises chemical units derived from a polyester, and at least one aromatic diisocyanate.

6. The composition of claim 1, wherein the thermoplastic polyurethane comprises chemical units derived from a polyester, and at least one aliphatic diisocyanate.

7. An article comprising at least one component formed from the composition of claim 1.

8. The article of claim 7, wherein the article is an sheet, a carpet, an adhesive, a wire sheath, a cable, a protective apparel, an automotive part, a footwear component, a coating, or a foam laminate, an automotive skin, an awning, a tarp, a roofing construction article, a steering wheel, a powder coating, a powder slush molding, a consumer durable, a grip, a handle, a computer component, a belt, an appliqué, a footwear component, a conveyor or timing belt, or a fabric.

9. A painted substrate, wherein the substrate is formed from the composition of claim 1.

10. An over-molded article comprising the following: (a) a substrate formed from a composition comprising a polar polymer, and (b) a molded overlay formed from the composition of claim 1.

11. A laminated structure comprising a first layer and a second layer, and wherein the first layer is formed from the composition of claim 1, and wherein the second layer is formed from a composition comprising a polar polymer.

12. A dispersion comprising the composition of claim 1.

13. The dispersion of claim 12, wherein the dispersion further comprises at least one additive of selected from the group consisting of an acrylic polymer, an alkyd resin, a cellulose-based material, a melamine resin, a urethane resin, a carbamate resin, a polyester resin, a vinyl acetate resin, an epoxy a polyol, an alcohol, and combinations thereof.

14. An injection molded article comprising at least one component formed from the composition of claim 1.

15. A molded article comprising a first component and a second component, and wherein the first component is formed from a composition comprising a polar polymer, and wherein the second component is formed from the composition of claim 1.

16. A footwear article comprising at least one component formed from the composition of claim 1.

17. An automotive part comprising at least one layer formed from the composition of claim 1.

18. Artificial turf comprising at least one component formed from the composition of claim 1.

* * * * *